(12) United States Patent
Arimilli et al.

(10) Patent No.: US 8,077,602 B2
(45) Date of Patent: Dec. 13, 2011

(54) PERFORMING DYNAMIC REQUEST ROUTING BASED ON BROADCAST QUEUE DEPTHS

(75) Inventors: Lakshminarayana B. Arimilli, Austin, TX (US); Ravi K. Arimilli, Austin, TX (US); Bernard C. Drerup, Austin, TX (US); Jody B. Joyner, Austin, TX (US); Jerry D. Lewis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 12/024,514

(22) Filed: Feb. 1, 2008

(65) Prior Publication Data

US 2009/0198957 A1 Aug. 6, 2009

(51) Int. Cl.
- *G01R 31/08* (2006.01)
- *G06F 11/00* (2006.01)
- *G08C 15/00* (2006.01)
- *H04J 1/16* (2006.01)
- *H04J 3/14* (2006.01)
- *H04L 1/00* (2006.01)
- *H04L 12/26* (2006.01)
- *H04L 12/28* (2006.01)
- *H04L 12/56* (2006.01)

(52) U.S. Cl. ........ 370/217; 370/221; 370/225; 370/236; 370/238; 370/242; 370/248; 370/389; 370/392; 370/395.31

(58) Field of Classification Search .................. None
See application file for complete search history.

(56) References Cited

U.S. PATENT DOCUMENTS

| | | | |
|---|---|---|---|
| 4,435,755 A | 3/1984 | Meritt | |
| 4,679,189 A | 7/1987 | Olson et al. | |
| 4,695,945 A | 9/1987 | Irwin | |
| 4,893,306 A | 1/1990 | Chao et al. | |
| 5,103,393 A | 4/1992 | Harris et al. | |

(Continued)

FOREIGN PATENT DOCUMENTS

EP 1351140 A1 10/2003

(Continued)

OTHER PUBLICATIONS

U.S. Appl. No. 11/845,206, filed Aug. 27, 2007, Arimilli et al.

(Continued)

*Primary Examiner* — Daniel J Ryman
*Assistant Examiner* — Nishant Divecha
(74) *Attorney, Agent, or Firm* — Stephen J. Walder, Jr.; Diana R. Gerhardt

(57) ABSTRACT

Mechanisms for performing dynamic request routing based on broadcast depth queue information are provided. Each processor chip in the system may use a synchronized heartbeat signal it generates to provide queue depth information to each of the other processor chips in the system. The queue depth information identifies a number of requests or amount of data in each of the queues of a processor chip that originated the heartbeat signal. The queue depth information from each of the processor chips in the system may be used by the processor chips in determining optimal routing paths for data from a source processor chip to a destination processor chip. As a result, the congestion of data for processing at each of the processor chips along each possible routing path may be taken into account when selecting to which processor chip to forward data.

21 Claims, 22 Drawing Sheets

U.S. PATENT DOCUMENTS

| | | | |
|---|---|---|---|
| 5,166,927 A | 11/1992 | Iida et al. | |
| 5,218,601 A | 6/1993 | Chujo et al. | |
| 5,222,229 A | 6/1993 | Fukuda et al. | |
| 5,327,365 A | 7/1994 | Fujisaki et al. | |
| 5,331,642 A | 7/1994 | Valley et al. | |
| 5,355,364 A | 10/1994 | Abali | |
| 5,426,640 A * | 6/1995 | Hluchyj et al. | 370/235 |
| 5,428,803 A | 6/1995 | Chen et al. | |
| 5,481,673 A | 1/1996 | Michelson | |
| 5,535,387 A | 7/1996 | Matsuoka et al. | |
| 5,602,839 A | 2/1997 | Annapareddy et al. | |
| 5,613,068 A | 3/1997 | Gregg et al. | |
| 5,629,928 A | 5/1997 | Calvignac et al. | |
| 5,701,416 A | 12/1997 | Thorson et al. | |
| 5,710,935 A | 1/1998 | Barker et al. | |
| 5,752,067 A | 5/1998 | Wilkinson et al. | |
| 5,797,035 A | 8/1998 | Birrittella et al. | |
| 5,845,060 A | 12/1998 | Vrba et al. | |
| 6,044,077 A | 3/2000 | Luijten et al. | |
| 6,078,587 A | 6/2000 | Lynch et al. | |
| 6,147,999 A | 11/2000 | Honda et al. | |
| 6,148,001 A | 11/2000 | Soirinsuo et al. | |
| 6,230,279 B1 | 5/2001 | Dewa et al. | |
| 6,266,701 B1 | 7/2001 | Sridhar et al. | |
| 6,377,640 B2 | 4/2002 | Trans | |
| 6,424,870 B1 | 7/2002 | Maeda et al. | |
| 6,449,667 B1 | 9/2002 | Ganmukhi et al. | |
| 6,512,740 B1 | 1/2003 | Baniewicz et al. | |
| 6,522,630 B1 | 2/2003 | Ooms et al. | |
| 6,535,926 B1 | 3/2003 | Esker | |
| 6,542,467 B2 | 4/2003 | Umayabashi | |
| 6,594,714 B1 | 7/2003 | Swanson et al. | |
| 6,680,912 B1 | 1/2004 | Kalman et al. | |
| 6,687,751 B1 | 2/2004 | Wils et al. | |
| 6,694,471 B1 | 2/2004 | Sharp | |
| 6,704,293 B1 | 3/2004 | Larsson et al. | |
| 6,718,394 B2 | 4/2004 | Cain | |
| 6,728,216 B1 | 4/2004 | Sterner | |
| 6,744,775 B1 * | 6/2004 | Beshai et al. | 370/409 |
| 6,775,230 B1 | 8/2004 | Watanabe et al. | |
| 6,791,940 B1 | 9/2004 | Rajesh | |
| 6,801,984 B2 | 10/2004 | Arimilli et al. | |
| 6,816,899 B1 | 11/2004 | Meah | |
| 6,857,026 B1 | 2/2005 | Cain | |
| 6,865,160 B1 | 3/2005 | Bare | |
| 6,931,486 B2 | 8/2005 | Cavallo et al. | |
| 6,950,394 B1 | 9/2005 | Chou et al. | |
| 6,956,821 B2 | 10/2005 | Szviatovszki et al. | |
| 6,956,858 B2 | 10/2005 | Hariguchi et al. | |
| 6,957,274 B2 | 10/2005 | Trace et al. | |
| 7,007,189 B2 | 2/2006 | Lee et al. | |
| 7,054,269 B1 | 5/2006 | Luguern et al. | |
| 7,093,154 B2 | 8/2006 | Bartfai et al. | |
| 7,096,251 B2 | 8/2006 | Chiu et al. | |
| 7,106,731 B1 | 9/2006 | Lin et al. | |
| 7,120,120 B2 | 10/2006 | Guerin et al. | |
| 7,123,619 B1 | 10/2006 | Lefebvre | |
| 7,146,186 B1 | 12/2006 | Moon et al. | |
| 7,155,525 B2 | 12/2006 | Glasco et al. | |
| 7,159,137 B2 | 1/2007 | Nemawarkar et al. | |
| 7,164,652 B2 | 1/2007 | Puppa et al. | |
| 7,174,194 B2 | 2/2007 | Chauvel et al. | |
| 7,184,440 B1 | 2/2007 | Sterne et al. | |
| 7,200,741 B1 | 4/2007 | Mine | |
| 7,215,644 B2 | 5/2007 | Wu et al. | |
| 7,230,924 B2 | 6/2007 | Chiu et al. | |
| 7,233,574 B2 | 6/2007 | Worfolk et al. | |
| 7,239,641 B1 | 7/2007 | Banks et al. | |
| 7,249,210 B2 | 7/2007 | Subramaniam et al. | |
| 7,308,558 B2 * | 12/2007 | Arimilli et al. | 712/11 |
| 7,472,306 B2 | 12/2008 | Tsui et al. | |
| 7,526,569 B2 | 4/2009 | Nishida et al. | |
| 7,583,593 B2 | 9/2009 | Guichard et al. | |
| 7,752,332 B2 | 7/2010 | Jiang et al. | |
| 2002/0012320 A1 | 1/2002 | Ogier et al. | |
| 2002/0027885 A1 | 3/2002 | Ben-Ami | |
| 2002/0046324 A1 | 4/2002 | Barroso et al. | |
| 2002/0049859 A1 | 4/2002 | Bruckert et al. | |
| 2002/0064130 A1 | 5/2002 | Siu et al. | |
| 2002/0080798 A1 | 6/2002 | Hariguchi et al. | |
| 2002/0095562 A1 | 7/2002 | Nakanishi et al. | |
| 2002/0186665 A1 | 12/2002 | Chaffee et al. | |
| 2003/0086415 A1 | 5/2003 | Bernhard et al. | |
| 2003/0174648 A1 | 9/2003 | Wang et al. | |
| 2003/0182614 A1 | 9/2003 | Schroeder | |
| 2003/0195983 A1 | 10/2003 | Krause et al. | |
| 2003/0233388 A1 | 12/2003 | Glasco et al. | |
| 2004/0059443 A1 | 3/2004 | Sharangpani | |
| 2004/0073831 A1 | 4/2004 | Yanai et al. | |
| 2004/0151170 A1 | 8/2004 | Gulati et al. | |
| 2004/0190517 A1 | 9/2004 | Gupta et al. | |
| 2004/0193612 A1 | 9/2004 | Chang | |
| 2004/0193693 A1 | 9/2004 | Gangwal et al. | |
| 2004/0215901 A1 | 10/2004 | Gaither | |
| 2004/0236891 A1 | 11/2004 | Arimilli et al. | |
| 2004/0268044 A1 | 12/2004 | Heller, Jr. et al. | |
| 2005/0002334 A1 | 1/2005 | Chao et al. | |
| 2005/0044301 A1 | 2/2005 | Vasilevsky et al. | |
| 2005/0073962 A1 | 4/2005 | Zabele et al. | |
| 2005/0100035 A1 | 5/2005 | Chiou et al. | |
| 2005/0108444 A1 | 5/2005 | Flauaus et al. | |
| 2005/0122955 A1 | 6/2005 | Lin et al. | |
| 2006/0031659 A1 | 2/2006 | Chow | |
| 2006/0047849 A1 | 3/2006 | Mukherjee | |
| 2006/0050690 A1 | 3/2006 | Epps et al. | |
| 2006/0059407 A1 | 3/2006 | Wang et al. | |
| 2006/0080417 A1 | 4/2006 | Boutboul et al. | |
| 2006/0080569 A1 | 4/2006 | Sciacca | |
| 2006/0104303 A1 | 5/2006 | Makineni et al. | |
| 2006/0133282 A1 | 6/2006 | Ramasamy | |
| 2006/0146715 A1 | 7/2006 | Supalov | |
| 2006/0152593 A1 | 7/2006 | Bone et al. | |
| 2006/0168317 A1 | 7/2006 | Charzinski et al. | |
| 2006/0200278 A1 | 9/2006 | Feintuch | |
| 2006/0223524 A1 | 10/2006 | Ginzburg | |
| 2007/0014276 A1 | 1/2007 | Bettink et al. | |
| 2007/0035033 A1 | 2/2007 | Ozguz et al. | |
| 2007/0038987 A1 | 2/2007 | Ohara et al. | |
| 2007/0041326 A1 | 2/2007 | Babiarz et al. | |
| 2007/0047453 A1 | 3/2007 | Bender et al. | |
| 2007/0053300 A1 | 3/2007 | Zhu et al. | |
| 2007/0061811 A1 | 3/2007 | Rumelhart et al. | |
| 2007/0064737 A1 | 3/2007 | Williams | |
| 2007/0081516 A1 | 4/2007 | Arimilli et al. | |
| 2007/0088933 A1 | 4/2007 | Kelley | |
| 2007/0097952 A1 | 5/2007 | Truschin et al. | |
| 2007/0110079 A1 | 5/2007 | Schollmeier et al. | |
| 2007/0121618 A1 | 5/2007 | Hirano | |
| 2007/0127386 A1 * | 6/2007 | Joshi et al. | 370/252 |
| 2007/0165524 A1 | 7/2007 | Mascolo | |
| 2007/0183421 A1 | 8/2007 | Terrell et al. | |
| 2007/0192650 A1 | 8/2007 | Shiota | |
| 2007/0226686 A1 | 9/2007 | Beardslee et al. | |
| 2008/0043742 A1 | 2/2008 | Pong et al. | |
| 2008/0080456 A1 * | 4/2008 | Williams | 370/342 |
| 2008/0082933 A1 | 4/2008 | Howard et al. | |
| 2009/0006808 A1 | 1/2009 | Blumrich et al. | |
| 2009/0063443 A1 | 3/2009 | Arimilli et al. | |
| 2009/0063444 A1 | 3/2009 | Arimilli et al. | |
| 2009/0063445 A1 | 3/2009 | Arimilli et al. | |
| 2009/0063728 A1 | 3/2009 | Arimilli et al. | |
| 2009/0063811 A1 | 3/2009 | Arimilli et al. | |
| 2009/0063814 A1 | 3/2009 | Arimilli et al. | |
| 2009/0063815 A1 | 3/2009 | Arimilli et al. | |
| 2009/0063816 A1 | 3/2009 | Arimilli et al. | |
| 2009/0063817 A1 | 3/2009 | Arimilli et al. | |
| 2009/0063880 A1 | 3/2009 | Arimilli et al. | |
| 2009/0063886 A1 | 3/2009 | Arimilli et al. | |
| 2009/0063891 A1 | 3/2009 | Arimilli et al. | |
| 2009/0064139 A1 | 3/2009 | Arimilli et al. | |
| 2009/0064140 A1 | 3/2009 | Arimilli et al. | |
| 2009/0070617 A1 | 3/2009 | Arimilli et al. | |
| 2009/0198956 A1 | 8/2009 | Arimilli et al. | |
| 2009/0198958 A1 | 8/2009 | Arimilli et al. | |

FOREIGN PATENT DOCUMENTS

| | | |
|---|---|---|
| JP | 2000-307624 | 11/2000 |

OTHER PUBLICATIONS

U.S. Appl. No. 11/845,207, filed Aug. 27, 2007, Arimilli et al.
U.S. Appl. No. 11/845,209, filed Aug. 27, 2007, Arimilli et al.
U.S. Appl. No. 11/845,211, filed Aug. 27, 2007, Arimilli et al.
U.S. Appl. No. 11/845,212, filed Aug. 27, 2007, Arimilli et al.
U.S. Appl. No. 11/845,213, filed Aug. 27, 2007, Arimilli et al.
U.S. Appl. No. 11/845,215, filed Aug. 27, 2007, Arimilli et al.
U.S. Appl. No. 11/845,217, filed Aug. 27, 2007, Arimilli et al.
U.S. Appl. No. 11/845,221, filed Aug. 27, 2007, Arimilli et al.
U.S. Appl. No. 11/845,223, filed Aug. 27, 2007, Arimilli et al.
U.S. Appl. No. 11/845,224, filed Aug. 27, 2007, Arimilli et al.
U.S. Appl. No. 11/845,225, filed Aug. 27, 2007, Arimilli et al.
U.S. Appl. No. 11/845,227, filed Aug. 27, 2007, Arimilli et al.
U.S. Appl. No. 11/848,440, filed Aug. 31, 2007, Arimilli et al.
U.S. Appl. No. 11/853,522, filed Sep. 11, 2007, Arimilli et al.
Cheriton, David R., "Sirpent: A High-Performance Internetworking Approach", ACM, 1989, pp. 158-169.
Ramasubramanian et al., "SHARP: A Hybrid Adaptive Routing Protocol for Mobile Ad Hoc Networks", ACM, MobiHoc'03, Jun. 1-3, 2003, pp. 303-314.
Kodialam et al., "Dynamic Routing of Restorable Bandwidth-Guaranteed Tunnels Using Aggregated Network Resource Usage Information", IEEE/ACM Transactions on Networking, vol. 11, No. 3, Jun. 2003, pp. 399-410.
Li et al., "PANDA: A novel mechanism for flooding based route discovery in ad hoc networks", Wireless Netw (2006) 12:771-787, COI 10.1007/s11276-006-1324-3, pp. 771-787.
Juan Li, "ECSP: An Efficient Clustered Super-Peer Architecture for P2P Networks", Thesis, Master of Science, The University of British Columbia, Aug. 2003, 82 pages.
Traff, Jesper Larsson, "SMP-Aware Message Passing Programming", IPDPS2003 Proceedings, IEEE, 2003, 10 pages.
De Rybel et al., "OVNI-NET: A flexible cluster interconnect for the new OVNI Real-Time simulator", 15th PSCC, Liege, Session 38, Paper 2, Aug. 22-26, 2005, pp. 1-6.
Iyer et al., "Design and Evaluation of a Switch Cache Architecture for CC-NUMA Multiprocessors", IEEE Transactions on Computers, http://www.citeseer.ist.psu.edu/297975.html, v49, n8, 2000, pp. 779-797.
Alouneh et al., "A Novel Approach for Fault Tolerance in MPLS Networks", IEEE, Innovations in Information Technology, Nov. 2006, pp. 1-5.
Li et al., "Investigation of the Performance of GAFT, A Novel Network Anomaly Fault Detection System", Proceedings of the 27th Annual IEEE Conference on Local Computer Networks (LCN'02), Nov. 6-8, 2002, pp. 249-258.
"Fault-Tolerant Routing Algorithm for a Hypercube", IBM Technical Disclosure Bulletin, vol. 34, No. 12, May 1992, pp. 260-262.
"Traffic Redirection Technique in Multi-Speed Network Design", IBM Technical Disclosure Bulletin, vol. 34, No. 6, Nov. 1991, pp. 371-374.
McDonald, Bruce A., "Survey of Adaptive Shortest-Path Routing in Dynamic Packet-Switched Networks", Department of Information Science and Telecommunications at the University of Pittsburgh, Apr. 24, 1997, pp. 1-29.
Peng et al., "Intelligent routing protocol for ad hoc wireless network", Proceedings of the SPIE—The International Society for Optical Engineering, vol. 6248, No. 1, 62480R-621-12, 2006, 2 pages.
U.S. Appl. No. 11/845,209.
U.S. Appl. No. 11/845,212.
U.S. Appl. No. 11/845,213.
U.S. Appl. No. 12/024,553.
U.S. Appl. No. 12/024,662.
Final Office Action mailed Mar. 24, 2010 for U.S. Appl. No. 11/845,209.
Interview Summary mailed Apr. 23, 2010 for U.S. Appl. No. 11/845,209.
Notice of Allowance mailed Mar. 30, 2010 for U.S. Appl. No. 12/024,553.
Notice of Allowance mailed Mar. 22, 2010 for U.S. Appl. No. 11/845,217.
Notice of Allowance mailed Mar. 23, 2010 for U.S. Appl. No. 11/845,221.
Office Action dated Mar. 29, 2010 for U.S. Appl. No. 11/845,212.
Office Action mailed Mar. 15, 2010 for U.S. Appl. No. 11/845,227.
Office Action mailed Apr. 26, 2010 for U.S. Appl. No. 11/845,206.
Office Action mailed Apr. 26, 2010 for U.S. Appl. No. 11/845,207.
Response to Final Office Action filed Apr. 27, 2010, for USPTO U.S. Appl. No. 11/845,212.
Choplin, Sebastien, "Virtual Path Layout in ATM Path with Given Hop Count", 2001 Springer-verlag Berlin Heidelberg, pp. 527-537.
Hadim, M.B. et al., "The Multi-Level Communication: Efficient Routing for Interconnection Networks", The Journal of Supercomputing, 2001 Kluwer Academic Publishers, pp. 153-177.
Interview Summary mailed Jun. 4, 2010 for U.S. Appl. No. 11/845,227; 4 pages.
Interview Summary mailed Jul. 14, 2010 for U.S. Appl. No. 11/845,206; 11 pages.
Interview Summary mailed Jul. 15, 2010 for U.S. Appl. No. 11/845,207; 11 pages.
Notice of Allowance mailed May 6, 2010 for U.S. Appl. No. 11/845,212; 6 pages.
Notice of Allowance mailed May 20, 2010 for U.S. Appl. No. 11/845,225; 28 pages.
Notice of Allowance mailed Jun. 10, 2010 for U.S. Appl. No. 11/845,209; 12 pages.
Notice of Allowance mailed Jun. 23, 2010 for U.S. Appl. No. 11/848,440; 24 pages.
Notice of Allowance mailed Jul. 14, 2010 for U.S. Appl. No. 11/845,213; 9 pages.
Office Action mailed Apr. 29, 2010 for U.S. Appl. No. 11/845,224; 23 pages.
Office Action mailed Jun. 22, 2010 for U.S. Appl. No. 11/853,522; 23 pages.
Bermond, Jean-Claude et al., "Directed Virtual Path Layouts in ATM networks", 2004, pp. 1-26.
Daliot, Ariel et al., "Self-Stabilizing Pulse Synchronization Inspired by Biological Pacemaker Networks", SSS 2003, LNCS 2704, 2003, pp. 32-48.
Frigui, Hichem et al., "Clustering Based on Synchronization of Pulse-Coupled Oscillators", IEEE, 2000, pp. 128-132.
Padmanabhan, V.N. et al., "Point to Point Communication Using Virtual Channel Flow Control and Wormhole Routing", Indian Institute of Technology, Delhi, May 1993, pp. 1-77.
Platania, Marco, "Clock Synchronization", Sapienza University of Rome, 2009, 66 pages.
Rhouma, Mohamed Ben H. et al., "Self-Organization of Pulse-Coupled Oscillators with Application to Clustering", IEEE, Feb. 2001, vol. 23, No. 2, pp. 180-195.
U.S. Appl. No. 12/024,662, filed Feb. 1, 2008, Arimilli et al.
U.S. Appl. No. 12/024,553, filed Feb. 1, 2008, Arimilli et al.
"BGP Scalability", Cisco Systems, Inc., CCIQ'99 Session 1624, 1999, pp. 1-28.
Gomaa, Mohamed A. et al., "Transient-Fault Recovery for Chip-Multiprocessors", Micro, IEEE, vol. 23, Issue 6, 2003, pp. 76-83.
Martin, Milo M. et al., "Using Destination-Set Prediction to Improve the Latency/Bandwidth Tradeoff in Shared-Memory Multiprocessors", Proceedings of the 30th Annual International Symposium on Computer Architecture, 2003, pp. 206-221.
Moshovos, Andreas, "RegionScout: Exploiting Coarse Grain Sharing in Snoop-Based Coherence", Proceedings of the 32nd International Symposium on Computer Architecture, 2005, pp. 234-245.
Shacham, Assaf et al., "Photonic NoC for DMA Communications in Chip Multiprocessors", 15th Annual IEEE Symposium on High-Performance Interconnects, HOTI 2007, pp. 29-38.
Tung, Cheng-Hsien, "A Scalable Orthogonal Multiprocessor Architecture", Signals, Systems and Computers, 1991 Conference Record of the Twenty-Fifth Asilomar Conference, vol. 1, 1991, pp. 59-63.
Final Office Action mailed Aug. 3, 2010 for U.S. Appl. No. 11/845,227; 39 pages.
Interview Summary mailed Sep. 13, 2010 for U.S. Appl. No. 11/845,227; 4 pages.
Office Action mailed Jun. 22, 2010 for U.S. Appl. No. 11/853,522; 23 pages.

Office Action mailed Jul. 21, 2010 for U.S. Appl. No. 11/845,215; 23 pages.
Office Action mailed Aug. 5, 2010 for U.S. Appl. No. 11/845,223; 45 pages.
Response to Office Action filed with the USPTO on Jul. 26, 2010 for U.S. Appl. No. 11/845,206; 21 pages.
Response to Office Action filed with the USPTO on Jul. 26, 2010 for U.S. Appl. No. 11/845,207; 21 pages.
Response to Office Action filed with the USPTO on Jul. 29, 2010 for U.S. Appl. No. 11/845,224, 13 pages.
Final Office Action mailed Oct. 12, 2010 for U.S. Appl. No. 11/845,206, 33 pages.
Final Office Action mailed Oct. 12, 2010 for U.S. Appl. No. 11/845,207; 32 pages.
Interview Summary mailed Oct. 15, 2010 for U.S. Appl. No. 11/845,215; 3 pages.
Interview Summary mailed Nov. 12, 2010, U.S. Appl. No. 11/845,223, 4 pages.
Notice of Allowance mailed Nov. 4, 2010 for U.S. Appl. No. 11/845,215; 9 pages.
Notice of Allowance mailed Nov. 30, 2010 for U.S. Appl. No. 11/853,522; 8 pages.
Office Action mailed Oct. 6, 2010 for U.S. Appl. No. 11/845,211; 30 pages.
Office Action mailed Oct. 18, 2010 for U.S. Appl. No. 11/845,224; 10 pages.
Response to Final Office Action filed Nov. 3, 2010, U.S. Appl. No. 11/845,227, 27 pages.
Response to Office Action filed Oct. 21, 2010, U.S. Appl. No. 11/845,215, 15 pages.
Response to Office Action filed Nov. 5, 2010, U.S. Appl. No. 11/845,223, 23 pages.
Response to Office Action filed with the USPTO on Sep. 21, 2010 for U.S. Appl. No. 11/853,522, 10 pages.
Notice of Allowance mailed Jan. 24, 2011 for U.S. Appl. No. 11/845,223; 10 pages.
Notice of Allowance mailed Feb. 3, 2011 for U.S. Appl. No. 11/845,224, 8 pages.
Notice of Allowance mailed Feb. 25, 2011 for U.S. Appl. No. 11/845,211; 6 pages.
Response to Final Office Action filed Jan. 12, 2011, U.S. Appl. No. 11/845,206, 23 pages.
Response to Final Office Action filed Jan. 12, 2011, U.S. Appl. No. 11/845,207, 23 pages.
Response to Office Action filed Jan. 6, 2011, U.S. Appl. No. 11/845,211, 11 pages.
Response to Office Action filed Jan. 13, 2011, U.S. Appl. No. 11/845,224, 8 pages.
Interview Summary mailed Sep. 14, 2011 for U.S. Appl. No. 11/845,206; 3 pages.
Notice of Allowance mailed Sep. 15, 2011 for U.S. Appl. No. 11/845,227; 18 pages.
Office Action mailed Jul. 22, 2011 for U.S. Appl. No. 11/845,206; 22 pages.
Office Action mailed Jul. 22, 2011 for U.S. Appl. No. 11/845,207; 19 pages.

* cited by examiner

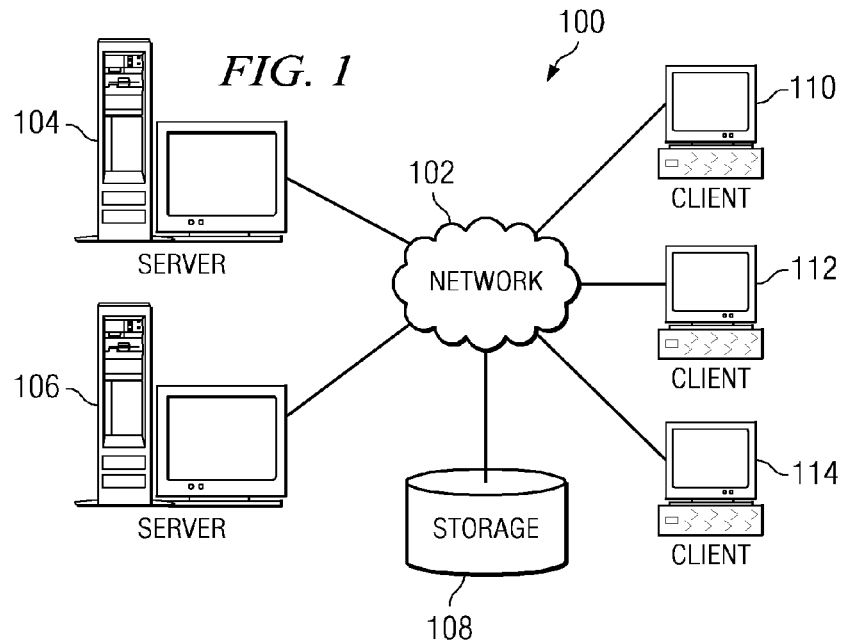
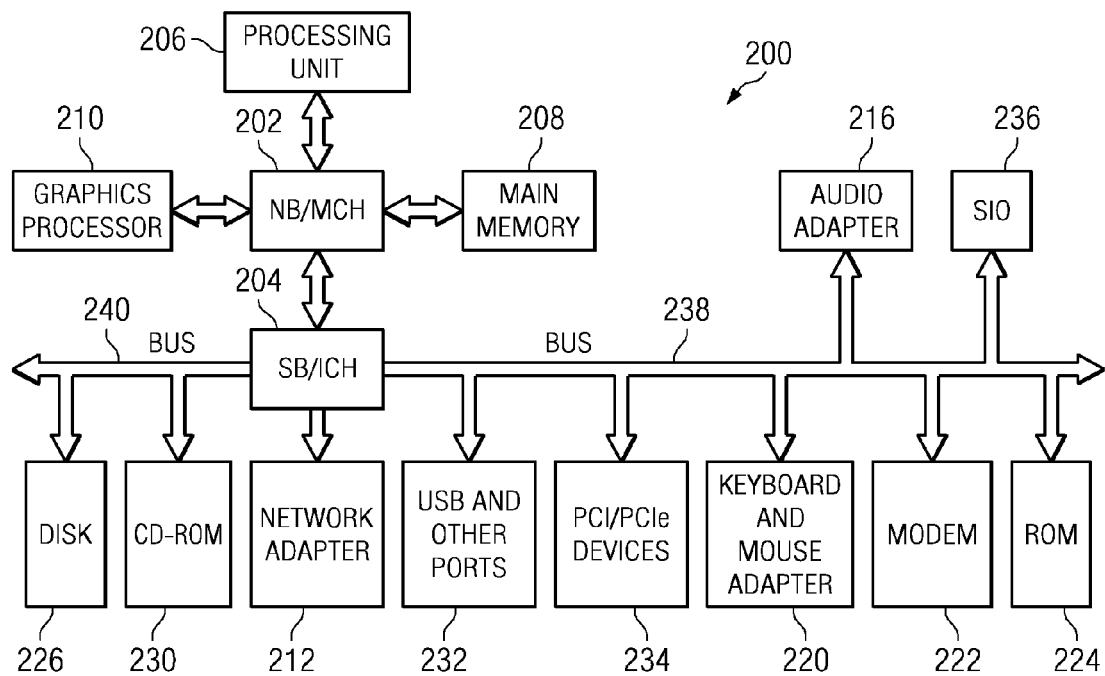

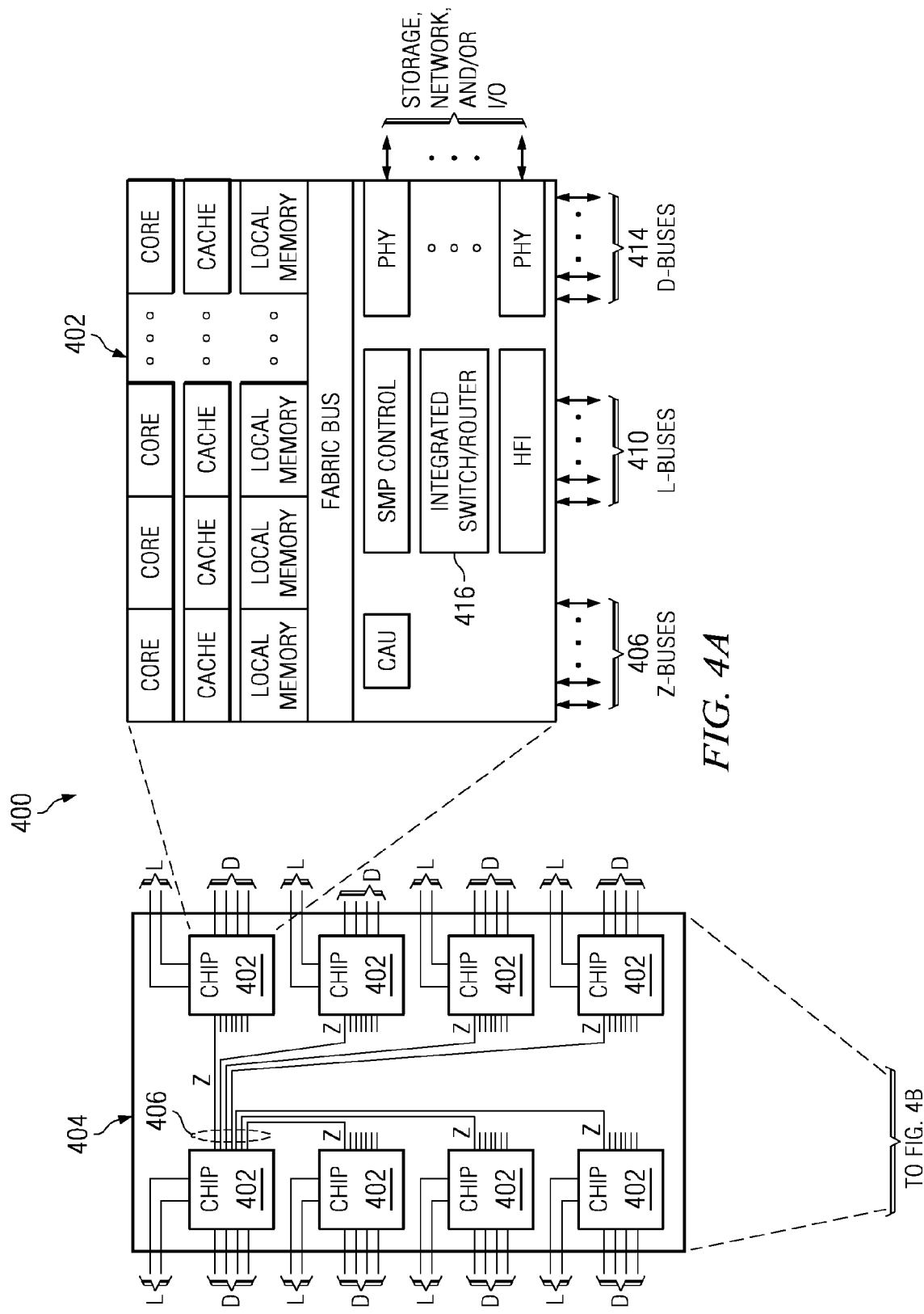

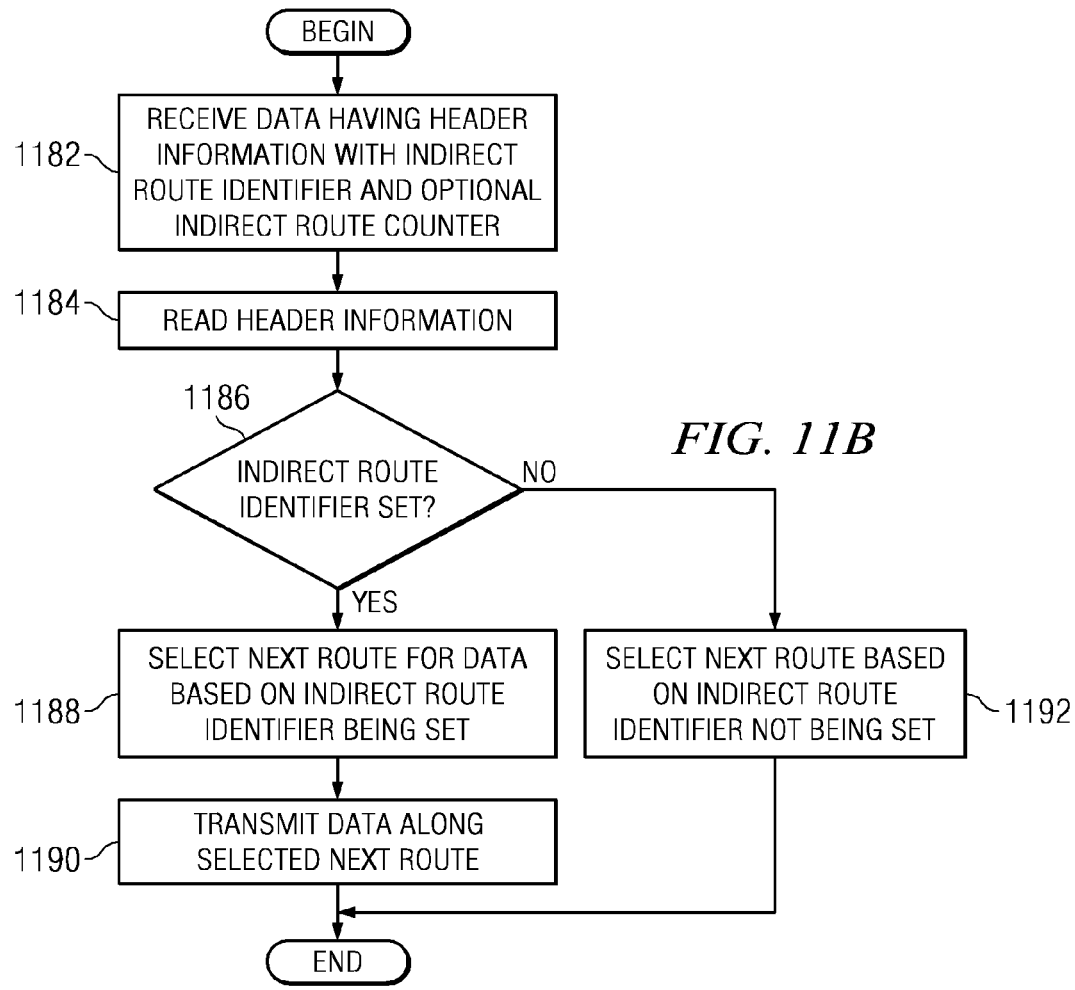

US 8,077,602 B2

PERFORMING DYNAMIC REQUEST ROUTING BASED ON BROADCAST QUEUE DEPTHS

GOVERNMENT RIGHTS

This invention was made with United States Government support under Agreement No. HR0011-07-9-0002 awarded by DARPA. THE GOVERNMENT HAS CERTAIN RIGHTS IN THE INVENTION.

BACKGROUND

1. Technical Field

The present application relates generally to an improved data processing system and method. More specifically, the present application is directed to a system and method for performing dynamic request routing based on broadcast queue depths. The system and method may be implemented, for example, in a multi-tiered full-graph interconnect architecture.

2. Description of Related Art

Ongoing advances in distributed multi-processor computer systems have continued to drive improvements in the various technologies used to interconnect processors, as well as their peripheral components. As the speed of processors has increased, the underlying interconnect, intervening logic, and the overhead associated with transferring data to and from the processors have all become increasingly significant factors impacting performance. Performance improvements have been achieved through the use of faster networking technologies (e.g., Gigabit Ethernet), network switch fabrics (e.g., Infiniband, and RapidIO®), TCP offload engines, and zero-copy data transfer techniques (e.g., remote direct memory access). Efforts have also been increasingly focused on improving the speed of host-to-host communications within multi-host systems. Such improvements have been achieved in part through the use of high-speed network and network switch fabric technologies.

One type of multi-processor computer system known in the art is referred to as a "cluster" of data processing systems, or "computing cluster." A computing cluster is a group of tightly coupled computers that work together closely so that in many respects they can be viewed as though they are a single computer. The components of a cluster are commonly, but not always, connected to each other through fast local area networks. Clusters are usually deployed to improve performance and/or availability over that provided by a single computer, while typically being much more cost-effective than single computers of comparable speed or availability.

While computing clusters provide a way for separate computing devices to work in concert with each other, each of the computing devices itself still operates somewhat independently of the other computing devices in the computing cluster and relies upon communication between the computing devices to provide the mechanism for collaborative computing. For example, each computing device still makes routing decisions independently of the other computing devices. Within a cluster, there may be multiple routes for data to take from a source to a destination and generally each computing device only looks at its hop from the current computing device to the next computing device when making routing decisions. This may lead to data being routed to computing devices who themselves may only communicate with overly congested computing devices and thus, may not be the most optimal routing path.

SUMMARY

In one illustrative embodiment, a method, in a data processing system, is provided that comprises receiving, in a first processor chip of the data processing system, a plurality of first heartbeat signals from a plurality of second processor chips coupled to the first processor chip via one or more communication ports. The plurality of first heartbeat signals have first queue depth information associated with respective processor chips of the plurality of second processor chips. The method further comprises storing the first queue depth information in a queue depth information data structure storage of the first processor chip. The method also comprises performing routing of data from the first processor chip to a destination processor chip in the data processing system based on the first queue depth information stored in the queue depth information data structure storage.

Each first heartbeat signal in the plurality of heartbeat signals is a signal broadcast by a corresponding second processor chip to the first processor chip and other second processor chips at a regular interval that is synchronized with a master processor chip through a synchronization process. The first queue depth information for a current second processor chip comprises queue depth information for communication ports of the current second processor chip and queue depth information for communication ports of each of the other second processor chips to which the current second processor chip is directly coupled, queue depth information for communication ports of other processor chips to which the current second processor chip is indirectly coupled and which are present in a same processor book or different processor books of a same supernode, and queue depth information of additional processor chips in other supernodes that are indirectly coupled to the current second processor chip via the other second processor chips in the same processor book and different processor books of the same supernode.

In another illustrative embodiment, a processor chip is provided that comprises at least one processor, a plurality of communication ports for directly coupling the processor chip to a plurality of other processor chips via bus connections, and heartbeat signal generation logic for generating a heartbeat signal broadcasting over the plurality of communication ports to the plurality of other processor chips. The heartbeat signal generation logic transmits queue depth information associated with the plurality of communication ports of the processor chip in the heartbeat signal broadcast over the plurality of communication ports to the plurality of other processor chips.

The heartbeat signal is a signal broadcast by the processor chip to the plurality of other processor chips at a regular interval that is synchronized with a master processor chip through a synchronization process. The queue depth information comprises queue depth information for the communication ports of the current processor chip and queue depth information for communication ports of each of the other processor chips to which the current processor chip is directly coupled, queue depth information for communication ports of other processor chips to which the current processor chip is indirectly coupled and which are present in a same processor book or different processor books of a same supernode, and queue depth information of additional processor chips in other supernodes that are indirectly coupled to the current processor chip via the other processor chips in the same processor book and different processor books of the same supernode.

In yet another illustrative embodiment, a computer program product comprising a computer useable medium having a computer readable program is provided. The computer readable program, when executed in a data processing system, causes the data processing system to perform various ones and combinations of the operations outlined above with regard to the method illustrative embodiment.

In another illustrative embodiment, a system is provided that comprises a plurality of processor chips and a plurality of communication links coupling each processor chip in the plurality of processor chips to at least one other processor chip in the plurality of processor chips via bus connections. Each processor chip in the plurality of processor chips may comprises heartbeat signal generation logic for generating a heartbeat signal for broadcasting over one or more communication links, in the plurality of communication links, coupled to the processor chip. The heartbeat signal generation logic may transmit queue depth information, associated with the one or more communication links, in the heartbeat signal broadcast over the one or more communication links to the plurality of other processor chips.

The heartbeat signal is a signal broadcast by the processor chip to the plurality of other processor chips at a regular interval that is synchronized with a master processor chip through a synchronization process. The queue depth information comprises queue depth information for the communication ports of the current processor chip and queue depth information for communication ports of each of the other processor chips to which the current processor chip is directly coupled, queue depth information for communication ports of other processor chips to which the current processor chip is indirectly coupled and which are present in a same processor book or different processor books of a same supernode, and queue depth information of additional processor chips in other supernodes that are indirectly coupled to the current processor chip via the other processor chips in the same processor book and different processor books of the same supernode.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is an exemplary representation of an exemplary distributed data processing system in which aspects of the illustrative embodiments may be implemented;

FIG. 2 is a block diagram of an exemplary data processing system in which aspects of the illustrative embodiments may be implemented;

FIGS. 4A and 4B depict an example of such a multi-tiered full-graph interconnect architecture in accordance with one illustrative embodiment;

FIG. 11B is a flowchart outlining an exemplary operation for selecting a route based on whether or not the data has been previously routed through an indirect route to the current processor, in accordance with one illustrative embodiment;

FIG. 13 depicts an exemplary supernode routing table data structure that supports dynamic selection of routing within a multi-tiered full-graph interconnect architecture using no-direct and no-indirect fields in accordance with one illustrative embodiment;

DETAILED DESCRIPTION OF THE ILLUSTRATIVE EMBODIMENTS

Figure 3:
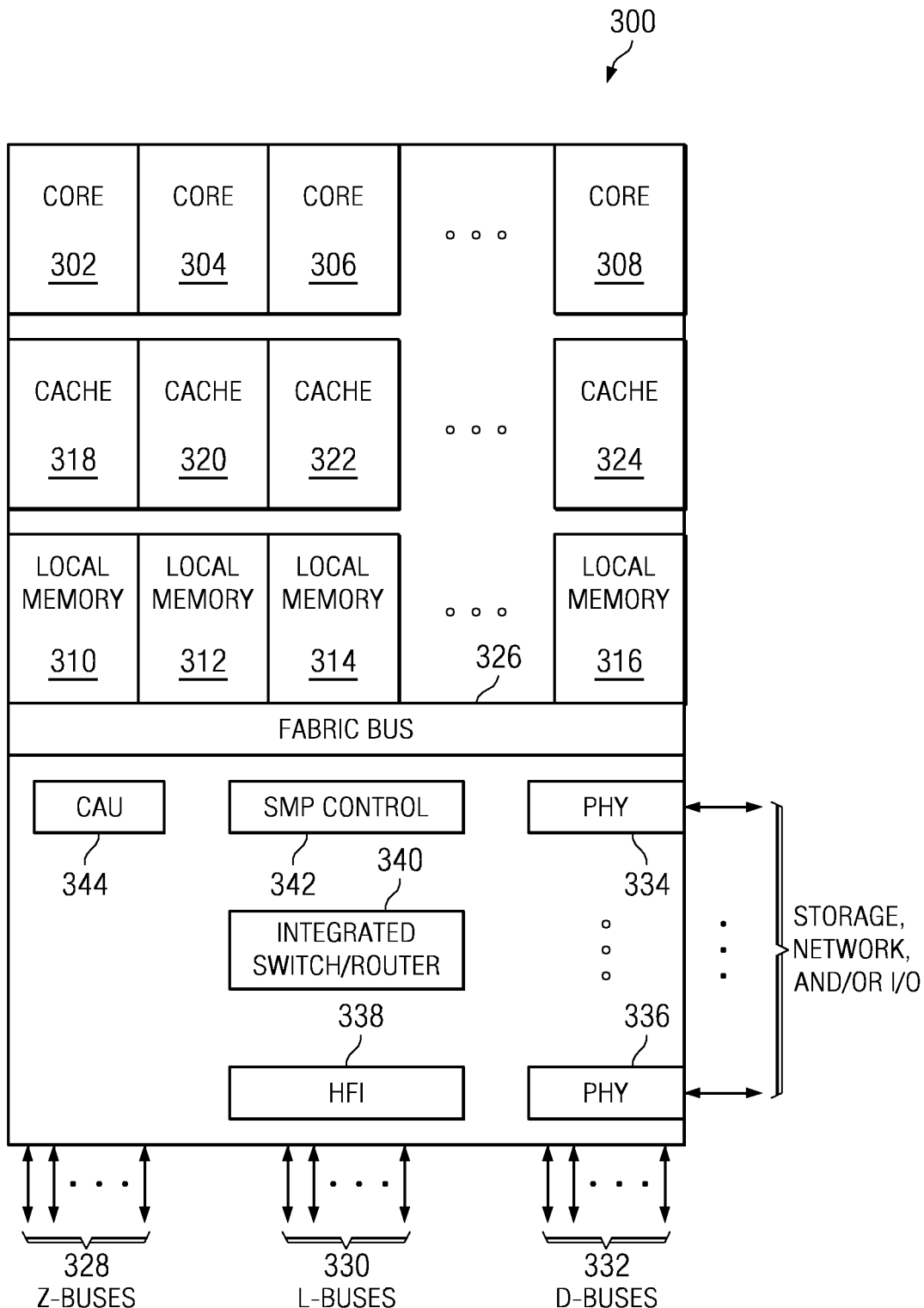
FIG. 3 depicts an exemplary logical view of a processor chip, which may be a "node" in the multi-tiered full-graph interconnect architecture, in accordance with one illustrative embodiment.

The illustrative embodiments provide an architecture and mechanisms for facilitating communication between processors, or nodes, collections of nodes, and supernodes. Furthermore, the illustrative embodiments provide routing mechanisms for routing communications directly or indirectly through the architecture and mechanisms for dynamic selection of indirect and/or direct routes through the architecture. Moreover, the illustrative embodiments provide mechanisms for providing broadcasts of queue depth information between a plurality of processor chips in the same or different collections of processors on the same or different supernodes of the architecture. The broadcasts of queue depth information may be used by the mechanisms of the illustrative embodiments to facilitate routing decisions for transmitting data between a source processor chip and a destination processor chip.

As such, the mechanisms of the illustrative embodiments are especially well suited for implementation within a distributed data processing environment and within, or in association with, data processing devices, such as servers, client devices, and the like. In order to provide a context for the description of the mechanisms of the illustrative embodiments, FIGS. 1-2 are provided hereafter as examples of a distributed data processing system, or environment, and a data processing device, in which, or with which, the mechanisms of the illustrative embodiments may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p™ computer system, running the Advanced Interactive Executive (AIX®) operating system or the LINUX® operating system (eServer, System p™ and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors, such as the POWER™ processor available from International Business Machines Corporation of Armonk, N.Y., in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide a highly-configurable, scalable system that integrates computing, storage, networking, and software. The illustrative embodiments provide for a multi-tiered full-graph interconnect architecture that improves communication performance for parallel or distributed programs and improves the productivity of the programmer and system. The architecture is comprised of a plurality of processors or nodes, that are associated with one another as a collection referred to as processor "books." A processor "book" may be defined as a collection of processor chips having local connections for direct communication between the processors. A processor "book" may further contain physical memory cards, one or more I/O hub cards, and the like. The processor "books" are in turn in communication with one another via a first set of direct connections such that a collection of processor books with such direct connections is referred to as a "supernode." Supernodes may then be in communication with one another via external communication links between the supernodes. With such an architecture, and the additional mechanisms of the illustrative embodiments described hereafter, a multi-tiered full-graph interconnect is provided in which maximum bandwidth is provided to each of the processors or nodes, such that enhanced performance of parallel or distributed programs is achieved.

FIG. 3 depicts an exemplary logical view of a processor chip, which may be a "node" in the multi-tiered full-graph interconnect architecture, in accordance with one illustrative embodiment. Processor chip 300 may be a processor chip such as processing unit 206 of FIG. 2. Processor chip 300 may be logically separated into the following functional components: homogeneous processor cores 302, 304, 306, and 308, and local memory 310, 312, 314, and 316. Although processor cores 302, 304, 306, and 308 and local memory 310, 312, 314, and 316 are shown by example, any type and number of processor cores and local memory may be supported in processor chip 300.

Processor chip 300 may be a system-on-a-chip such that each of the elements depicted in FIG. 3 may be provided on a single microprocessor chip. Moreover, in an alternative embodiment processor chip 300 may be a heterogeneous processing environment in which each of processor cores 302, 304, 306, and 308 may execute different instructions from each of the other processor cores in the system. Moreover, the instruction set for processor cores 302, 304, 306, and 308 may be different from other processor cores, that is, one processor core may execute Reduced Instruction Set Computer (RISC) based instructions while other processor cores execute vectorized instructions. Each of processor cores 302, 304, 306, and 308 in processor chip 300 may also include an associated one of cache 318, 320, 322, or 324 for core storage.

Processor chip 300 may also include an integrated interconnect system indicated as Z-buses 328, L-buses 330, and D-buses 332. Z-buses 328, L-buses 330, and D-buses 332 provide interconnection to other processor chips in a three-tier complete graph structure, which will be described in detail below. The integrated switching and routing provided by interconnecting processor chips using Z-buses 328, L-buses 330, and D-buses 332 allow for network communications to devices using communication protocols, such as a message passing interface (MPI) or an internet protocol (IP), or using communication paradigms, such as global shared memory, to devices, such as storage, and the like.

Additionally, processor chip 300 implements fabric bus 326 and other I/O structures to facilitate on-chip and external data flow. Fabric bus 326 serves as the primary on-chip bus for processor cores 302, 304, 306, and 308. In addition, fabric bus 326 interfaces to other on-chip interface controllers that are dedicated to off-chip accesses. The on-chip interface controllers may be physical interface macros (PHYs) 334 and 336 that support multiple high-bandwidth interfaces, such as PCIx, Ethernet, memory, storage, and the like. Although PHYs 334 and 336 are shown by example, any type and number of PHYs may be supported in processor chip 300. The specific interface provided by PHY 334 or 336 is selectable, where the other interfaces provided by PHY 334 or 336 are disabled once the specific interface is selected.

Processor chip 300 may also include host fabric interface (HFI) 338 and integrated switch/router (ISR) 340. HFI 338 and ISR 340 comprise a high-performance communication subsystem for an interconnect network, such as network 102 of FIG. 1. Integrating HFI 338 and ISR 340 into processor chip 300 may significantly reduce communication latency and improve performance of parallel applications by drastically reducing adapter overhead. Alternatively, due to various chip integration considerations (such as space and area constraints), HFI 338 and ISR 340 may be located on a separate chip that is connected to the processor chip. HFI 338 and ISR 340 may also be shared by multiple processor chips, permitting a lower cost implementation. Processor chip 300 may also include symmetric multiprocessing (SMP) control 342 and collective acceleration unit (CAU) 344. Alternatively, these SMP control 342 and CAU 344 may also be located on a separate chip that is connected to processor chip 300. SMP control 342 may provide fast performance by making multiple cores available to complete individual processes simultaneously, also known as multiprocessing. Unlike asymmetrical processing, SMP control 342 may assign any idle processor core 302, 304, 306, or 308 to any task and add additional ones of processor core 302, 304, 306, or 308 to improve performance and handle increased loads. CAU 344 controls the implementation of collective operations (collectives), which may encompass a wide range of possible algorithms, topologies, methods, and the like.

HFI 338 acts as the gateway to the interconnect network. In particular, processor core 302, 304, 306, or 308 may access HFI 338 over fabric bus 326 and request HFI 338 to send messages over the interconnect network. HFI 338 composes the message into packets that may be sent over the interconnect network, by adding routing header and other information to the packets. ISR 340 acts as a router in the interconnect network. ISR 340 performs three functions: ISR 340 accepts network packets from HFI 338 that are bound to other destinations, ISR 340 provides HFI 338 with network packets that are bound to be processed by one of processor cores 302, 304, 306, and 308, and ISR 340 routes packets from any of Z-buses 328, L-buses 330, or D-buses 332 to any of Z-buses 328, L-buses 330, or D-buses 332. CAU 344 improves the system performance and the performance of collective operations by carrying out collective operations within the interconnect network, as collective communication packets are sent through the interconnect network. More details on each of these units will be provided further along in this application.

By directly connecting HFI 338 to fabric bus 326, by performing routing operations in an integrated manner through ISR 340, and by accelerating collective operations through CAU 344, processor chip 300 eliminates much of the interconnect protocol overheads and provides applications with improved efficiency, bandwidth, and latency.

It should be appreciated that processor chip 300 shown in FIG. 3 is only exemplary of a processor chip which may be used with the architecture and mechanisms of the illustrative embodiments. Those of ordinary skill in the art are well aware that there are a plethora of different processor chip designs currently available, all of which cannot be detailed herein. Suffice it to say that the mechanisms of the illustrative embodiments are not limited to any one type of processor chip design or arrangement and the illustrative embodiments may be used with any processor chip currently available or which may be developed in the future. FIG. 3 is not intended to be limiting of the scope of the illustrative embodiments but is only provided as exemplary of one type of processor chip that may be used with the mechanisms of the illustrative embodiments.

As mentioned above, in accordance with the illustrative embodiments, processor chips, such as processor chip 300 in FIG. 3, may be arranged in processor "books," which in turn may be collected into "supernodes." Thus, the basic building block of the architecture of the illustrative embodiments is the processor chip, or node. This basic building block is then arranged using various local and external communication connections into collections of processor books and supernodes. Local direct communication connections between processor chips designate a processor book. Another set of direct communication connections between processor chips enable communication with processor chips in other books. A fully connected group of processor books is called a supernode. In a supernode, there exists a direct communication connection between the processor chips in a particular book to processor chips in every other book. Thereafter, yet another different set of direct communication connections between processor chips enables communication to processor chips in other supernodes. The collection of processor chips, processor books, supernodes, and their various communication connections or links gives rise to the multi-tiered full-graph interconnect architecture of the illustrative embodiments.

Figure 4B:
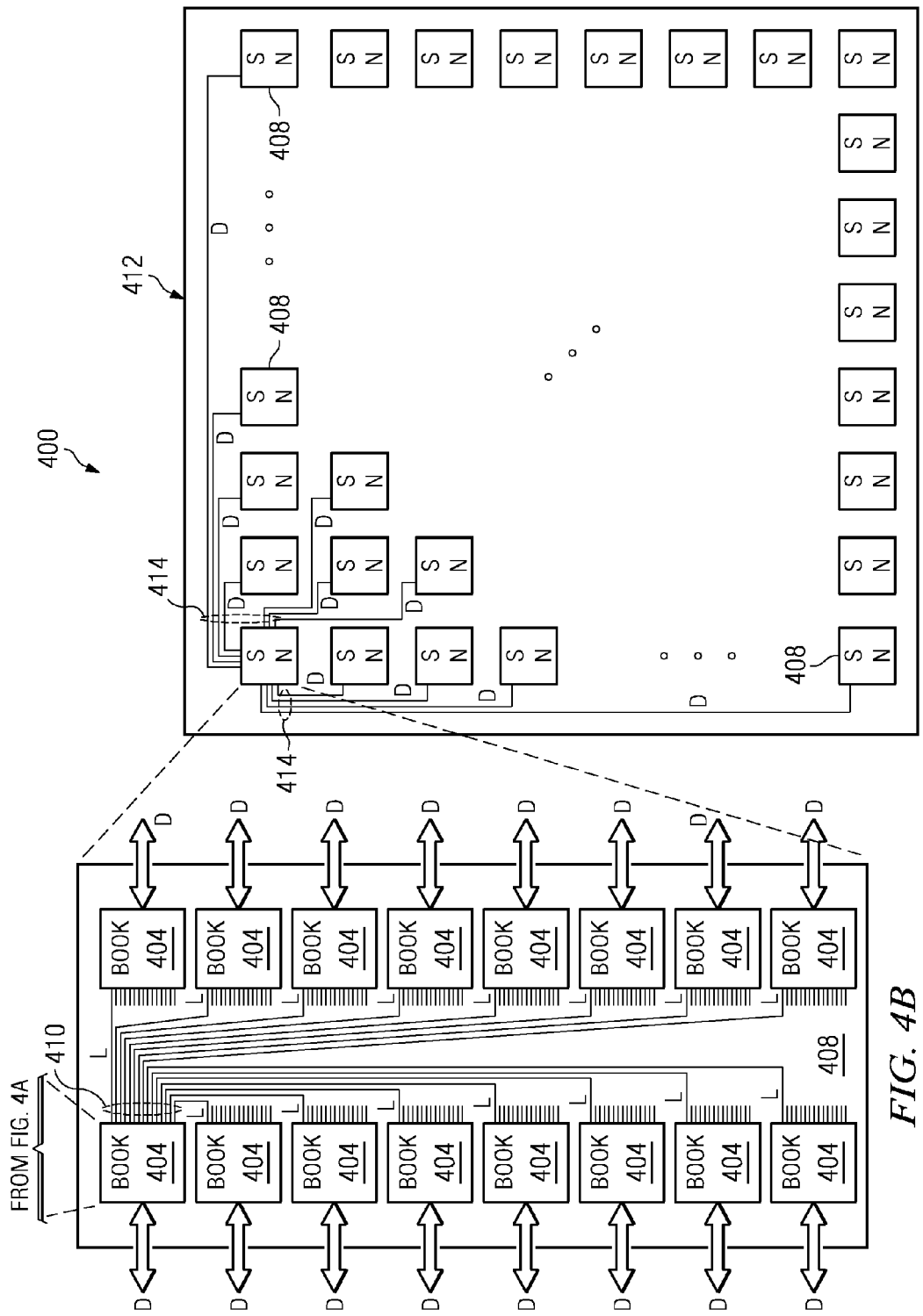

FIGS. 4A and 4B depict an example of such a multi-tiered full-graph interconnect architecture in accordance with one illustrative embodiment. In a data communication topology 400, processor chips 402, which again may each be a processor chip 300 of FIG. 3, for example, is the main building block. In this example, a plurality of processor chips 402 may be used and provided with local direct communication links to create processor book 404. In the depicted example, eight processor chips 402 are combined into processor book 404, although this is only exemplary and other numbers of processor chips, including only one processor chip, may be used to designate a processor book without departing from the spirit and scope of the present invention. For example, any power of 2 number of processor chips may be used to designate a processor book. In the context of the present invention, a "direct" communication connection or link means that the particular element, e.g., a processor chip, may communicate data with another element without having to pass through an intermediary element. Thus, an "indirect" communication connection or link means that the data is passed through at least one intermediary element before reaching a destination element.

In processor book 404, each of the eight processor chips 402 may be directly connected to the other seven processor chips 402 via a bus, herein referred to as "Z-buses" 406 for identification purposes. FIG. 4A indicates unidirectional Z-buses 406 connecting from only one of processor chips 402 for simplicity. However, it should be appreciated that Z-buses 406 may be bidirectional and that each of processor chips 402 may have Z-buses 406 connecting them to each of the other processor chips 402 within the same processor book. Each of Z-buses 406 may operate in a base mode where the bus operates as a network interface bus, or as a cache coherent symmetric multiprocessing (SMP) bus enabling processor book 404 to operate as a 64-way (8 chips/book×8-way/chip) SMP node. The terms "8-way," "64-way", and the like, refer to the number of communication pathways a particular element has with other elements. Thus, an 8-way processor chip has 8 communication connections with other processor chips. A 64-way processor book has 8 processor chips that each have 8 communication connections and thus, there are 8×8 communication pathways. It should be appreciated that this is only exemplary and that other modes of operation for Z-buses 406 may be used without departing from the spirit and scope of the present invention.

As depicted, a plurality of processor books 404, e.g., sixteen in the depicted example, may be used to create supernode (SN) 408. In the depicted SN 408, each of the sixteen processor books 404 may be directly connected to the other fifteen processor books 404 via buses, which are referred to herein as "L-buses" 410 for identification purposes. FIG. 4B indicates unidirectional L-buses 410 connecting from only one of processor books 404 for simplicity. However, it should be appreciated that L-buses 410 may be bidirectional and that each of processor books 404 may have L-buses 410 connecting them to each of the other processor books 404 within the same supernode. L-buses 410 may be configured such that they are not cache coherent, i.e. L-buses 410 may not be configured to implement mechanisms for maintaining the coherency, or consistency, of caches associated with processor books 404.

It should be appreciated that, depending on the symmetric multiprocessor (SMP) configuration selected, SN 408 may have various SMP communication connections with other SNs. For example, in one illustrative embodiment, the SMP configuration may be set to either be a collection of 128 8-way SMP supernodes (SNs) or 16 64-way SMP supernodes. Other SMP configurations may be used without departing from the spirit and scope of the present invention.

In addition to the above, in the depicted example, a plurality of SNs 408 may be used to create multi-tiered full-graph (MTFG) interconnect architecture network 412. In the depicted example, 512 SNs are connected via external communication connections (the term "external" referring to communication connections that are not within a collection of elements but between collections of elements) to generate MTFG interconnect architecture network 412. While 512 SNs are depicted, it should be appreciated that other numbers of SNs may be provided with communication connections between each other to generate a MTFG without departing from the spirit and scope of the present invention.

In MTFG interconnect architecture network 412, each of the 512 SNs 408 may be directly connected to the other 511 SNs 408 via buses, referred to herein as "D-buses" 414 for identification purposes. FIG. 4B indicates unidirectional D-buses 414 connecting from only one of SNs 408 for simplicity. However, it should be appreciated that D-buses 414 may be bidirectional and that each of SNs 408 may have D-buses 414 connecting them to each of the other SNs 408 within the same MTFG interconnect architecture network 412. D-buses 414, like L-buses 410, may be configured such that they are not cache coherent.

Again, while the depicted example uses eight processor chips 402 per processor book 404, sixteen processor books 404 per SN 408, and 512 SNs 408 per MTFG interconnect architecture network 412, the illustrative embodiments recognize that a processor book may again contain other numbers of processor chips, a supernode may contain other numbers of processor books, and a MTFG interconnect architecture network may contain other numbers of supernodes. Furthermore, while the depicted example considers only Z-buses 406 as being cache coherent, the illustrative embodiments recognize that L-buses 410 and D-buses 414 may also be cache coherent without departing from the spirit and scope of the present invention. Furthermore, Z-buses 406 may also be non cache-coherent. Yet again, while the depicted example shows a three-level multi-tiered full-graph interconnect, the illustrative embodiments recognize that multi-tiered full-graph interconnects with different numbers of levels are also possible without departing from the spirit and scope of the present invention. In particular, the number of tiers in the MTFG interconnect architecture could be as few as one or as many as may be implemented. Thus, any number of buses may be used with the mechanisms of the illustrative embodiments. That is, the illustrative embodiments are not limited to requiring Z-buses, D-buses, and L-buses. For example, in an illustrative embodiment, each processor book may be comprised of a single processor chip, thus, only L-buses and D-buses are utilized. The example shown in FIGS. 4A and 4B is only for illustrative purposes and is not intended to state or imply any limitation with regard to the numbers or arrangement of elements other than the general organization of processors into processor books, processor books into supernodes, and supernodes into a MTFG interconnect architecture network.

Taking the above described connection of processor chips 402, processor books 404, and SNs 408 as exemplary of one illustrative embodiment, the interconnection of links between processor chips 402, processor books 404, and SNs 408 may be reduced by at least fifty percent when compared to externally connected networks, i.e. networks in which processors communicate with an external switch in order to communicate with each other, while still providing the same bisection of bandwidth for all communication. Bisection of bandwidth is defined as the minimum bi-directional bandwidths obtained when the multi-tiered full-graph interconnect is bisected in every way possible while maintaining an equal number of nodes in each half. That is, known systems, such as systems that use fat-tree switches, which are external to the processor chip, only provide one connection from a processor chip to the fat-tree switch. Therefore, the communication is limited to the bandwidth of that one connection. In the illustrative embodiments, one of processor chips 402 may use the entire bisection of bandwidth provided through integrated switch/router (ISR) 416, which may be ISR 340 of FIG. 3, for example, to either:

communicate to another processor chip 402 on a same processor book 404 where processor chip 402 resides via Z-buses 406, communicate to another processor chip 402 on a different processor book 404 within a same SN 408 via L-buses 410, or communicate to another processor chip 402 in another processor book 404 in another one of SNs 408 via D-buses 414.

That is, if a communicating parallel "job" being run by one of processor chips 402 hits a communication point, i.e. a point in the processing of a job where communication with another processor chip 402 is required, then processor chip 402 may use any of the processor chip's Z-buses 406, L-buses 410, or D-buses 414 to communicate with another processor as long as the bus is not currently occupied with transferring other data. Thus, by moving the switching capabilities inside the processor chip itself instead of using switches external to the processor chip, the communication bandwidth provided by the multi-tiered full-graph interconnect architecture of data communication topology 400 is made relatively large compared to known systems, such as the fat-tree switch based network which again, only provides a single communication link between the processor and an external switch complex.

Figure 5:
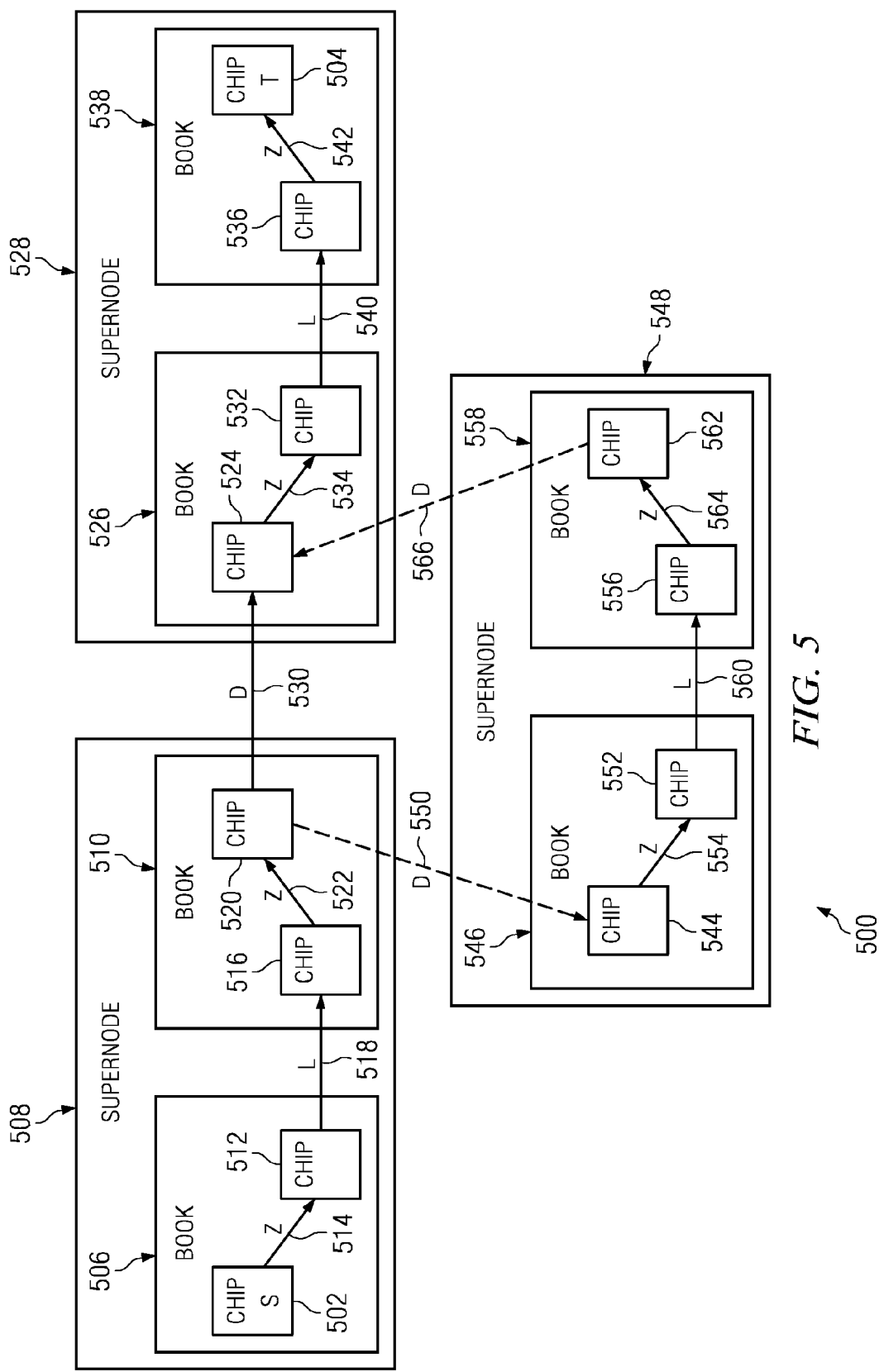
FIG. 5 depicts an example of direct and indirect transmissions of information using a multi-tiered full-graph interconnect architecture in accordance with one illustrative embodiment.

FIG. 5 depicts an example of direct and indirect transmissions of information using a multi-tiered full-graph interconnect architecture in accordance with one illustrative embodiment. It should be appreciated that the term "direct" as it is used herein refers to using a single bus, whether it be a Z-bus, L-bus, or D-bus, to communicate data from a source element (e.g., processor chip, processor book, or supernode), to a destination or target element (e.g., processor chip, processor book, or supernode). Thus, for example, two processor chips in the same processor book have a direct connection using a single Z-bus. Two processor books have a direct connection using a single L-bus. Two supernodes have a direct connection using a single D-bus. The term "indirect" as it is used herein refers to using a plurality of buses, i.e. any combination of Z-buses, L-buses, and/or D-buses, to communicate data from a source element to a destination or target element. The term indirect refers to the usage of a path that is longer than the shortest path between two elements.

FIG. 5 illustrates a direct connection with respect to the D-bus 530 and an indirect connection with regard to D-buses 550 and 556. As shown in the example depicted in FIG. 5, in multi-tiered full-graph (MTFG) interconnect architecture 500, processor chip 502 transmits information, e.g., a data packet or the like, to processor chip 504 via Z-buses, L-buses, and D-buses. For simplicity in illustrating direct and indirect transmissions of information, supernode (SN) 508 is shown to include processor books 506 and 510 for simplicity of the description, while the above illustrative embodiments show that a supernode may include numerous books. Likewise, processor book 506 is shown to include processor chip 502 and processor chip 512 for simplicity of the description, while the above illustrative embodiments indicate that a processor book may include numerous processor chips.

As an example of a direct transmission of information, processor chip 502 initializes the transmission of information to processor chip 504 by first transmitting the information on Z-bus 514 to processor chip 512. Then, processor chip 512 transmits the information to processor chip 516 in processor book 510 via L-bus 518. Processor chip 516 transmits the information to processor chip 520 via Z-bus 522 and processor chip 520 transmits the information to processor chip 524 in processor book 526 of SN 528 via D-bus 530. Once the information arrives in processor chip 524, processor chip 524 transmits the information to processor chip 532 via Z-bus 534. Processor chip 532 transmits the information to processor chip 536 in processor book 538 via L-bus 540. Finally, processor chip 536 transmits the information to processor chip 504 via Z-bus 542. Each of the processor chips, in the path the information follows from processor chip 502 to processor chip 504, determines its own routing using routing table topology that is specific to each processor chip. This direct routing table topology will be described in greater detail hereafter with reference to FIG. 15. Additionally, the exemplary direct path is the longest direct route, with regard to the D-bus, that is possible in the depicted system within the routing scheme of the illustrative embodiments.

As an example of an indirect transmission of information, with regard to the D-buses, processor chip 502 generally transmits the information through processor chips 512 and 516 to processor chip 520 in the same manner as described above with respect to the direct transmission of information. However, if D-bus 530 is not available for transmission of data to processor chip 524, or if the full outgoing interconnect bandwidth from SN 508 were desired to be utilized in the transmission, then processor chip 520 may transmit the information to processor chip 544 in processor book 546 of SN 548 via D-bus 550. Once the information arrives in processor chip 544, processor chip 544 transmits the information to processor chip 552 via Z-bus 554. Processor chip 552 transmits the information to processor chip 556 in processor book 558 via L-bus 560. Processor chip 556 then transmits the information to processor chip 562 via Z-bus 564 and processor chip 562 transmits the information to processor chip 524 via D-bus 566. Once the information arrives in processor chip 524, processor chip 524 transmits the information through processor chips 532 and 536 to processor chip 504 in the same manner as described above with respect to the direct transmission of information. Again, each of the processor chips, in the path the information follows from processor chip 502 to processor chip 504, determines its own routing using routing table topology that is specific to each processor chip. This indirect routing table topology will be described in greater detail hereafter with reference to FIG. 15.

Thus, the exemplary direct and indirect transmission paths provide the most non-limiting routing of information from processor chip 502 to processor chip 504. What is meant by "non-limiting" is that the combination of the direct and indirect transmission paths provide the resources to provide full bandwidth connections for the transmission of data during substantially all times since any degradation of the transmission ability of one path will cause the data to be routed through one of a plurality of other direct or indirect transmission paths to the same destination or target processor chip. Thus, the ability to transmit data is not limited when paths become available due to the alternative paths provided through the use of direct and indirect transmission paths in accordance with the illustrative embodiments.

That is, while there may be only one minimal path available to transmit information from processor chip 502 to processor chip 504, restricting the communication to such a path may constrain the bandwidth available for the two chips to communicate. Indirect paths may be longer than direct paths, but permit any two communicating chips to utilize many more of the paths that exist between them. As the degree of indirectness increases, the extra links provide diminishing returns in terms of useable bandwidth. Thus, while the direct route from processor chip 502 to processor chip 504 shown in FIG. 5 uses only 7 links, the indirect route from processor chip 502 to processor chip 504 shown in FIG. 5 uses 11 links. Furthermore, it will be understood by one skilled in the art that when processor chip 502 has more than one outgoing Z-bus, it could use those to form an indirect route. Similarly, when processor chip 502 has more than one outgoing L-bus, it could use those to form indirect routes.

Thus, through the multi-tiered full-graph interconnect architecture of the illustrative embodiments, multiple direct communication pathways between processors are provided such that the full bandwidth of connections between processors may be made available for communication. Moreover, a large number of redundant, albeit indirect, pathways may be provided between processors for use in the case that a direct pathway is not available, or the full bandwidth of the direct pathway is not available, for communication between the processors.

By organizing the processor chips, processor books, and supernodes in a multi-tiered full-graph arrangement, such redundancy of pathways is made possible. The ability to utilize the various communication pathways between processors is made possible by the integrated switch/router (ISR) of the processor chips which selects a communication link over which information is to be transmitted out of the processor chip. Each of these ISRs, as will be described in greater detail hereafter, stores one or more routing tables that are used to select between communication links based on previous pathways taken by the information to be communicated, current availability of pathways, available bandwidth, and the like. The switching performed by the ISRs of the processor chips of a supernode is performed in a fully non-blocking manner. By "fully non-blocking" what is meant is that it never leaves any potential switching bandwidth unused if possible. If an output link has available capacity and there is a packet waiting on an input link to go to it, the ISR will route the packet if possible. In this manner, potentially as many packets as there are output links get routed from the input links. That is, whenever an output link can accept a packet, the switch will strive to route a waiting packet on an input link to that output link, if that is where the packet needs to be routed. However, there may be many qualifiers for how a switch operates that may limit the amount of usable bandwidth.

Figure 6:
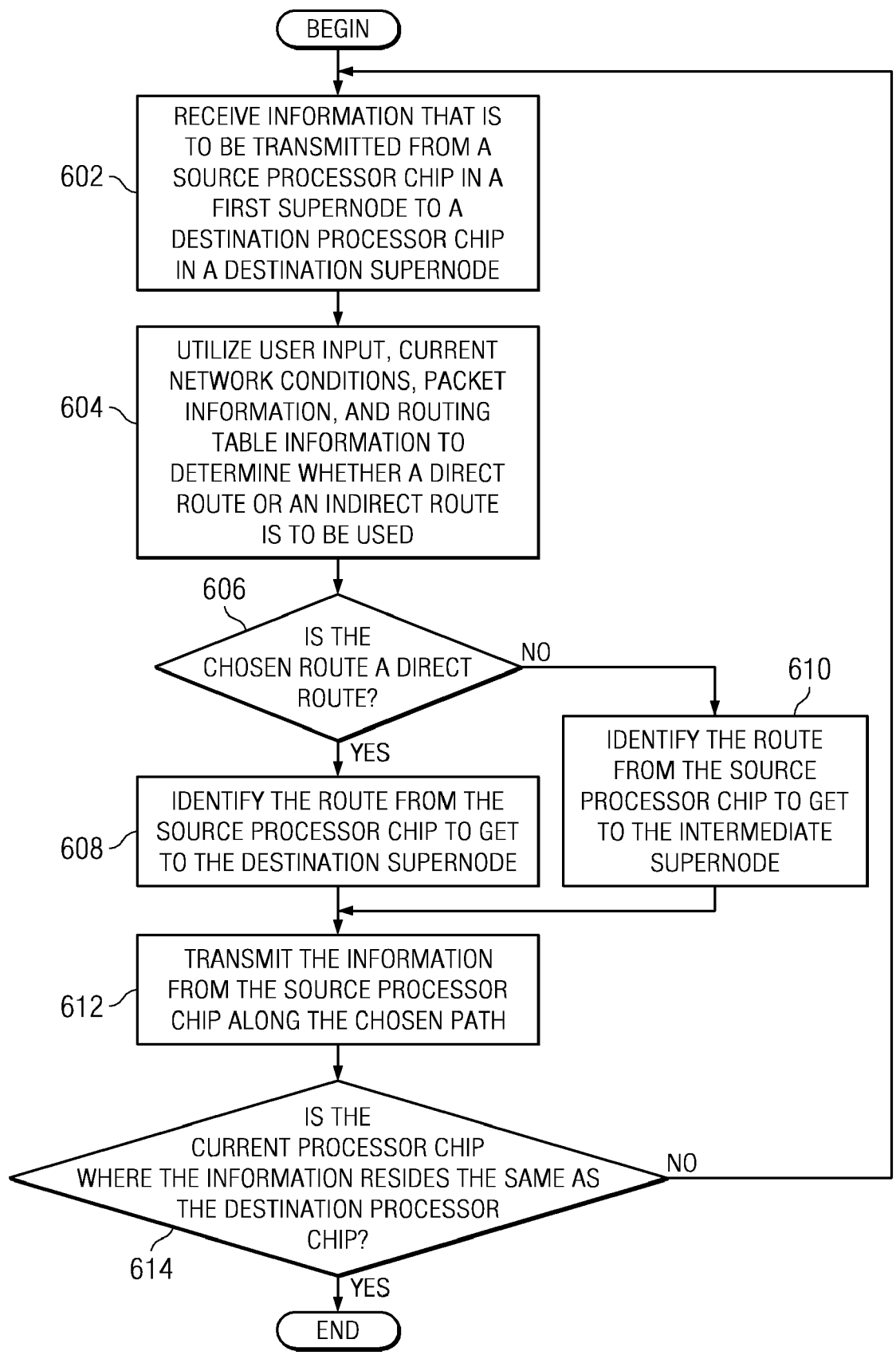
FIG. 6 depicts a flow diagram of the operation performed in the direct and indirect transmissions of information using a multi-tiered full-graph interconnect architecture in accordance with one illustrative embodiment.

FIG. 6 depicts a flow diagram of the operation performed in the direct and indirect transmissions of information using a multi-tiered full-graph interconnect architecture in accordance with one illustrative embodiment. FIGS. 6, 8, 10, 11B, 12, 14A, 14B, 16, 18, 20, and 22 are flowcharts that illustrate the exemplary operations according to the illustrative embodiments. It will be understood that each block of the flowchart illustrations, and combinations of blocks in the flowchart illustrations, may be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

With regard to FIG. 6, the operation begins when a source processor chip, such as processor chip 502 of FIG. 5, in a first supernode receives information, e.g., a data packet or the like, that is to be transmitted to a destination processor chip via buses, such as Z-buses, L-buses, and D-buses (step 602). The integrated switch/router (ISR) that is associated with the source processor chip analyzes user input, current network conditions, packet information, routing tables, or the like, to determine whether to use a direct pathway or an indirect pathway from the source processor chip to the destination processor chip through the multi-tiered full-graph architecture network (step 604). The ISR next checks if a direct path is to be used or if an indirect path is to be used (step 606).

Here, the terms "direct" and "indirect" may be with regard to any one of the buses, Z-bus, L-bus, or D-bus. Thus, if the source and destination processor chips are within the same processor book, a direct path between the processor chips may be made by way of a Z-bus. If the source and destination processor chips are within the same supernode, either a direct path using a single L-bus may be used or an indirect path using one or more Z and L-buses (that is longer than the shortest path connecting the source and destination) may be used. Similarly, if the source and destination processor chips are in separate supernodes, either a direct path using a single D-bus may be used (which may still involve one or more Z and L-buses to get the data out of the source supernode and within the destination supernode to get the data to the destination processor chip) or an indirect path using a plurality of D-paths (where such a path is indirect because it uses more buses than required in the shortest path between the source and the destination) may be used.

If at step 606 a direct pathway is determined to have been chosen to transmit from the source processor chip to the destination processor chip, the ISR identifies the initial component of the direct path to use for transmission of the information from the source processor chip to the destination supernode (step 608). If at step 606 an indirect pathway is determined to have been chosen to transmit from the source processor chip to the destination processor chip, the ISR identifies the initial component of the indirect path to use for transmission of the information from the source processor chip to an intermediate supernode (step 610). From step 608 or 610, the ISR initiates transmission of the information from the source processor chip along the identified direct or indirect pathway (step 612). After the ISR of the source processor chip transmits the data to the last processor chip along the identified path, the ISR of the processor chip where the information resides determines if it is the destination processor chip (step 614). If at step 614 the ISR determines that the processor chip where the information resides is not the destination processor chip, the operation returns to step 602 and may be repeated as necessary to move the information from the point to which it has been transmitted, to the destination processor chip.

If at step 614, the processor chip where the information resides is the destination processor chip, the operation terminates. An example of a direct transmission of information and an indirect transmission of information is shown in FIG. 5 above. Thus, through the multi-tiered full-graph interconnect architecture of the illustrative embodiments, information may be transmitted from a one processor chip to another processor chip using multiple direct and indirect communication pathways between processors.

Figure 7:
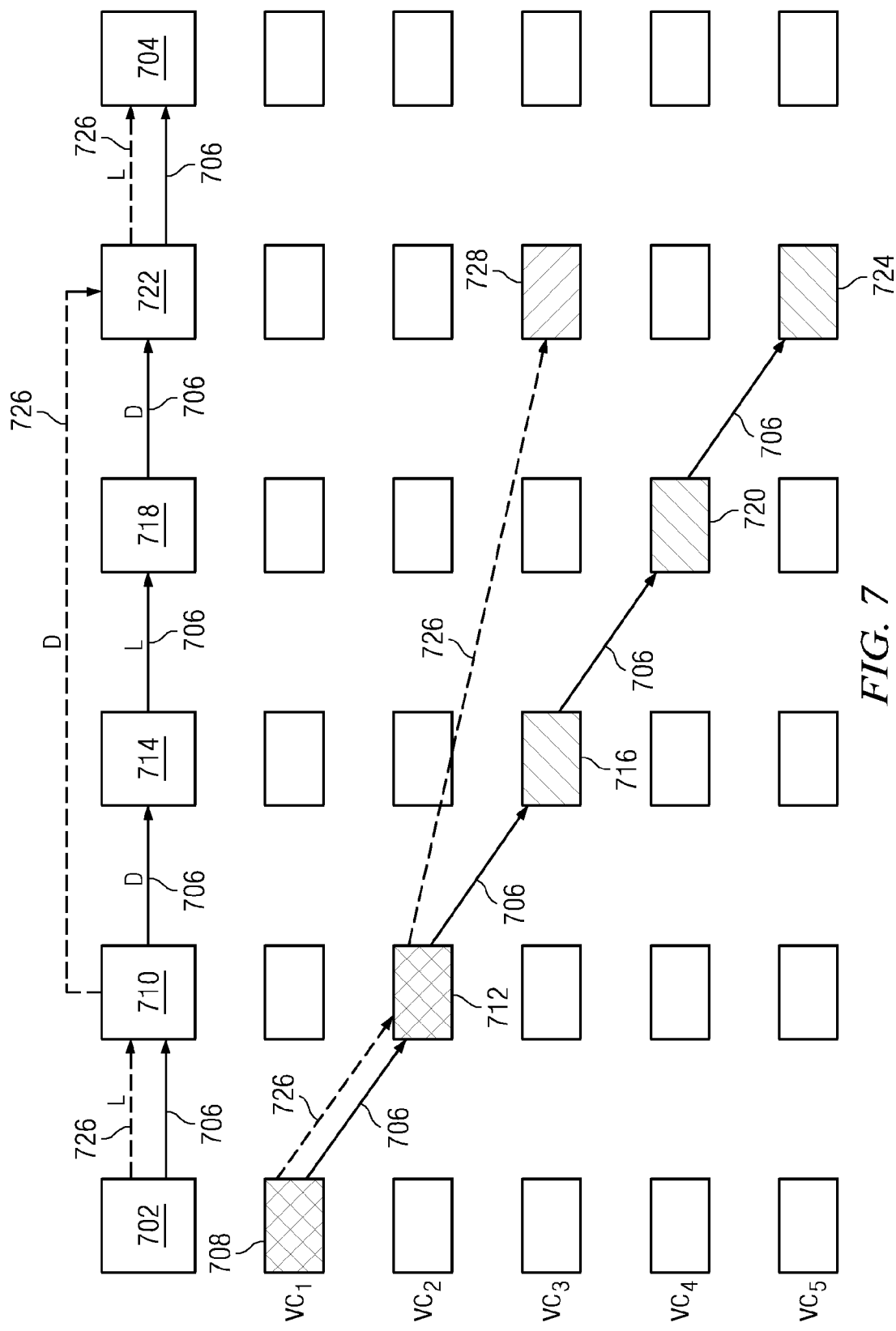
FIG. 7 depicts a fully non-blocking communication of information through a multi-tiered full-graph interconnect architecture network utilizing the integrated switch/routers in the processor chips of the supernode in accordance with one illustrative embodiment.

FIG. 7 depicts a fully non-blocking communication of information through a multi-tiered full-graph interconnect architecture utilizing the integrated switch/routers in the processor chips of the supernode in accordance with one illustrative embodiment. In this example, processor chip 702, which may be an example of processor chip 502 of FIG. 5, for example, transmits information to processor chip 704, which may be processor chip 504 of FIG. 5, for example, via L-buses and D-buses, and processor chips 710-722. For simplicity in illustrating direct and indirect transmissions of information in this example, only the L-buses and D-buses are shown in order to illustrate the routing from a processor chip of one processor book of a supernode to another processor chip of another processor book of another supernode. It should be appreciated that additional routing operations may be performed within a processor book as will be described in greater detail hereafter.

In the depicted example, in order to transmit information from a source processor chip 702 to a destination processor chip 704 through indirect route 706, as in the case of the indirect route (that ignores the Z-buses) shown in FIG. 5, there is a minimum of five virtual channels, $VC_1$, $VC_2$, $VC_3$, $VC_4$, and $VC_5$, in a switch, such as integrated switch/router 340 of FIG. 3, for each processor chip required to transmit the information and provide a fully non-blocking switch system.

The virtual channels may be any type of data structure, such as a buffer, a queue, and the like, that represents a communication connection with another processor chip. The switch provides the virtual channels for each port of the processor chip, allocating one VC for every hop of the longest route in the network. For example, for a processor chip, such as processor chip 402 of FIG. 4A, that has eight Z-buses, four D-buses, and two L-buses, where the longest indirect path is (voluntarily) constrained to be ZLZDZLZDZLZ, the ISR will provide eleven virtual channels for each port for a total of one-hundred and fifty four virtual channels per processor chip. Each of the virtual channels within the ISR are at different levels and each level is used by the specific processor chip based on the position of the specific processor chip within the route the information is taking from a source processor chip to a destination processor chip.

For indirect route 706 transmission, processor chip 702 stores the information in $VC_1$ 708 since processor chip 702 is the source of the information being transmitted. When the information is transmitted from processor chip 702 to processor chip 710, the ISR of processor chip 710 stores the information in $VC_2$ 712 since processor chip 710 is the second "hop" in the path the information is being transmitted. Header information in the data packets or the like, that make up the information being transmitted may maintain hop identification information, e.g., a counter or the like, by which the ISRs of the processor chips may determine in which VC to place the information. Such a counter may be incremented with each hop along indirect route 706. In another alternative embodiment, identifiers of the processor chips that have handled the information during its path from processor chip 702 to processor chip 704 may be added to the header information.

When the information is transmitted from processor chip 710 to processor chip 714, the ISR of processor chip 714 stores the information in $VC_3$ 716. When the information is transmitted from processor chip 714 to processor chip 718, the ISR of processor chip 718 stores the information in $VC_4$ 720. And finally, when the information is transmitted from processor chip 718 to processor chip 722, the ISR of processor chip 722 stores the information in $VC_5$ 724. Then, the information is transmitted from processor chip 722 to processor chip 704 where processor chip 704 processes the information and thus, it is not necessary to maintain the information in a VC data structure.

As an example of direct route transmission, with regard to the D-bus, in order to transmit information from processor chip 702 to processor chip 704 through direct route 726, as in the case of the direct route shown in FIG. 5, three virtual channels $VC_1$, $VC_2$, and $VC_3$ are used to transmit the information and provide a fully non-blocking switch system. For direct route 726 transmission, the ISR of processor chip 702 stores the information in $VC_1$ 708. When the information is transmitted from processor chip 702 to processor chip 710, the ISR of processor chip 710 stores the information in $VC_2$ 712. When the information is transmitted from processor chip 710 to processor chip 722, the ISR of processor chip 722 stores the information in $VC_3$ 728. Then the information is transmitted from processor chip 722 to processor chip 704 where processor chip 704 processes the information and thus, does not maintain the information in a VC data structure.

These principles are codified in the following exemplary pseudocode algorithm that is used to select virtual channels. Here, VCZ, VCD, and VCL represent the virtual channels pre-allocated for the Z, L, and D ports respectively.

```
** VC's are used to prevent deadlocks in the network. **
** 6 VC's are used for Z-ports, 3 VC's are used for L-ports, and 2 VC's
are used for D-ports in this exemplary pseudocode. **
** Exemplary VC selection Algorithm **
    next_Z = next_L = next_D = 0
    for each hop
        if hop is Z
            VCZ = next_Z++
        if hop is L
            next_Z = next_L * 2 + 1
            VCL = next_L++
        if hop is D
            next_Z = next_D * 2 + 2
            next_L = next_D + 1
            VCD = next_D++
```

Thus, the number of virtual channels needed to transmit information from a source processor chip to a destination processor chip is dependent on the number of processor chips in the route from the source processor chip to the destination processor chip. The number of virtual channels that are available for use may be hardcoded in the switch architecture, or may be dynamically allocated up to a maximum pre-determined number of VCs based on an architecture discovery operation, or the like. The number of virtual channels that are provided for in the ISRs determines the maximum hop count of any route in the system. Thus, a MTFG interconnect architecture may require any number of virtual channels per processor chip, such as three, five, seven, nine, or the like. Providing the appropriate amount of virtual channels allows for the most efficient use of a fully bisectional bandwidth network while providing a fully non-blocking switch system.

Additionally, each of the virtual channels must be of sufficient depth, so that, the switch operates in a non-blocking manner. That is, the depth or size of the virtual channels may be dynamically changed by the ISRs so that, if half of the processor chips in the network are transmitting information and half of the processor chips in the network are receiving information, then the ISRs may adjust the depth of each virtual channel such the that network operates in a fully non-blocking manner. Allocating the depth or the size of the virtual channels may be achieved, for example, by statically allocating a minimum number of buffers to each virtual channel and then dynamically allocating the remainder from a common pool of buffers, based on need.

In order to provide communication pathways between processors or nodes, processor books, and supernodes, a plurality of redundant communication links are provided between these elements. These communication links may be provided as any of a number of different types of communication links including optical fibre links, wires, or the like. The redundancy of the communication links permits various reliability functions to be performed so as to ensure continued operation of the MTFG interconnect architecture network even in the event of failures.

Figure 8:
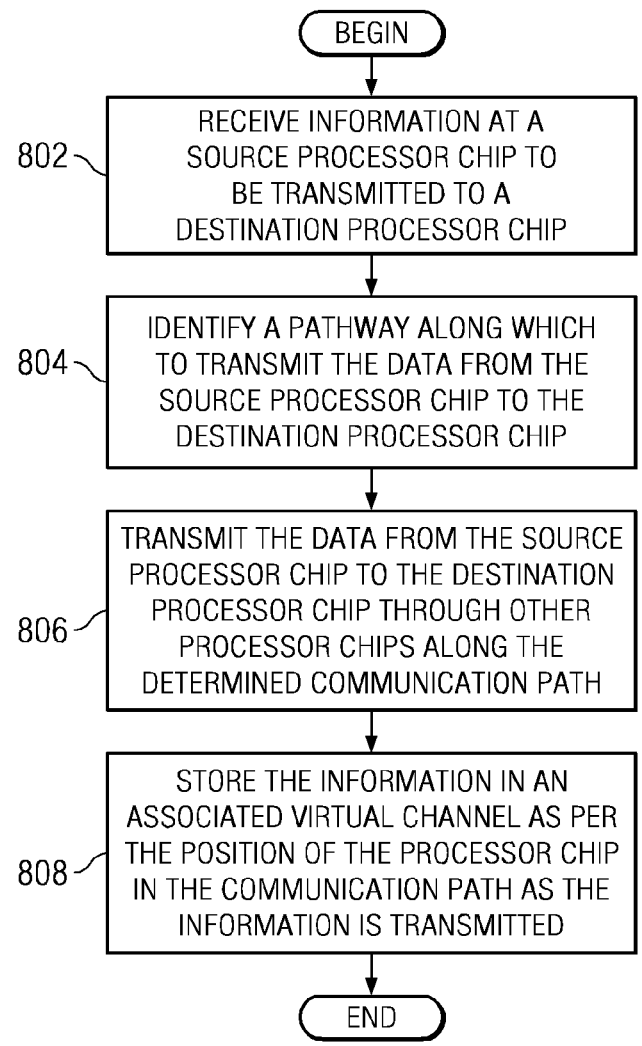
FIG. 8 depicts a flow diagram of the operation performed in the fully non-blocking communication of information through a multi-tiered full-graph interconnect architecture network utilizing the integrated switch/routers (ISRs) in the processor chips of the supernode in accordance with one illustrative embodiment.

FIG. 8 depicts a flow diagram of the operation performed in the fully non-blocking communication of information through a multi-tiered full-graph interconnect architecture utilizing the integrated switch/routers in the processor chips of the supernode in accordance with one illustrative embodiment. As the operation begins, an integrated switch/router (ISR), such as ISR 340 of FIG. 3, of a source processor chip receives information that is to be transmitted to a destination processor chip (step 802). Using the routing tables (e.g., see FIG. 11A described hereafter), each ISR along a route from the source processor chip to the destination processor chip identifies a pathway for transmitting the information from itself to a next processor chip along the pathway (step 804). The ISR(s) then transmit the information along the pathway from the source processor chip to the destination processor chip (step 806). As the information is transmitted along the pathway, each ISR stores the information in the virtual channels that is associated with its position along the pathway from the source processor chip to the destination processor chip until the information arrives at the destination processor chip (step 808), with the operation ending thereafter.

Thus, the number of virtual channels needed to transmit information from a source processor chip to a destination processor chip is dependent on the number of processor chips in the route from the source processor chip to the destination processor chip.

Figure 9:
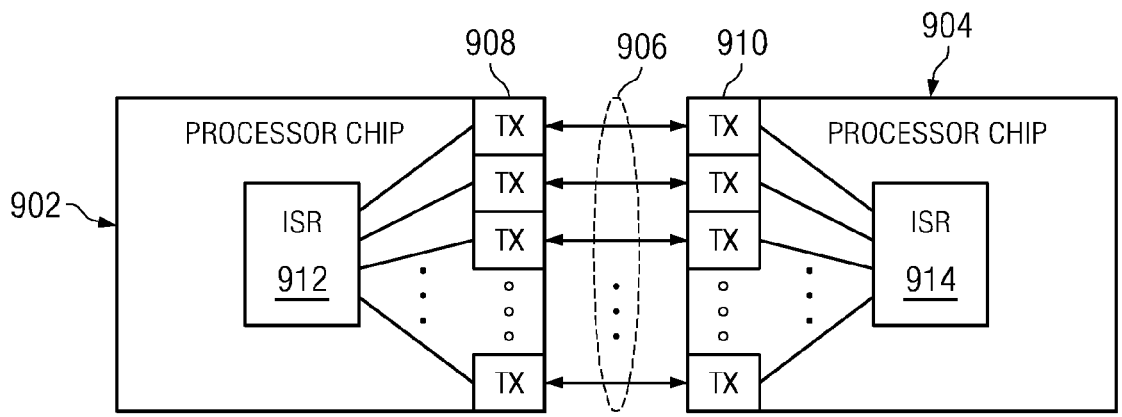
FIG. 9 depicts an example of port connections between two elements of a multi-tiered full-graph interconnect architecture in order to provide a reliability of communication between supernodes in accordance with one illustrative embodiment.

FIG. 9 depicts an example of port connections between two elements of a multi-tiered full-graph interconnect architecture in order to provide a reliability of communication between supernodes in accordance with one illustrative embodiment. It should be appreciated that FIG. 9 shows a direct connection between processor chips 902 and 904, however similar connections may be provided between a plurality of processor chips in a chain formation. Moreover, each processor chip may have separate transceivers 908 and communication links 906 for each possible processor chip with which it is directly connected.

With the illustrative embodiments, for each port, either Z-bus, D-bus, or L-bus, originating from a processor chip, such as processor chip 402 of FIG. 4A, there may be one or more optical fibers, wires, or other type of communication link, that connects to one or more processor chips in the same or different processor book or the same or a different supernode of the multi-tiered full-graph (MTFG) interconnect architecture network. In the case of optical fibers, there may be instances during manufacturing, shipping, usage, adjustment, or the like, where the one or more optical fibers may not work all of the time, thereby reducing the number of optical fiber lanes available to the processor chip and to the fully bisectional bandwidth available to the MTFG interconnect architecture network. In the event that one or more of the optical fiber lanes are not available due to one or more optical fibers not working for some reason, the MTFG interconnect architecture supports identifying the various non-available optical fiber lanes and using the port but at a reduced capacity since one or more of the optical fiber lanes is not available.

Additionally, the MTFG interconnect architecture supports identifying optical fiber lanes, as well as wired lanes, that are experiencing high errors as determined by performing error correction code (ECC) or cyclic redundancy checking (CRC). In performing ECC, data that is being read or transmitted may be checked for errors and, when necessary, the data may be corrected on the fly. In cyclic redundancy checking (CRC), data that has been transmitted on the optical fiber lanes or wired lanes is checked for errors. With ECC or CRC, if the error rates are too high based on a predetermined threshold value, then the MTFG interconnect architecture supports identifying the optical fiber lanes or the wired lanes as unavailable and the port is still used but at a reduced capacity since one or more of the lanes is unavailable.

An illustration of the identification of optical fiber lanes or wired lanes as unavailable may be made with reference to FIG. 9. As shown in FIG. 9, processor chips 902 and 904 are connected bi-directionally by communication links 906, which may be a multi-fiber (at least one fiber) optical link or a multi-wire (at least one wire) link. ISR 912 associated with transceivers 908, which may be PHY 334 or 336 of the processor chip 300 in FIG. 3, for example, on processor chip 902 retains characteristic information of the particular one of communication links 906 on which the transceiver 908 receives information from processor chip 904. Likewise, ISR 914 associated with transceiver 910 on processor chip 904 retains the characteristic information of the particular one of communication links 906 on which transceiver 910 receives information from processor chip 902. These "characteristics" represent the current state of communication links 906, e.g., traffic across the communication link, the ECC and CRC information indicating a number of errors detected, and the like.

For example, the characteristic information may be maintained in one or more routing table data structures maintained by the ISR, or in another data structure, in association with an identifier of the communication link. In this way, this characteristic information may be utilized by ISR 912 or 914 in selecting which transceivers and communication links over which to transmit information/data. For example, if a particular communication link is experiencing a large number of errors, as determined from the ECC and CRC information and a permissible threshold of errors, then that communication link may no longer be used by ISR 912 or 914 when transmitting information to the other processor chip. Instead, the other transceivers and communication links may be selected for use while eliminating the communication link and transceiver experiencing the excessive error of data traffic.

When formatting the information for transmission over communication links 906, ISR 912 or 914 augments each packet of data transmitted from processor chip 902 to processor chip 904 with header information and ECC/CRC information before being broken up into chunks that have as many bits as the number of communication links 906 currently used to communicate data from processor chip 902 to processor chip 904. ISR 912 in processor chip 902 arranges the chunks such that all bits transmitted over a particular link over some period of time include both 0's and 1's. This may be done, for example, by transmitting the 1's complement of the data instead of the original data and specifying the same in the header.

In processor chip 904, ISR 914 receives the packets and uses the CRC in the received packets to determine which bit(s) are in error. ISR 914 identifies and records the corresponding one of communication links 906 on which those bits were received. If transceivers 910 receive only 0's or 1's over one of communication links 906 over a period of time, ISR 914 may tag the corresponding transceiver as being permanently failed in its data structures. If a particular one of communication links 906 has an error rate that is higher than a predetermined, or user-specified, threshold, ISR 914 may tag that link as being temporarily error prone in its data structures. Error information of this manner may be collected and aggregated over predetermined, or user-specified, intervals.

ISR 914 may transmit the collected information periodically back to the sending processor chip 902. At the sender, ISR 912 uses the collected information to determine which of communication links 906 will be used to transmit information over the next interval.

To capture conditions where a link may be stuck at 0 or 1 for prolonged periods of times (but not permanently), transceivers 908 and 910 periodically transmit information over all of communication links 906 that exist on a particular point to point link between it and a receiving node. ISRs 912 and 914 may use the link state information sent back by transceivers 908 and 910 to recover from transient error conditions.

Again, in addition to identifying individual links between processor chips that may be in a state where they are unusable, e.g., an error state or permanent failure state, ISRs 912 and 914 of processor chips 902 and 904 select which set of links over which to communicate the information based on routing table data structures and the like. That is, there may be a set of communication links 906 for each processor chip with which a particular processor chip 902 has a direct connection. That is, there may be a set of communication links 906 for each of the L-bus, Z-bus, and D-bus links between processor chips. The particular L-bus, Z-bus, and/or D-bus link to utilize in routing the information to the next processor chip in order to get the information to an intended recipient processor chip is selected by ISRs 912 and 914 using the routing table data structures while the particular links of the selected L-bus, Z-bus, and/or D-bus that are used to transmit the data may be determined from the link characteristic information maintained by ISRs 912 and 914.

Figure 10:
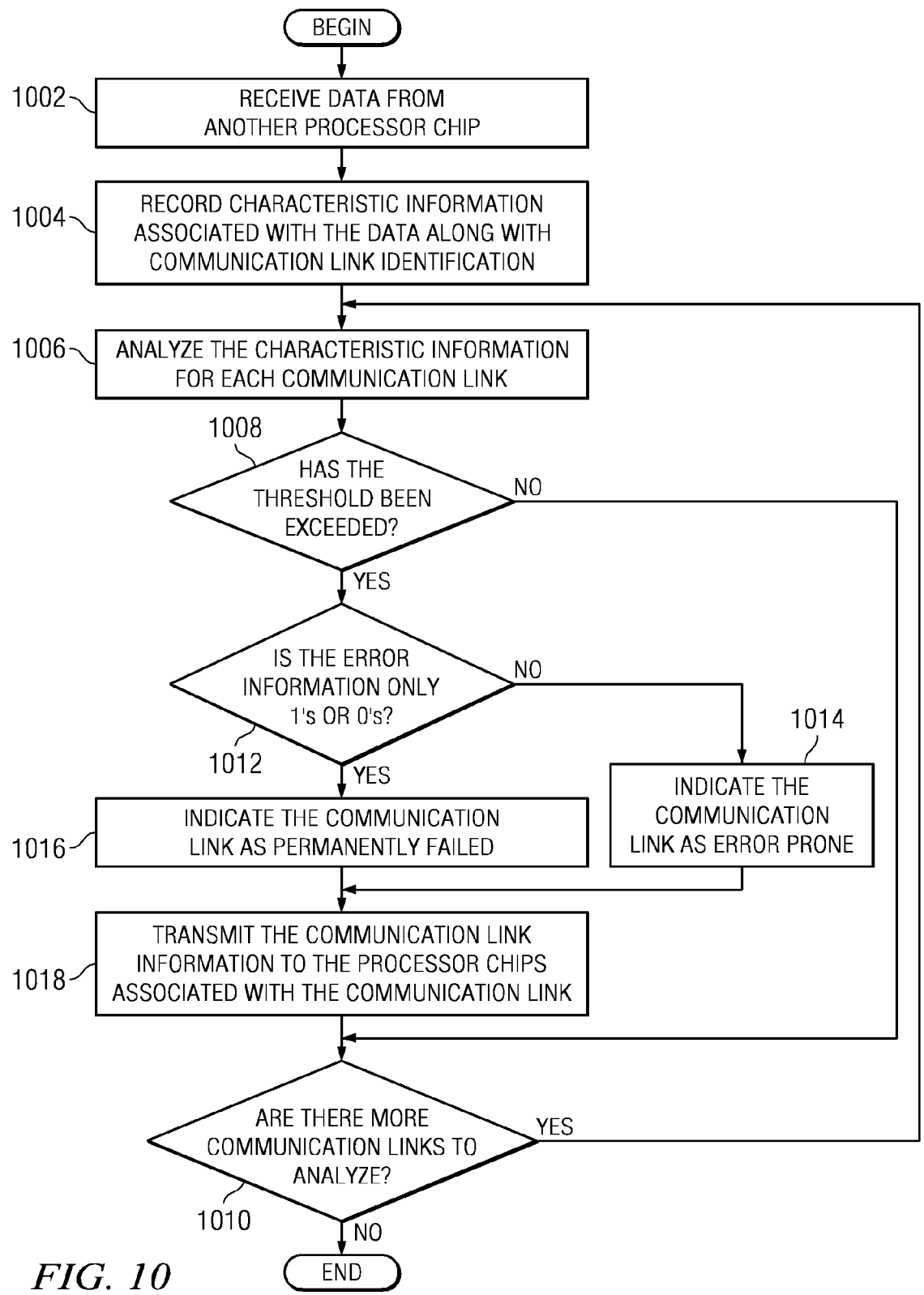
FIG. 10 depicts a flow diagram of the operation performed in providing a reliability of communication between supernodes in accordance with one illustrative embodiment.

FIG. 10 depicts a flow diagram of the operation performed in providing a reliability of communication between supernodes in accordance with one illustrative embodiment. As the operation begins, a transceiver, such as transceiver 908 of FIG. 9, of a processor chip receives data from another processor chip over a communication link (step 1002). The ISR associated with the received processor chip retains the characteristic information of the particular one of communication links on which the transceiver receives information from the other processor chip (step 1004). The ISR analyzes the characteristic information associated with each communication link in order to ascertain the reliability of each communication link (step 1006). Using the analyzed information, the ISR determines if a threshold has been exceeded (1008). If at step 1008 a predetermined threshold has not been exceeded, then the ISR determines if there are more communication links to analyze (step 1010). If at step 1010 the ISR determines there are more communication links to analyze, the operation returns to step 1006. If at step 1010 the ISR determines there are no more communication links to analyze, the operation terminates.

If at step 1008 a threshold has been exceeded, then the ISR determines if the error information associated with the communication link is comprised of only 1's or 0's (step 1012). If at step 1012 the error information is not comprised of only 1's or 0's, then the ISR indicates the communication link as error prone (step 1014). If at step 1012 the error information is comprised of only 1's or 0's, the ISR indicates the communication link as permanently failed (step 1016). From steps 1014 and 1016, the ISR transmits the communication link indication information to the processor chips associated with the indicated communication link (step 1018), with the operation proceeding to step 1010 thereafter.

Thus, in addition to identifying individual links between processor chips that may be in a state where they are unusable, the ISR of the processor chip may select which set of links over which to communicate the information based on routing table data structures and the like. While the ISR utilizes routing table data structures to select the particular link to utilize in routing the information to the next processor chip in order to get the information to an intended recipient processor chip, the particular link that is used to transmit the data may be determined from the link characteristic information maintained by the ISR.

Figure 11A:
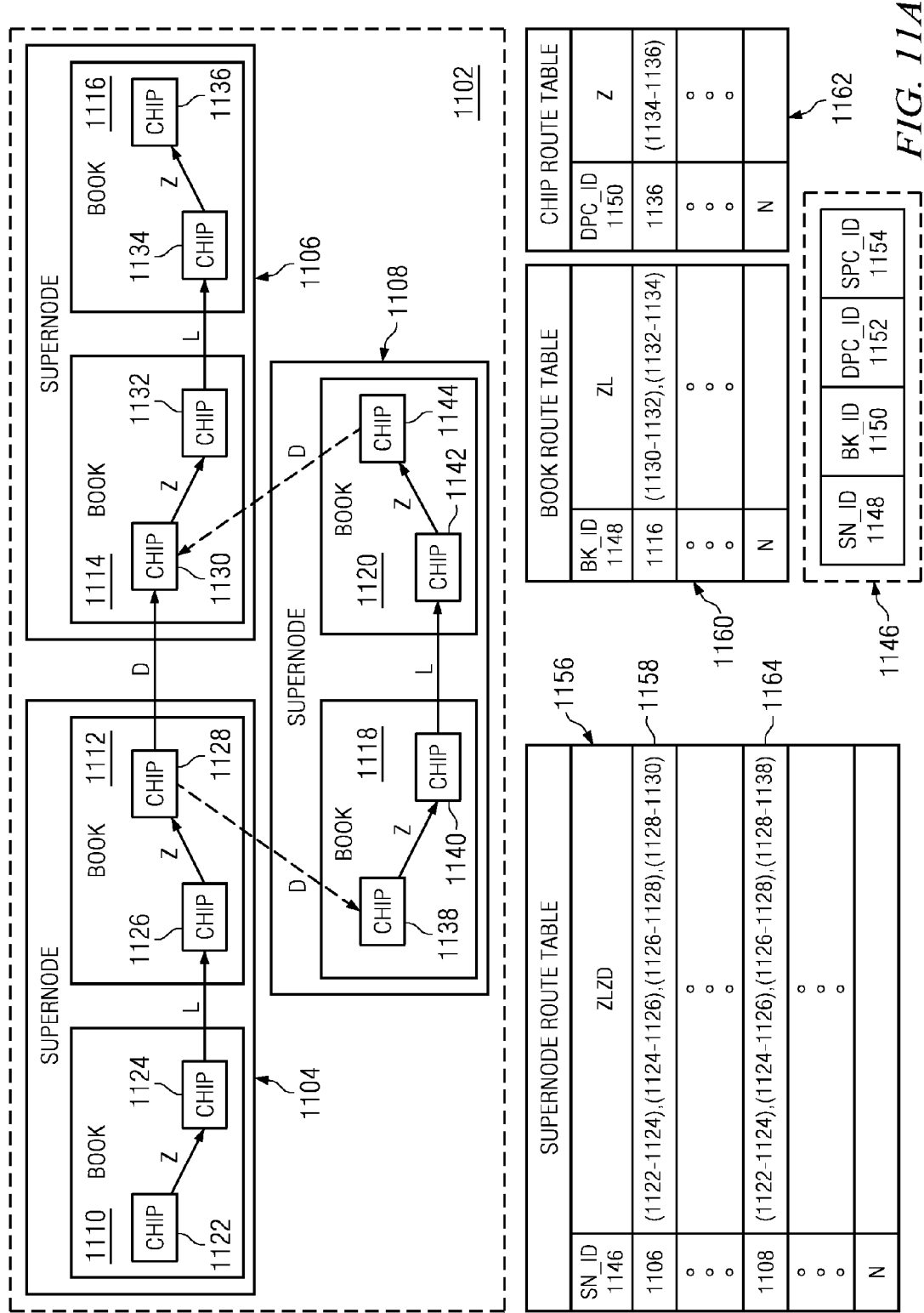
FIG. 11A depicts an exemplary method of integrated switch/routers (ISRs) utilizing routing information to route data through a multi-tiered full-graph interconnect architecture network in accordance with one illustrative embodiment.

FIG. 11A depicts an exemplary method of ISRs utilizing routing information to route data through a multi-tiered full-graph interconnect architecture network in accordance with one illustrative embodiment. In the example, routing of information through a multi-tiered full-graph (MTFG) interconnect architecture, such as MTFG interconnect architecture 500 of FIG. 5, may be performed by each ISR of each processor chip on a hop-by-hop basis as the data is transmitted from one processor chip to the next in a selected communication path from a source processor chip to a target recipient processor chip. As shown in FIG. 11A, and similar to the depiction in FIG. 5, MTFG interconnect architecture 1102 includes supernodes (SNs) 1104, 1106, and 1108, processor books (BKs) 1110-1120, and processor chips (PCs) 1122-1144. In order to route information from PC 1122 to PC 1144 in MTFG interconnect architecture 1102, the ISRs may use a three-tiered routing table data structure topology. While this example uses a three-tiered routing table data structure topology, the illustrative embodiments recognize that other numbers of table data structures may be used to route information from one processor chip to another processor chip in MTFG interconnect architecture 1102 without departing from the spirit and scope of the present invention. The number of table data structures may be dependent upon the particular number of tiers in the architecture.

The three-tiered routing data structure topology of the illustrative embodiments includes a supernode (SN) routing table data structure which is used to route data out of a source supernode to a destination supernode, a book routing table data structure which is used to route data from one processor book to another within the same supernode, and a chip routing table data structure which is used to route data from one chip to another within the same processor book. It should be appreciated that a version of the three tiered data structure may be maintained by each ISR of each processor chip in the MTFG interconnect architecture network with each copy of the three tiered data structure being specific to that particular processor chip's position within the MTFG interconnect architecture network. Alternatively, the three tiered data structure may be a single data structure that is maintained in a centralized manner and which is accessible by each of the ISRs when performing routing. In this latter case, it may be necessary to index entries in the centralized three-tiered routing data structure by a processor chip identifier, such as a SPC_ID as discussed hereafter, in order to access an appropriate set of entries for the particular processor chip.

In the example shown in FIG. 11A, a host fabric interface (HFI) (not shown) of a source processor chip, such as HFI 338 in FIG. 3, provides an address 1146 of where the information is to be transmitted, which includes supernode identifier (SN_ID) 1148, processor book identifier (BK_ID) 1150, destination processor chip identifier (DPC_ID) 1152, and source processor chip identifier (SPC_ID) 1154. The transmission of information may originate from software executing on a core of the source processor chip. The executing software identifies the request for transmission of information that needs to be transmitted to a task executing on a particular chip in the system. The executing software identifies this information when a set of tasks that constitute a communicating parallel "job" are spawned on the system, as each task provides information that lets the software and eventually HFI 338 determine on which chip every other task is executing. The entire system follows a numbering scheme that is predetermined, such as being defined in hardware. For example, given a chip number X ranging from 0 to 65535, there is a predetermined rule to determine the supernode, the book, and the specific chip within the book that X corresponds to. Therefore, once software informs HFI 338 to transmit the information to chip number 24356, HFI 338 decomposes chip 24356 into the correct supernode, book, and chip-within-book using a rule. The rule may be as simple as: SN=floor (X/128); BOOK=floor ((X modulo 128)/16); and CHIP-WITHIN-BOOK=X modulo 8. Address 1146 may be provided in the header information of the data that is to be transmitted so that subsequent ISRs along the path from the source processor chip to the destination processor chip may utilize the address in determining how to route the data. For example, portions of address 1146 may be used to compare to routing table data structures maintained in each of the ISRs to determine the next link over which data is to be transmitted.

It should be appreciated that SPC_ID 1154 is not needed for routing the data to the destination processor chip, as illustrated hereafter, since each of the processor chip's routing table data structures are indexed by destination identifiers and thus, all entries would have the same SPC_ID 1154 for the particular processor chip with which the table data structure is associated. However, in the case of a centralized three tiered routing table data structure, SPC_ID 1154 may be necessary to identify the particular subset of entries used for a particular source processor chip. In either case, whether SPC_ID 1154 is used for routing or not, SPC_ID 1154 is included in the address in order for the destination processor chip to know where responses should be directed when or after processing the received data from the source processor chip.

In routing data from a source processor chip to a destination processor chip, each ISR of each processor chip that receives the data for transmission uses a portion of address 1146 to access its own, or a centralized, three-tiered routing data structure to identify a path for the data to take. In performing such routing, the ISR of the processor chip first looks to SN_ID 1148 of the destination address to determine if SN_ID 1148 matches the SN_ID of the current supernode in which the processor chip is present. The ISR receives the SN_ID of its associated supernode at startup time from the software executing on the processor chip associated with the ISR, so that the ISR may use the SN_ID for routing purposes. If SN_ID 1148 matches the SN_ID of the supernode of the processor chip that is processing the data, then the destination processor chip is within the current supernode, and so the ISR of that processor chip compares BK_ID 1150 in address 1146 to the BK_ID of the processor book associated with the present processor chip processing the data. If BK_ID 1150 in address 1146 matches the BK_ID associated with the present processor chip, then the processor chip checks DPC_ID 1152 to determine if DPC_ID 1152 matches the processor chip identifier of the present processor chip processing the data. If there is a match, the ISR supplies the data through the HFI associated with the processor chip DPC_ID, which processes the data.

If at any of these checks, the respective ID does not match the corresponding ID associated with the present processor chip that is processing the data, then an appropriate lookup in a tier of the three-tiered routing table data structure is performed. Thus, for example, if SN_ID 1148 in address 1146 does not match the SN_ID of the present processor chip, then a lookup is performed in supernode routing table data structure 1156 based on SN_ID 1148 to identify a pathway for routing the data out of the present supernode and to the destination supernode, such as via a pathway comprising a particular set of ZLZD-bus communication links.

If SN_ID 1148 matches the SN_ID of the present processor chip, but BK_ID 1150 does not match the BK_ID of the present processor chip, then a lookup operation is performed in processor book routing table data structure 1160 based on BK_ID 1150 in address 1146. This lookup returns a pathway within a supernode for routing the data to a destination processor book. This pathway may comprise, for example, a set of Z-bus and L-bus links for transmitting the data to the appropriate processor book.

If both SN_ID 1148 and BK_ID 1150 match the respective IDs of the present processor chip, then the destination processor chip is within the same processor book as the present processor chip. If DPC_ID 1152 does not match the processor chip identifier of the present processor chip, then the destination processor chip is a different processor chip with in the same processor book. As a result, a lookup operation is performed using processor chip routing table data structure 1162 based on DPC_ID 1152 in address 1146. The result is a Z-bus link over which the data should be transmitted to reach the destination processor chip.

FIG. 11A illustrates exemplary supernode (SN) routing table data structure 1156, processor book routing table data structure 1160, and processor chip routing table data structure 1162 for the portions of the path where these particular data structures are utilized to perform a lookup operation for routing data to a destination processor chip. Thus, for example, SN routing table data structure 1156 is associated with processor chip 1122, processor book routing table data structure 1160 is associated with processor chip 1130, and processor chip routing table data structure 1162 is associated with processor chip 1134. It should be appreciated that in one illustrative embodiment, each of the ISRs of these processor chips would have a copy of all three types of routing table data structures, specific to the processor chip's location in the MTFG interconnect architecture network, however, not all of the processor chips will require a lookup operation in each of these data structures in order to forward the data along the path from source processor chip 1122 to destination processor chip 1136.

As with the example in FIGS. 4A and 4B, in a MTFG interconnect architecture that contains a large number of buses connecting supernodes, e.g., 512 D-buses, supernode (SN) routing table data structures 1156 would include a large number of entries, e.g., 512 entries for the example of FIGS. 4A and 4B. The number of options for the transmission of information from, for example, processor chip 1122 to SN 1106 depends on the number of connections between processor chip 1122 to SN 1106. Thus, for a particular SN_ID 1148 in SN routing table data structure 1156, there may be multiple entries specifying different direct paths for reaching supernode 1106 corresponding to SN_ID 1148. Various types of logic may be used to determine which of the entries to use in routing data to supernode 1106. When there are multiple direct paths from supernode 1104 to supernode 1106, logic may take into account factors when selecting a particular entry/route from SN routing table data structure 1156, such as the ECC and CRC error rate information obtained as previously described, traffic levels, etc. Any suitable selection criteria may be used to select which entry in SN routing table data structure 1156 is to be used with a particular SN_ID 1148.

In a fully provisioned MTFG interconnect architecture system, there will be one path for the direct transmission of information from a processor chip to a specific SN. With SN_ID 1148, the ISR may select the direct route or any indirect route to transmit the information to the desired location using SN routing table data structure 1156. The ISR may use any number of ways to choose between the available routes, such as random selection, adaptive real-time selection, round-robin selection, or the ISR may use a route that is specified within the initial request to route the information. The particular mechanism used for selecting a route may be specified in logic provided as hardware, software, or any combination of hardware and software used to implement the ISR.

In this example, the ISR of processor chip 1122 selects route 1158 from supernode route table data structure 1156, which will route the information from processor chip 1122 to processor chip 1130. In routing the information from processor chip 1122 to processor chip 1130, the ISR of processor chip 1122 may append the selected supernode path information to the data packets being transmitted to thereby identify the path that the data is to take through supernode 1104. Each subsequent processor chip in supernode 1104 may see that SN_ID 1148 for the destination processor chip does not match its own SN_ID and that the supernode path field of the header information is populated with a selected path. As a result, the processor chips know that the data is being routed out of current supernode 1104 and may look to a supernode counter maintained in the header information to determine the current hop within supernode 1104.

For example, in the depicted supernode 1104, there are 4 hops from processor chip 1122 to processor chip 1130. The supernode path information similarly has 4 hops represented as ZLZD values. The supernode counter may be incremented with each hop such that processor chip 1124 knows based on the supernode counter value that it is the second hop along the supernode path specified in the header information. As a result, it can retrieve the next hop from the supernode path information in the header and forward the data along this next link in the path. In this way, once source processor chip 1122 sets the supernode path information in the header, the other processor chips within the same supernode need not perform a SN routing table data structure 1156 lookup operation. This increases the speed at which the data is routed out of source supernode 1104.

When the data packets reach processor chip 1130 after being routed out of supernode 1104 along the D-bus link to processor chip 1130, the ISR of processor chip 1130 performs a comparison of SN_ID 1148 in address 1146 with its own SN_ID and, in this example, determines that they match. As a result, the ISR of the processor chip 1130 does not look to the supernode path information but instead looks to a processor book path information field to determine if a processor book path has been previously selected for use in routing data through the processor book of processor chip 1130.

In the present case, processor chip 1130 is the first processor in the processor book 1114 to receive the data and thus, a processor book path has not already been selected. Thus, processor chip 1130 performs a comparison of BK_ID 1150 from address 1146 with its own BK_ID. In the depicted example, BK_ID 1150 will not match the BK_ID of processor chip 1130 since the data is not destined for a processor chip in the same processor book as processor chip 1130. As a result, the ISR of processor chip 1130 performs a lookup operation in its own processor book routing table data structure 1160 to identify and select a ZL path to route the data out of the present processor book to the destination processor book. This ZL path information may then be added to the processor book path field of the header information such that subsequent processor chips in the same processor book will not need to perform the lookup operation and may simply route the data along the already selected ZL path. In this example, it is not necessary to use a processor book counter since there are only two hops, however in other architectures it may be necessary or desirable to utilize a processor book counter similar to that of the supernode counter to monitor the hops along the path out of the present processor book. In this way, processor chip 1130 determines the route that will get the information/data packets from processor chip 1130 in processor book 1114 to processor book 1116.

Processor book routing table data structure 1160 includes routing information for every processor chip in processor book 1114 to every other processor book within the same supernode 1106. Processor book routing table data structure 1160 may be generic, in that the position of each processor chip to every other processor chip within a processor book and each processor book to every other processor book in a supernode is known by the ISRs. Thus, processor book route table 1160 may be generically used within each supernode based on the position of the processor chips and processor books, rather to specific identifiers as used in this example.

As with the example in FIGS. 4A and 4B, in a MTFG interconnect architecture that contains 16 L-buses per book, processor book routing table data structure 1160 would include 16 entries. Thus, processor book routing table data structure 1160 would include only one option for the transmission of information from processor chip 1130 to processor book 1116. However, depending on the number of virtual channels that are available, the ISR may also have a number of indirect paths from which to choose at the L-bus level. While the previously described exemplary pseudocode provides for only one indirect route using only one of the Z-buses, L-buses, or D-buses, other routing algorithms may be used that provides for multiple indirect routing using one or more Z-buses, L-buses, and D-buses. When processor chip 1134 receives the information/data packets, the ISR of the processor chip 1134 checks SN_ID 1148 of address 1146 and determines that SN_ID 1148 matches its own associated SN_ID. The ISR of processor chip 1134 then checks BK_ID 1150 in address 1146 and determines that BK_ID 1150 matches its own associated BK_ID. Thus, the information/data packets are destined for a processor chip in the same supernode 1106 and processor book 1116 as processor chip 1134. As a result, the ISR of processor chip 1134 checks DPC_ID 1152 of address 1146 against its own processor chip identifier and determines that the two do not match. As a result, the ISR of processor chip 1134 performs a lookup operation in processor chip routing table data structure 1162 using DPC_ID 1152. The resulting Z path is then used by the ISR to route the information/data packets to the destination processor chip 1136.

Processor chip routing table data structure 1162 includes routing for every processor chip to every other processor chip within the same processor book. As with processor book route table data structure 1160, processor chip routing table data structure 1162 may also be generic, in that the position of each processor chip to every other processor chip within a processor book is known by the ISRs. Thus, processor chip routing table data structure 1162 may be generically used within each processor book based on the position of the processor chips, as opposed to specific identifiers as used in this example.

As with the example in FIGS. 4A and 4B, in a MTFG interconnect architecture that contains 7 Z-buses, processor chip routing table data structure 1162 would include 8 entries. Thus, processor chip routing table data structure 1162 would include only one option for the transmission of information from processor chip 1134 to processor chip 1136. Alternatively, in lieu of the single direct Z path, the ISR may choose to use indirect routing at the Z level. Of course, the ISR will do so only if the number of virtual channels are sufficient to avoid the possibility of deadlock. In certain circumstances, a direct path from one supernode to another supernode may not be available. This may be because all direct D-buses are busy, incapacitated, or the like, making it necessary for an ISR to determine an indirect path to get the information/data packets from SN 1104 to SN 1106. For instance, the ISR of processor chip 1122 could detect that a direct path is temporarily busy because the particular virtual channel that it must use to communicate on the direct route has no free buffers into which data can be inserted. Alternatively, the ISR of processor chip 1122 may also choose to send information over indirect paths so as to increase the bandwidth available for communication between any two end points. As with the above example, the HFI of the source processor provides the address of where the information is to be transmitted, which includes supernode identifier (SN_ID) 1148, processor book identifier (BK_ID) 1150, destination processor chip identifier (DPC_ID) 1152, and source processor chip identifier (SPC_ID) 1154. Again, the ISR uses the SN_ID 1148 to reference the supernode routing table data structure 1156 to determine a route that will get the information from processor chip 1122 to supernode (SN) 1106.

However, in this instance the ISR may determine that no direct routes are available, or even if available, should be used (due to, for example, traffic reasons or the like). In this instance, the ISR would determine if a path through another supernode, such as supernode 1108, is available. For example, the ISR of processor chip 1122 may select route 1164 from supernode routing table data structure 1156, which will route the information from processor chips 1122, 1124, and 1126 to processor chip 1138. The routing through supernode 1104 to processor chip 1138 in supernode 1108 may be performed in a similar manner as described previously with regard to the direct route to supernode 1106. When the information/data packets are received in processor chip 1138, a similar operation is performed where the ISR of processor chip 1138 selects a path from its own supernode routing table data structure to route the information/data from processor chip 1138 to processor chip 1130. The routing is then performed in a similar way as previously described between processor chip 1122 and processor chip 1130.

The choice to use a direct route or indirect route may be software determined, hardware determined, or provided by an administrator. Additionally, the user may provide the exact route or may merely specify direct or indirect, and the ISR of the processor chip would select from the direct or indirect routes based on such a user defined designation. It should be appreciated that it is desirable to minimize the number of times an indirect route is used to arrive at a destination processor chip, or its length, so as to minimize latency due to indirect routing. Thus, there may be an identifier added to header information of the data packets identifying whether an indirect path has been already used in routing the data packets to their destination processor chip. For example, the ISR of the originating processor chip 1122 may set this identifier in response to the ISR selecting an indirect routing option. Thereafter, when an ISR of a processor chip is determining whether to use a direct or indirect route to transmit data to another supernode, the setting of this field in the header information may cause the ISR to only consider direct routes.

Alternatively, this field may constitute a counter which is incremented each time an ISR in a supernode selects an indirect route for transmitting the data out of the supernode. This counter may be compared to a threshold that limits the number of indirect routes that may be taken to arrive at the destination processor chip, so as to avoid exhausting the number of virtual channels that have been pre-allocated on the path.

FIG. 11B is a flowchart outlining an exemplary operation for selecting a route based on whether or not the data has been previously routed through an indirect route to the current processor, in accordance with one illustrative embodiment. The operation outlined in FIG. 11B may be performed, for example, within a ISR of a processor chip, either using hardware, software, or any combination of hardware and software within the ISR. It should be noted that in the following discussion of FIG. 11B, "indirect" and "direct" are used in regard to the D-buses, i.e. buses between supernodes.

As shown in FIG. 11B, the operation starts with receiving data having header information with an indirect route identifier and an optional indirect route counter (step 1182). The header information is read (step 1184) and a determination is made as to whether the indirect route identifier is set (step 1186). As mentioned above, this identifier may in fact be a counter in which case it can be determined in step 1186 whether the counter has a value greater than 0 indicating that the data has been routed through at least one indirect route.

If the indirect route identifier is set, then a next route for the data is selected based on the indirect route identifier being set (step 1188). If the indirect route identifier is not set, then the next route for the data is selected based on the indirect route being not set (step 1192). The data is then transmitted along the next route (step 1190) and the operation terminates. It should be appreciated that the above operation may be performed at each processor chip along the pathway to the destination processor chip, or at least in the first processor chip encountered in each processor book and/or supernode along the pathway.

In step 1188 certain candidate routes or pathways may be identified by the ISR for transmitting the data to the destination processor chip which may include both direct and indirect routes. Certain ones of these routes or pathways may be excluded from consideration based on the indirect route identifier being set. For example, the logic in the ISR may specify that if the data has already been routed through an indirect route or pathway, then only direct routes or pathways may be selected for further forwarding of the data to its destination processor chip. Alternatively, if an indirect route counter is utilized, the logic may determine if a threshold number of indirect routes have been utilized, such as by comparing the counter value to a predetermined threshold, and if so, only direct routes may be selected for further forwarding of the data to its destination processor chip. If the counter value does not meet or exceed that threshold, then either direct or indirect routes may be selected.

Thus, the benefits of using a three-tiered routing table data structure topology is that only one 512 entry supernode route table, one 16 entry book table, and one 8 entry chip table lookup operation are required to route information across a MTFG interconnect architecture. Although the illustrated table data structures are specific to the depicted example, the processor book routing table data structure and the processor chip routing table data structure may be generic to every group of books in a supernode and group of processor chips in a processor book. The use of the three-tiered routing table data structure topology is an improvement over known systems that use only one table and thus would have to have a routing table data structure that consists of 65,535 entries to route information for a MTFG interconnect architecture, such as the MTFG interconnect architecture shown in FIGS. 4A and 4B, and which would have to be searched at each hop along the path from a source processor chip to a destination processor chip. Needless to say, in a MTFG interconnect architecture that consists of different levels, routing will be accomplished through correspondingly different numbers of tables.

Figure 12:
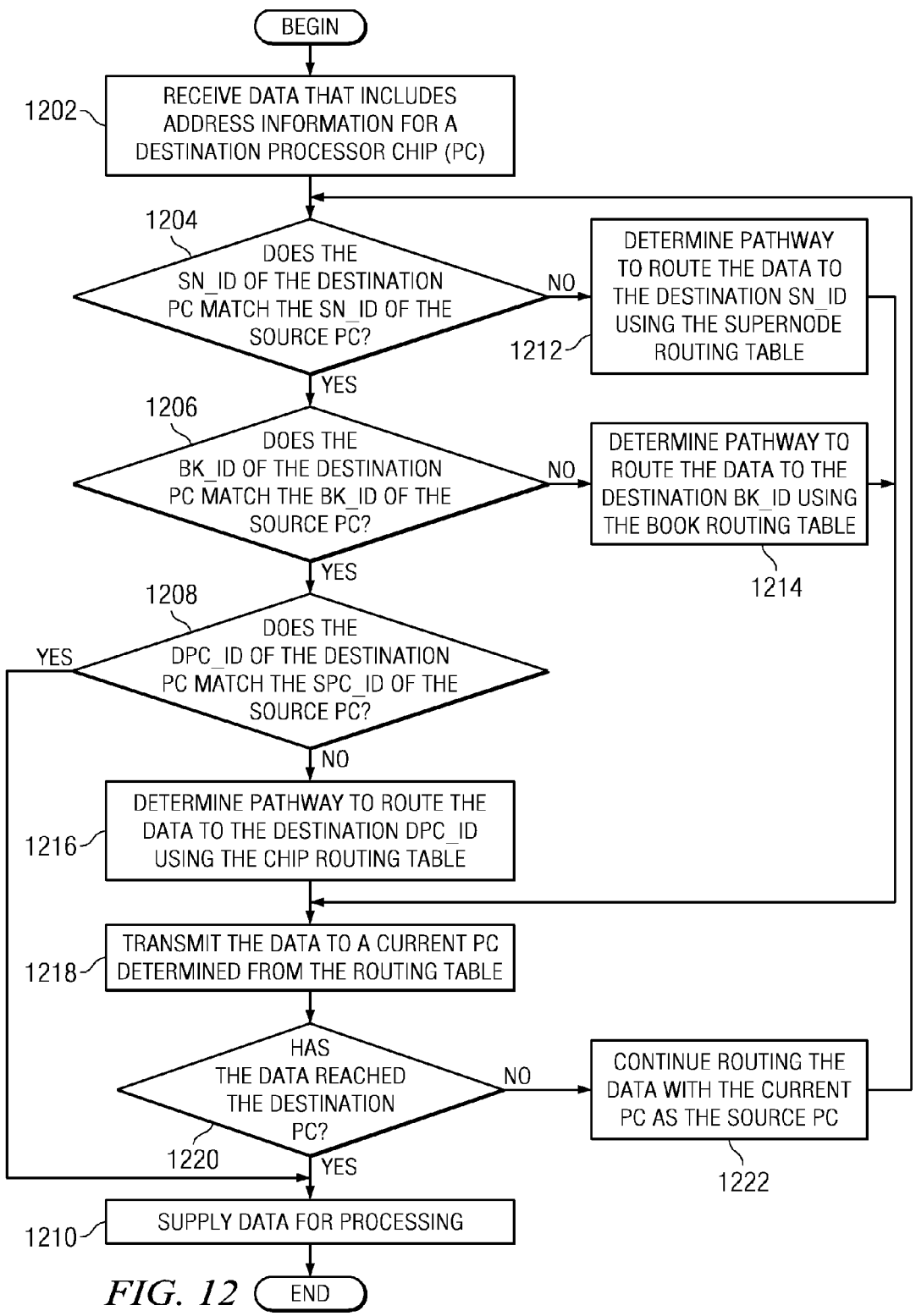
FIG. 12 depicts a flow diagram of the operation performed to route data through a multi-tiered full-graph interconnect architecture network in accordance with one illustrative embodiment.

FIG. 12 depicts a flow diagram of the operation performed to route data through a multi-tiered full-graph interconnect architecture network in accordance with one illustrative embodiment. In the flow diagram the routing of information through a multi-tiered full-graph (MTFG) interconnect architecture may be performed by each ISR of each processor chip on a hop-by-hop basis as the data is transmitted from one processor chip to the next in a selected communication path from a source processor chip to a target recipient processor chip. As the operation begins, an ISR receives data that includes address information for a destination processor chip (PC) from a host fabric interface (HFI), such as HFI 338 in FIG. 3 (step 1202). The data provided by the HFI includes an address of where the information is to be transmitted, which includes a supernode identifier (SN_ID), a processor book identifier (BK_ID), a destination processor chip identifier (DPC_ID), and a source processor chip identifier (SPC_ID). The ISR of the PC first looks to the SN_ID of the destination address to determine if the SN_ID matches the SN_ID of the current supernode in which the source processor chip is present (step 1204). If at step 1204 the SN_ID matches the SN_ID of the supernode of the source processor chip that is processing the data, then the ISR of that processor chip compares the BK_ID in the address to the BK_ID of the processor book associated with the source processor chip processing the data (step 1206). If at step 1206 the BK_ID in the address matches the BK_ID associated with the source processor chip, then the processor chip checks the DPC_ID to determine if the DPC_ID matches the processor chip identifier of the source processor chip processing the data (step 1208). If at step 1208 there is a match, then the source processor chip processes the data (step 1210), with the operation ending thereafter.

If at step 1204 the SN_ID fails to match the SN_ID of the supernode of the source processor chip that is processing the data, then the ISR references a supernode routing table to determine a pathway to route the data out of the present supernode to the destination supernode (step 1212). Likewise, if at step 1206 the BK_ID in the address fails to match the BK_ID associated with the source processor chip, then the ISR references a processor book routing table data structure to determine a pathway within a supernode for routing the data to a destination processor book (step 1214). Likewise, if at step 1208 the DPC_ID fails to match the SPC_ID of the source processor chip, then the ISR reference a processor chip routing table data structure to determine a pathway to route the data from the source processor chip to the destination processor chip (step 1216).

From steps 1212, 1214, or 1216, once the pathway to route the data from the source processor chip to the respective supernode, book, or processor chip is determined, the ISR transmits the data to a current processor chip along the identified pathway (step 1218). Once the ISR completes the transmission, the ISR where the data now resides determines if the data has reached the destination processor chip by comparing the current processor chip's identifier to the DPC_ID in the address of the data (step 1220). If at step 1220 the data has not reached the destination processor chip, then the ISR of the current processor chip where the data resides, continues the routing of the data with the current processor chip's identifier used as the SPC_ID (step 1222), with the operation proceeding to step 1204 thereafter. If at step 1220 the data has reached the destination processor chip, then the operation proceeds to step 1210.

Thus, using a three-tiered routing table data structure topology that comprises only one 512 entry supernode route table, one 16 entry book table, and one 8 entry chip table lookup to route information across a MTFG interconnect architecture improves over known systems that use only one table that consists of 65,535 entries to route information.

FIG. 13 depicts an exemplary supernode routing table data structure that supports dynamic selection of routing within a multi-tiered full-graph interconnect architecture using no-direct and no-indirect fields in accordance with one illustrative embodiment. In addition to the example described in FIG. 9, where one or more optical fibers or wires for a port may be unavailable and, thus, the port may perform at a reduced capacity, there may also be instances where for one or more of the ports or the entire bus, either Z-bus, D-bus, or L-bus, may not be available. Again, this may be due to instances during manufacturing, shipping, usage, adjustment, or the like, where the one or more optical fibers or wires may end up broken or otherwise unusable. In such an event, the supernode (SN) routing table data structure, the processor book routing table data structure, and the processor chip routing table data structure, such as SN routing table data structure 1156, processor book routing table data structure 1160, and processor chip routing table data structure 1162 of FIG. 11A, may require updating so that an ISR, such as integrated switch/router 338 of FIG. 3, will not use a route that includes the broken or unusable bus.

For example, SN routing table data structure 1302 may include fields that indicate if the specific route may be used as a direct or an indirect route. No direct route (NDR) indicator 1304 and no indirect route (NIDR) indicator 1306 may be used by the ISR in selecting an appropriate route to route information through the multi-tiered full-graph (MTFG) interconnect architecture network. NDR indicator 1304 may be used to specify whether a particular direct route from a given chip to a specific SN is available. For instance, if any of the links comprising the route entry 1308 are unavailable, or there is a significant enough degradation in availability of links, then the corresponding NDR indicator 1304 entry may be set.

The NIDR indicator 1306 entry indicates whether a particular path may be used for indirect routing of information/data packets. This NIDR indicator 1306 may be set in response to a link in the path becoming unavailable or there is a significant enough degradation in availability of the links, for example. In general, if a pathway cannot be used for direct routing, it will generally not be available for indirect routing. However, there are some cases where a path may be used for direct routing and not for indirect routing. For example, if the availability of a link in the path is degraded, but not made completely unavailable, the path may be permitted to be used for direct routing but not indirect routing. This is because the additional latency due to the degraded availability may not be so significant as to make the path unusable for direct routing but it would create too much latency in an indirect path which already incurs additional latency by virtue of it being an indirect routing. Thus, it is possible that the bits in NIDR indicator 1306 may be set while the bits in the NDR indicator 1304 are not set.

The NIDR indicator 1306 may also come into use because of a determined longest route that can be taken in the multi-tiered hierarchical interconnect. Consider an indirect path from processor chip 1122 to processor chip 1136 in FIG. 11A that consists of the following hops:
1122→1124→1126→1128→1138→1140→1142→1144→1130→1132→1134→1136. If the part of the route from SN 1108 to SN 1106 is not available, such as the hop 1140→1142, then processor chip 1122 needs to know this fact, which, for example, is indicated by indicator 1312 in NIDR indicator 1306 field. Processor chip 1122 benefits from knowing this fact because of potential limitations in the number of virtual channels that are available causing a packet destined for SN 1106 that is routed to SN 1108 to only be routed over the single direct route from SN 1108 to SN 1106. Consequently, if any direct route from SN 1108 to any other SN is not available, then the entries in all the SN routing table data structures that end in supernode 1108 will have the corresponding NIDR indicator 1306 field set.

NIDR indicator 1306 may also be set up to contain more than one bit. For instance, NIDR indicator 1306 may contain multiple bits where each bit pertains to a specific set of direct routes from the destination SN identifier field, such as SN_ID 1148 of FIG. 11A, to all other SNs.

In order to determine if a specific route is not available, the ISR may attempt to transmit information over the route a number of predetermined times. The ISR may increment a counter each time a packet of information is dropped. Based on the value of the counter meeting a predetermined value, the ISR may set either or both of NDR indicator 1304 or NIDR indicator 1306 fields to a value that indicates the specific route is not to be used as a path for transmitting information. The predetermined value may be determined by an administrator, a preset value, or the like. NIDR indicator 1306 may also be set by an external software entity such as network management software.

In determining if a route is not available, the ISR may narrow a larger path, such as those in route 1314, to determine the specific bus that is broken. For example, in route 1308 there may only be one bus of the four buses in the route that is broken. Once the ISR determines the specific broken bus, such as exemplary bus 1310, the ISR may update NDR indicator 1304 or NIDR indicator 1306 fields for each route in supernode routing table data structure 1302 to indicate that each route that includes the specific bus may not be used for a direct or indirect path. In this case, the ISR may also update route 1316 as it also includes bus 1310. Although not depicted, the ISR may update similar fields in the processor book routing table and processor chip routing table data structures to indicate that each route that includes the specific bus may not be used for a direct or indirect path.

Thus, using NDR indicator 1304 or NIDR indicator 1306 fields in conjunction with supernode routing table data structure 1302 provides for a more efficient use of the three-tier route table topology based on detected broken or unusable communication connections. That is, using NDR indicator 1304 or NIDR indicator 1306 fields ensures that only functioning routes in the MTFG interconnect architecture network are used, thereby improving the performance of the ISRs and the information/data packet routing operations.

Figure 14A:
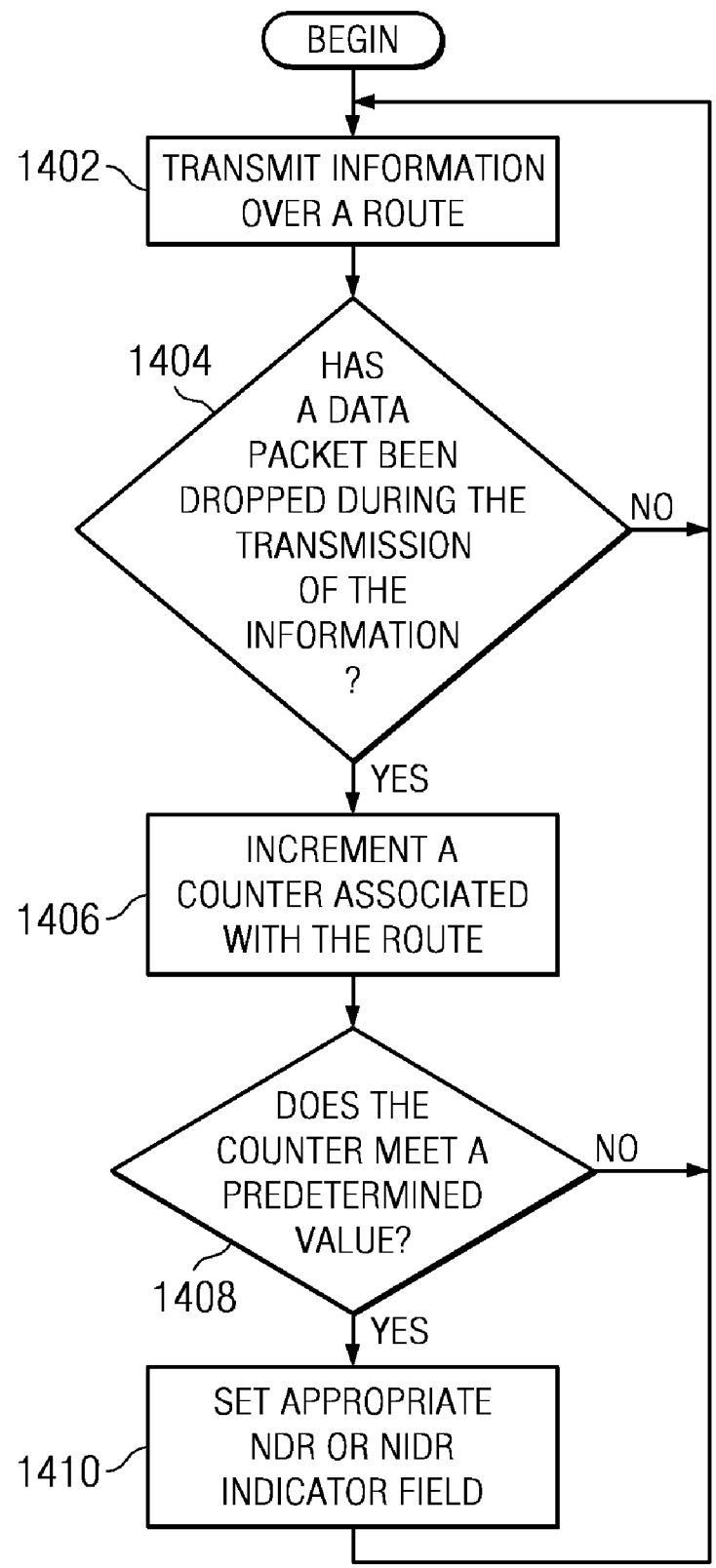
FIG. 14A depicts a flow diagram of the operation performed in supporting the dynamic selection of routing within a multi-tiered full-graph interconnect architecture using no-direct and no-indirect fields in accordance with one illustrative embodiment.

FIG. 14A depicts a flow diagram of the operation performed in supporting the dynamic selection of routing within a multi-tiered full-graph interconnect architecture using no-direct and no-indirect fields in accordance with one illustrative embodiment. As the operation begins, an ISR attempts to transmit information over a route (step 1402). The ISR determines if any packet of information is dropped during the transmission of the data (step 1404). If at step 1404 no data packet has been dropped, the operation returns to step 1402. If at step 1404 a data packet has been dropped during the transmission of data, the ISR increments a value of a counter for the particular route (step 1406). The ISR then determines if the value of the counter meets or exceeds a predetermined value (step 1408). If at step 1408 the value of the counter has not met or exceeded the predetermined value, then the operation returns to step 1402. If at step 1408 the value of the counter has met or exceeded the predetermined value, the ISR sets either or both of the NDR indicator or the NIDR indicator fields to a value that indicates the specific route is not to be used as a path for transmitting information (step 1410), with the operation returning to step 1402 thereafter. Furthermore, the ISR may inform other ISRs in the system to amend their routing tables or may inform network management software which may in turn inform other ISRs to amend their routing tables.

Thus, using the NDR indicator or NIDR indicator fields in conjunction with a supernode routing table data structure provides for a more efficient use of the three-tiered routing table data structure topology based on detected broken or unusable communication connections.

Figure 14B:
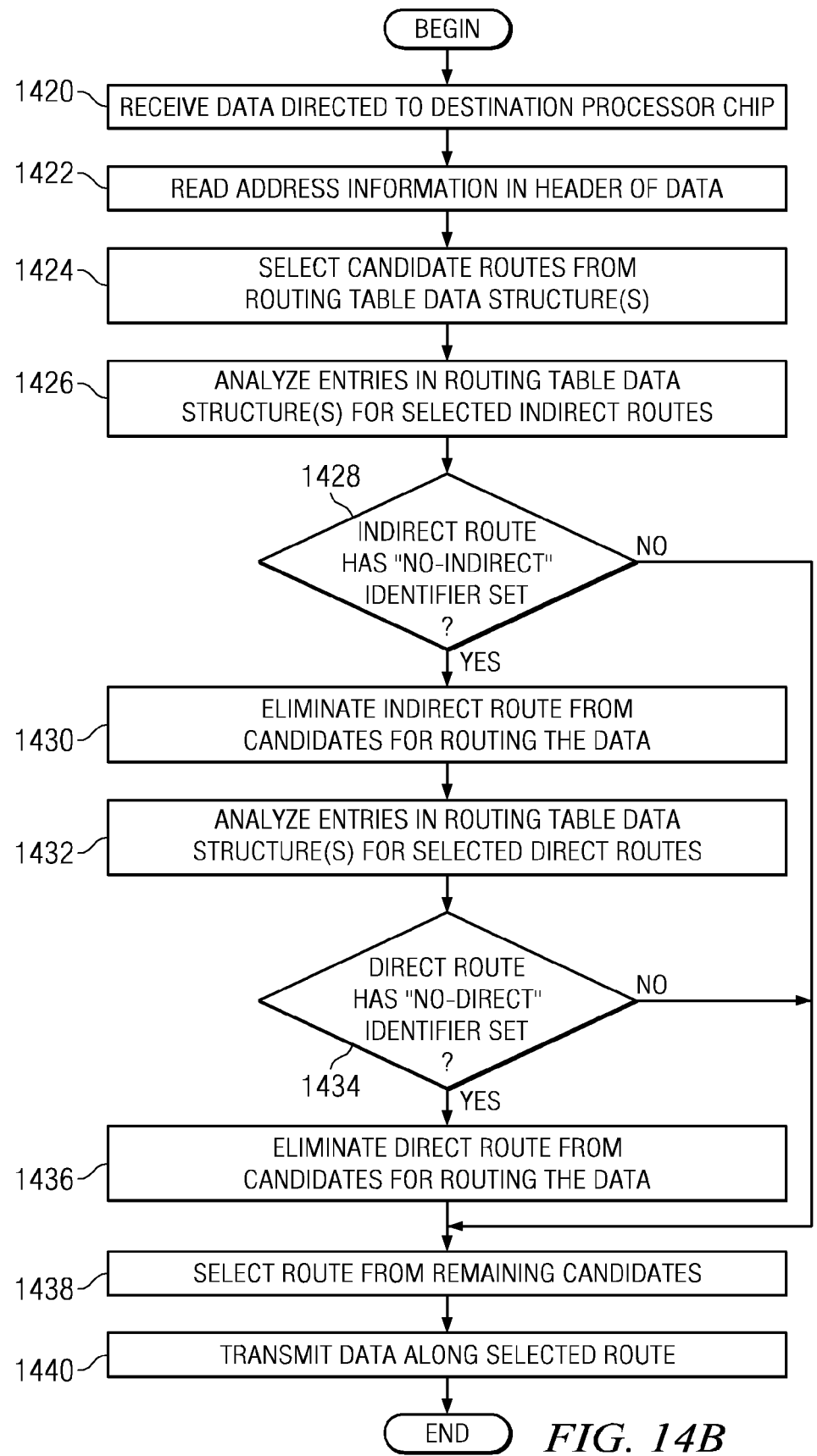
FIG. 14B outlines an exemplary operation for selecting a route for transmitting data based on whether or not a no-direct or no-indirect indicator is set in accordance with one illustrative embodiment.

FIG. 14B outlines an exemplary operation for selecting a route for transmitting data based on whether or not a no-direct or no-indirect indicator is set in accordance with one illustrative embodiment. The operation outlined in FIG. 14B may be performed, for example, within an ISR of a processor chip, either using hardware, software, or any combination of hardware and software within the ISR.

As shown in FIG. 14B, the operation starts with receiving data having directed to a destination processor chip (step 1420). The address information in the header information of the data is read (step 1422) and based on the address information, candidate routes for routing the data to the destination processor chip are selected from one or more routing table data structures (step 1424). For each indirect route in the selected candidates, the entries in the one or more routing table data structures are analyzed to determine if their "no-indirect" identifiers are set (step 1426). If an indirect route has an entry having the "no-indirect" identifier set (step 1428), then that indirect route is eliminated as a candidate for routing the data (step 1430).

For each of the direct routes in the selected candidates, the entries in the one or more routing table data structures are analyzed to determine if their "no-direct" identifiers are set (step 1432). If a direct route has an entry having the "no-direct" identifier set (step 1434), then that direct route is eliminated as a candidate for routing the data (step 1436). The result is a set of candidate routes in which the routes are permitted to be utilized in the manner necessary to route data from the current processor to the destination processor, i.e. able to be used as indirect or direct routes.

From the resulting subset of candidate routes, a route for transmitting the data to the destination processor chip is selected (step 1438). The data is then transmitted along the selected route toward the destination processor chip (step 1440). The operation then terminates. It should be appreciated that the above operation may be performed at each processor chip along the pathway to the destination processor chip, or at least in the first processor chip encountered in each processor book and/or supernode along the pathway.

Having described the multi-tiered full graph (MTFG) interconnect architecture and the mechanisms for routing data communications or data transmissions through the architecture from one processor chip to another, in the same or different processor book on the same or different supernode, it can be appreciated that the architecture lends itself to various types of multiprocessor processing applications that may utilize a large number of processors, or cores, to execute large scale applications. For example, one possible use of the MTFG interconnect architecture is to perform synchronized processing of distributed jobs across a plurality of processors on the same or different processor chips in the same or different processors books on the same or different supernodes. The plurality of processors, processor books, and supernodes may constitute a computing cluster for purposes of performing synchronized processing of distributed jobs. One processor or processor chip in the computing cluster may act as the coordinator of the computing cluster such that it handles orchestration of the overall operation of the computing cluster.

Synchronized operation of two or more supernodes may be desirable in many different applications. For example, synchronized operation may be desirable to address operating system jitter, i.e. mismatch in scheduling of tasks and interrupts, to tune and debug applications, and to trigger performance counters.

As mentioned above with regard to FIGS. 7 and 8, each integrated switch associated with a processor chip maintains separate virtual channels for each of the ports of the processor chip, the number of virtual channels being equal to the longest route in the network. Each of these virtual channels may have different depths of data based on current congestion levels of data being transmitted from one processor chip to other processor chips within the network, i.e. a computing cluster or the MTFG. These depths may be influential in determining how to route data through the network so that it may be transmitted between a source processor chip and a destination processor chip in an optimal manner, i.e. with minimum delay and wasted processor cycles.

The illustrative embodiments provide a mechanism for broadcasting the queue depths of the various virtual channels of the processor chips within a network, computing cluster, or the entire MTFG. The queue depth information may be broadcast as part of a heartbeat signal broadcast by each of the processor chips to each of the processor chips directly coupled to that processor chip. In this way, each processor chip may dynamically determine an optimum routing path from itself to a destination processor chip based on determined congestion along the paths from the current processor chip to the destination processor chip.

With the system and method of the illustrative embodiments, the MTFG interconnect architecture is configured as discussed above using supernodes, processor books, and processor chips with the above-described routing mechanisms also being provided for routing data between processor chips in the same processor book, in a different processor book of a same supernode, and in a different processor book of a different supernode of the MTFG interconnect architecture. Moreover, as discussed above the various Z, L, and D buses are provided between the processor chips, the processor books, and the supernodes, respectively, for transmission of data between the various elements of the MTFG interconnect architecture.

In one illustrative embodiment, the multi-tiered architecture, and optionally the routing mechanisms, may be utilized for routing a heartbeat signal to each of the processor chips within a defined computing cluster from each of the other processor chips directly coupled to the processor chip. A heartbeat signal is a small size data communication that is sent out at a regular interval to each of the other processor chips with which a current processor chip has direct connection through ports or phys of the processor chip and a bus. The heartbeat signal, in one illustrative embodiment, is used simply as a mechanism for identifying that the source of the heartbeat signal is still operational. The heartbeat signal may have no useable data in it or may have some small amount of data, such as header information identifying the SN_ID, BK_ID, DPC_ID, or the like, of the source of the heartbeat signal. The key concept being that the signal is a small size data communication being sent at a regular, and thus predictable, time interval.

This heartbeat signal may be used by the processor chips to identify other processor chips that are directly coupled to them that may be in a failed state, whose connections may be in a failed state, or the like. Each processor chip may contain logic for identifying heartbeat signals from neighboring processor chips, i.e. processor chips that have a direct connection with the current processor chip through a single bus without having to be redirected through another processor chip. If a particular neighboring processor chip does not provide a heartbeat signal within a predetermined period of time of a previously received heartbeat signal from that processor chip, then it may be determined that the neighboring processor chip that has not sent its heartbeat signal is in an error or failed state.

As a result of identifying a processor chip as being in an error or failed state, the processor chip detecting the error or failed state may update its corresponding routing table data structures accordingly. For example, based on an identifier of the error or failed state processor chip, i.e. its SN_ID, BK_ID, and DPC_ID, the ISR of the processor chip that detected the error or failed state processor chip may identify entries in the routing table data structures corresponding to routes having the error or failed state processor chip. The ISR may then update the entries in the routing table data structures to either eliminate the entry or otherwise mark the entry as not suitable for direct and/or indirect routing. The ISR may also communicate the error or failed state to each of the other processor chips in the MTFG interconnect architecture so that they may update their associated routing table data structures accordingly. As a result, based on the heartbeat signals being exchanged between processor chips, error or failed state processor chips may be dynamically identified and routing mechanisms may be dynamically updated based on detected error or failed state processor chips.

In addition to simply identifying error or failed state processor chips in the MTFG interconnect architecture, the illustrative embodiments may utilize the heartbeat signal to distribute data to all of the processor chips in the MTFG interconnect architecture, or a subset of processor chips in the MTFG interconnect architecture, as well as facilitate various other collaborative operations within the MTFG interconnect architecture or a subset thereof. For example, in one illustrative embodiment, the heartbeat signals may be utilized to provide queue depth information for the various virtual channels of a processor chip so that this information may be used by data sources when determining an optimum routing path for the data from the source processor chip to a destination processor chip.

In such an illustrative embodiment, each of the processor chips in the MTFG interconnect architecture, or in a subset of processor chips in the MTFG interconnect architecture, e.g., a computing cluster, may be initially synchronized through a heartbeat synchronization process. This heartbeat synchronization process may utilize a master processor chip, i.e. a processor chip initiating the heartbeat synchronization process. For example, the processor chip may send out a data communication to each of the processor chips in the computing cluster, using the direct and indirect routing of the data communication to all of the processor chips, that indicates that a heartbeat synchronization process is to be performed. The ISR of the master processor chip may then identify each of the processor chips that are directly coupled to the master processor chip, whether in the same or different processor book or in the same or different supernode. The term "directly coupled" refers to processor chips that are in communication with each other via a communication link that couples the two processor chips without having to re-route the communication through a third processor chip.

The master processor chip may then distribute a heartbeat signal, i.e. a small data communication, to each of the processor chips with which it is directly coupled, whether those processor chips be in the same book, same supernode, different book, or different supernode. The heartbeat signal preferably includes a timestamp of when the heartbeat signal was transmitted and may include identification information for the source of the heartbeat signal. This timestamp may be used by receiving processor chips to determine a delay during transmission of the heartbeat signal such that the processor chips may predict when the next heartbeat signal from the master processor chip may be transmitted.

The receiving processor chips then generate and transmit their own heartbeat signal to their directly coupled processor chips at the predicted time when the master processor chip sends its next heartbeat signal. This process continues with each subsequent receiving processor chip until all of the processor chips in the computing cluster have been synchronized based on the heartbeat signal to be transmitting their heartbeat signals at the same time. For example, a sufficient predetermined amount of time may be allowed to elapse, based on the size of the computing cluster and number of processor chips therein, to permit all of the processor chips in the computing cluster to become synchronized through the heartbeat signal mechanism. After this predetermined amount of time has elapsed, the master processor chip may again distribute a data communication to each of the processor chips in the computing cluster, through the direct or indirect routing mechanisms, to indicate that the heartbeat synchronization process has completed.

Once synchronized in this manner, each of the processor chips may use the heartbeat signal it generates to provide queue depth information to other processor chips in the network. This queue depth information may be received in the ISRs of the other processor chips which may then associate the queue depth information with various paths specified in the routing tables. The ISR may then, based on a specified destination processor chip identify the possible routes to the destination processor chip using the routing table. This first set of possible routes may constitute a first candidate set of routes for routing the data from the current processor chip to the destination processor chip. A particular optimum routing path may be selected from this first set of possible routes based on the associated queue depth information. That is a route having the least amount of congestion from the current processor chip to the destination processor chip, as determined by the queue depths in each of the processor chips from the current processor chip to the destination processor chip, may be selected as the optimum routing path along which to transmit the data.

The queue depth information transmitted from one processor chip to the next may be queue depth information for only that one processor chip or may include all of the queue depth information that processor chip has accumulated from other processor chips reporting their queue depth information using the heartbeat signal mechanism of the present invention. That is, as discussed above, during the heartbeat synchronization process, signals are transmitted in a synchronized manner from one processor chip to each of its directly attached neighbors. It takes approximately 3 processor cycles for this synchronization to be completed with the exemplary MTFG architecture. The same heartbeat signals may be used to transmit the queue depth information of the various processor chips and thus, will only take 3 processor cycles for a completely updated version of the queue depth information to be available in each of ISRs of the processor chips.

For example, each of the ISRs of the processor chips may have their queue depth information initialized to starting values at the start of a heartbeat synchronization operation. During a first processor cycle after synchronization is complete, each of the processor chips will transmit their complete copy of queue depth information to each other processor chip to which they are directly coupled. The receiving processor chips will update their own queue depth information based on the received queue depth information in the received heartbeat signal. Since this is the first processor cycle after a synchronization operation, the depth queue information included in the heartbeat signal will only be accurate for the depth queues of the directly coupled processor chips' queues or virtual channels (since these directly coupled processor chips have not yet received queue depth information for other processor chips). These directly coupled processor chips include all of the other processor chips within the same processor book, at least one processor chip from another processor book within the same supernode, and possibly a processor chip in a processor book of a separate supernode (see FIG. 4B).

During a second processor cycle after synchronization, each processor chip will again send its entire copy of depth queue information to each of the other directly coupled processor chips. However, this time the depth queue information transmitted by each processor chip will include the depth queue information for other processor chips whose heartbeat transmissions were received in the previous processor cycle by the processor chip. For example, the depth queue information transmitted by a processor chip will include the depth queue status of processor chips in the same processor book as received in the previous processor cycle, at least one processor chip in each of the other processor books of the same supernode that are directly coupled to the processor chip, possibly at least one processor chip in a separate supernode, and processor chips that are indirectly coupled to the processor chip via these processor chips in other processor books of the same supernodes.

It should be appreciated that the queue depth information received from the various processor chips may have redundant, and potentially conflicting, queue depth information. The ISR of each processor chip preferably implements logic for handling such redundancy and potential conflicts. For example, a simple mechanism for updating the depth queue information with the latest received depth queue information regardless of conflicts may be utilized since only an approximation of the queue depths is necessary to make routing decisions. Alternatively, a more complex mechanism that may look at processor chip identifiers, timestamps, etc. of the heartbeat signals and corresponding queue depth information to determine which heartbeat signal's queue depth information to utilize when updating the ISR's local copy of queue depth information may be implemented without departing from the spirit and scope of the present invention.

Thus, the depth queue information will be accurate for the directly coupled processor chips and will be only one processor cycle old for other indirectly coupled processor chips at this stage. For routing determinations, such staleness of the depth queue information is acceptable since it is only necessary to make a relative determination of which routing path to select for routing of data from a current processor chip to a destination processor chip. Moreover, it is unlikely that the depth queue status has changed appreciably within a single processor cycle to warrant considering this queue depth information unusable.

During a third processor cycle after synchronization, each processor chip will again send its queue depth information in the heartbeat signal to each of its directly coupled processor chips. At this time, the queue depth information in the heartbeat signal includes all of the queue depth information for all of the processor chips in the network. The only queue depth data that is completely accurate within this queue depth information is the queue depth data for the processor chips that are directly coupled to the receiving processor chip since it only takes one processor cycle to receive that queue depth data. However, the other queue depth data in the queue depth information is at most 3 processor cycles old and thus, is as accurate as necessary to make informed routing decisions.

The routing determinations may be made by the ISRs of the processor chips based on the most current version of the queue depth information maintained in its local copy of the queue depth information, such as may be stored in a memory associated with the ISR. Such routing determinations may be made with regard to each received data message or portion of data that is not destined for the particular processor chip in which the ISR is provided. Alternatively, the routing determinations based on queue depth information may be performed by only the source processor chip's ISR with intermediate processor chips merely routing the data message or portion of data along the routing path selected by the source processor chip's ISR.

The routing determinations may involve selecting, from the stored routing table data structures, a candidate set of routes based on the current processor chip and a destination processor chip. The routes in the candidate set of routes may then be analyzed with regard to their associated queue depth information for the processor chips along the route to determine which route, as a whole, provides the least congested path. The least congested path may then be selected as the path for routing the data message or portion of data to the destination processor chip. This selection of path may be updated at each subsequent intermediate processor chip that receives the data message or portion of data based on its own local copy of queue depth information or the initial selection may simply be used at each intermediate processor chip without regard to their own local copy of queue depth information.

For example, it may be determined that a first "hop" from the current processor chip to a next processor chip would encounter the least congestion if the hop is to a processor chip A. However, processor chips B and C may have a high level of congestion in the queues or virtual channels to which the data message or portion of data would be posted. On another path, however, processor chip D provides a relatively higher congestion path than processor chip A from the current processor chip but the subsequent processor chips E and F have a relatively lower congestion in the queues or virtual channels to which the data message or portion of data would be posted. Thus, even though the most immediate hop would best be made to processor chip A, the ISR of the current processor chip may select the route through processor chips D, E, and F since, as a whole, the routing path through processor chips D, E, and F is less congested than the routing path through processor chips A, B, and C. In this way, the congestion along an entire routing path may be taken into consideration when selecting a path for routing data from the routing tables maintained by the ISRs.

It should be appreciated that even though the heartbeat signals of the processor chips may be synchronized as discussed above, over time the heartbeat signals may drift out of synchronization due to any of a number of different factors. Thus, each processor chip may monitor the receipt of heartbeat signals from its directly coupled processor chips to determine if any of the processor chip heartbeat signals drift significantly. That is, a difference between timestamps of received heartbeat signals and a heartbeat signal being generated by the processor chip may be determined and compared to a threshold. If the threshold is exceeded, the above heartbeat synchronization process may be again performed to bring the processor chips back into synchronization. It should be appreciated that the heartbeat synchronization process in the MTFG interconnect architecture should require approximately three processor cycles to complete once initiated and thus, does not introduce a significant amount of overhead processing into the computing cluster.

It should be appreciated that the illustrative embodiments are not limited to looking up direct routes in routing table data structures and sending the heartbeat signals and data messages/portions of data along the direct routes. To the contrary, in other illustrative embodiments, the heartbeat signals and data messages/portions of data may be simply broadcast to all ports, or phys, associated with an ISR of a processor chip such that the heartbeat signal and data messages/portions of data are sent to all directly coupled processor chips. The lookup operations described above allow the processor chip to identify, via the routing table data structures, those communication links that are in an error state or otherwise not useable. In the alternative embodiment, the broadcast of the heartbeat signals and data messages/portions of data may be performed regardless of broken or error state links with the expectation that because each processor chip broadcasts to each of its directly coupled processor chips, that the heartbeat signal and data messages/portions of data will be sent along other communication links from other processor chips to a processor chip connected by way of a broken link or error state link. In either case, the effect is to broadcast the heartbeat signal and data messages/portions of data to the directly coupled processor chips, if the communication link has not become broken or unusable, with each processor chip then sending its own heartbeat signal and data messages/portions of data to its directly coupled processor chips, and so on.

Figure 15:
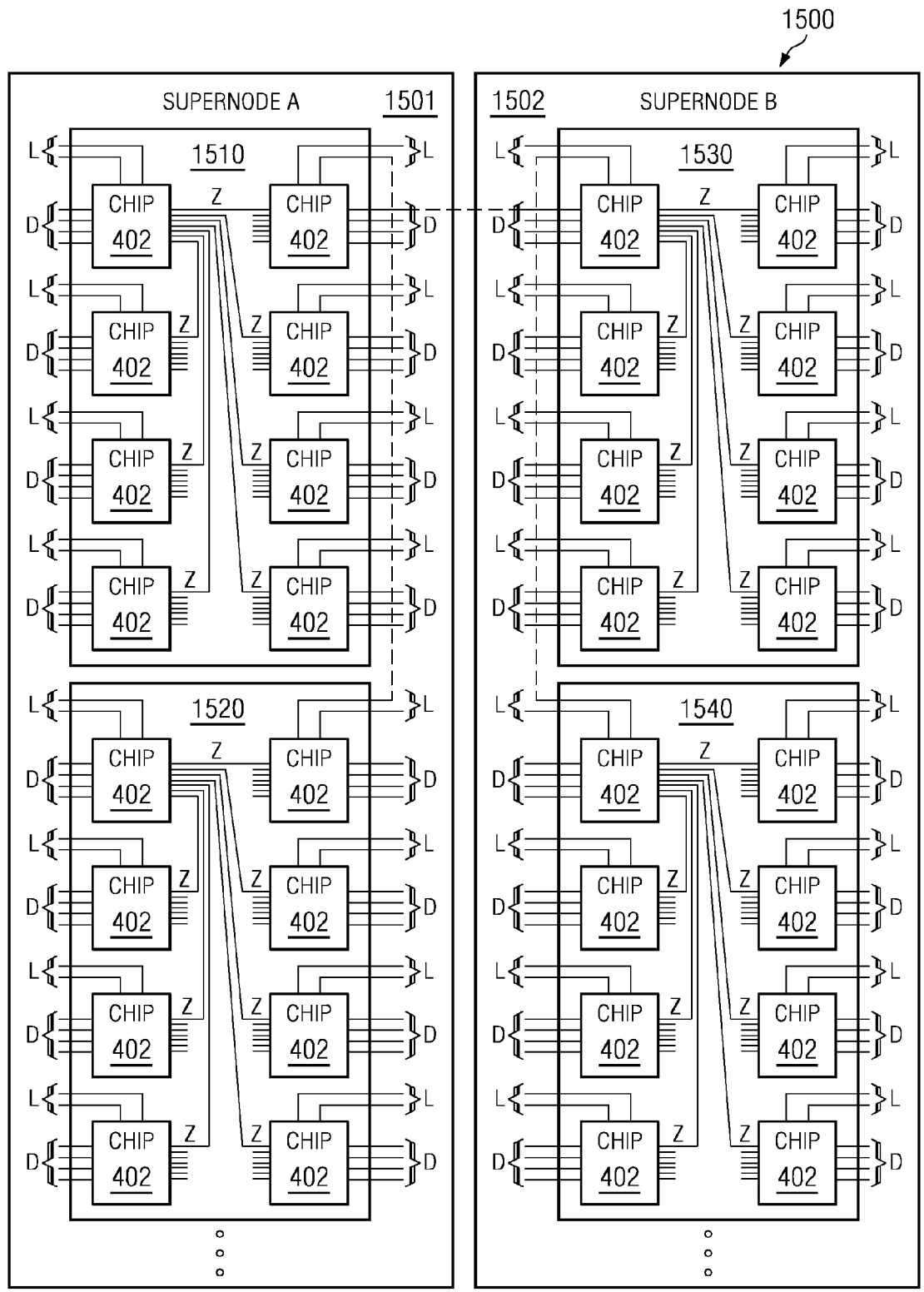
FIG. 15 is an exemplary diagram illustrating a computing cluster comprising supernodes, processor books, and processor chips in accordance with the MTFG interconnect architecture of one illustrative embodiment.

FIG. 15 is an exemplary block diagram of a simplified computing cluster in accordance with one illustrative embodiment. The computing cluster shown in FIG. 15 includes only two supernodes with each supernode having only two of its processor books shown for simplicity. It should be appreciated that any number of supernodes, processor books, and processor chips within processor books may be used with the mechanisms of the illustrative embodiments without departing from the spirit and scope of the present invention. For simplicity of the explanation of the operation of the illustrative embodiments, only one direct connection between a processor chip and another processor chip in a different processor book on the same supernode and a different processor book on a different supernode are shown. However, it should be appreciated that a same operation as will be detailed hereafter applies to all direct connections between processor chips.

As shown in FIG. 15, the computing cluster 1500 comprises a first supernode A 1501 and a second supernode B 1502. As mentioned above, this is a simplified depiction for ease of explanation, however the actual computing cluster may comprise additional supernodes (not shown) of any number and may in fact comprise all of the supernodes in the MTFG interconnect architecture, depending upon the particular implementation of the illustrative embodiments desired.

Each supernode comprises one or more processor books. For example, supernode A 1501 comprises processor books 1510 and 1520 while supernode B 1502 comprises processor books 1530 and 1540. While only two processor books are shown for each of the supernodes 1501-1502, it should be appreciated that any number of processor books may be utilized without departing from the spirit and scope of the illustrative embodiments. Each processor book 1510-1540 comprises one or more processor chips with each processor chip in a processor book being directly coupled to each other processor chip in the processor book. Similarly each processor book of a supernode is directly coupled to at least one processor chip of each other processor book of the same supernode. Each supernode is connected to each other supernode in the computing cluster via at least one processor chip.

In one illustrative embodiment, each processor chip is connected to a processor chip in two other processor books of the same supernode. Moreover, each supernode is connected to one processor chip of each other supernode in the computing cluster. Thus, each processor chip (for example, the upper right processor chip of processor book 1510) is coupled to a single processor chip of each other processor book (for example, the upper right processor chip of processor book 1520). Moreover, a single processor chip (the processor chip in the upper right of processor book 1510) in supernode 1501 is directly coupled to a single processor chip (the upper left processor chip of processor book 1530) in supernode 1502.

With the computing cluster 1500 shown in FIG. 15, it is assumed that a processor chip, e.g., the upper right processor chip of processor book 1510, determines that it is necessary to perform a heartbeat synchronization operation. For purposes of this description the operation of the illustrative embodiments will be described in terms of a heartbeat synchronization operation however it should be appreciated that a similar operation applies to the broadcasting of queue depth information in heartbeat signals, as will be discussed hereafter. That is, a similar multi-tiered synchronization is used to update queue depth information in each of the processor chips of the computing cluster 1500 on a continual basis using the heartbeat signals transmitted by the processor chips.

Referring again to the heartbeat synchronization operation, the determination of when to perform such a heartbeat synchronization operation may be made based on many different factors. As one example, the heartbeat synchronization operation may be initiated in response to a user input requesting the operation to be performed. As another example, such a determination may be made based on a type of application or job that is to be processed by the computing cluster. For example, if the application or job has an associated indicator identifying the application or job as one that requires synchronization of the processor chips in the computing cluster, then the heartbeat synchronization operation may be initiated accordingly. Moreover, as will be discussed in greater detail hereafter, the heartbeat synchronization operation may be initiated in response to a determination that synchronization of at least two processor chips in the computing cluster are sufficiently out of synchronization with each other, thereby requiring a re-synchronization using the heartbeat synchronization operation. Other factors and events may be used to initiate the heartbeat synchronization operation as will become readily apparent to those of ordinary skill in the art in view of the present description.

Having determined that a heartbeat synchronization operation is needed, the processor chip, herein referred to as the master processor chip, may then broadcast a message, or data communication signal, to each of the other processor chips in the computing cluster 1500 the intent to perform the heartbeat synchronization operation. The broadcasting of the message may be performed using direct and/or indirect routing as dictated by the routing table data structures maintained by the ISR of the master processor chip. In response to receiving this broadcast communication, heartbeat synchronization logic in each of the processor chips may be initialized for performing the heartbeat synchronization operation, as will be described with reference to FIGS. 16-18 hereafter.

The master processor chip may keep track of an elapsed time since the heartbeat synchronization operation was initiated to determine when to discontinue the heartbeat synchronization operation. For example, based on the size of the computing cluster, i.e. the number of supernodes, processor books, and processor chips, a predetermined amount of time may be established for ensuring that all of the processor chips in the computing cluster are synchronized using the heartbeat synchronization operation. The master processor chip may compare the current elapsed time since the heartbeat synchronization operation was initiated with this predetermined amount of time to determine if the predetermined amount of time has been met or exceeded and, as a result, the heartbeat synchronization operation may be terminated. In response to the master processor chip determining that the heartbeat synchronization operation may be terminated, the master processor chip may send out another broadcast message to the processor chips indicating the termination of the heartbeat synchronization operation.

In response to receiving the termination message, the heartbeat synchronization logic of the processor chips may exit the heartbeat synchronization operation and may then utilize their own generated heartbeat signals as internal system clock signals for timing the operation of the processors, or cores, of the processor chip. Since each of the heartbeat signals of each of the processor chips are now synchronized, the corresponding internal system clock signals of the processor chips are also synchronized. Thus, jobs or tasks being executed by the processors, or cores, of the processor chips are also synchronized based on the system clocks. Hence, the illustrative embodiments provide a mechanism for providing a cluster-wide system clock through the synchronization of heartbeat signals of processor chips in a MTFG interconnect architecture.

Figure 16:
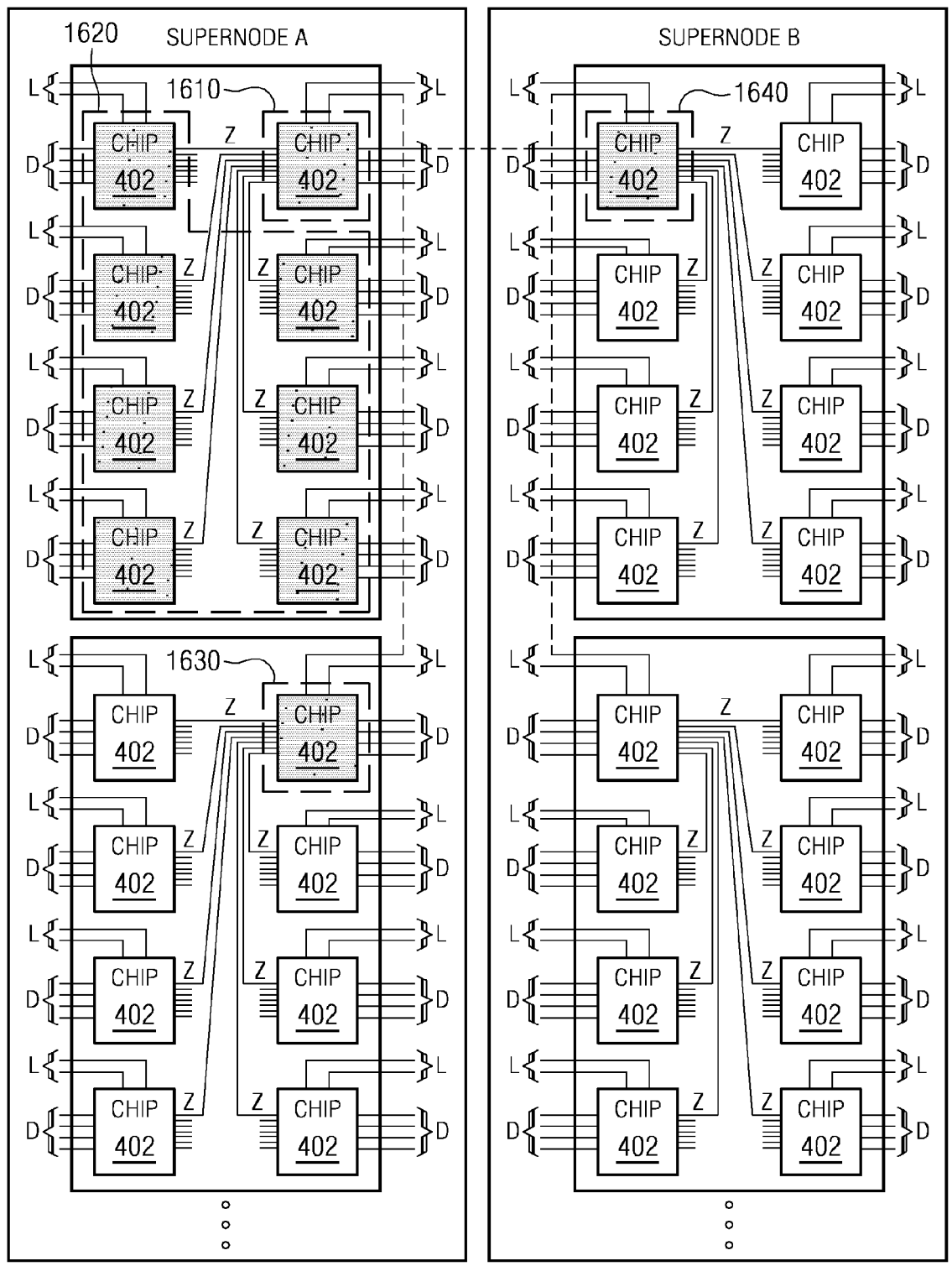
FIG. 16 is an exemplary diagram illustrating a first cycle of a heartbeat synchronization process executed in the computing cluster of FIG. 15 in accordance with one illustrative embodiment.
Figure 17:
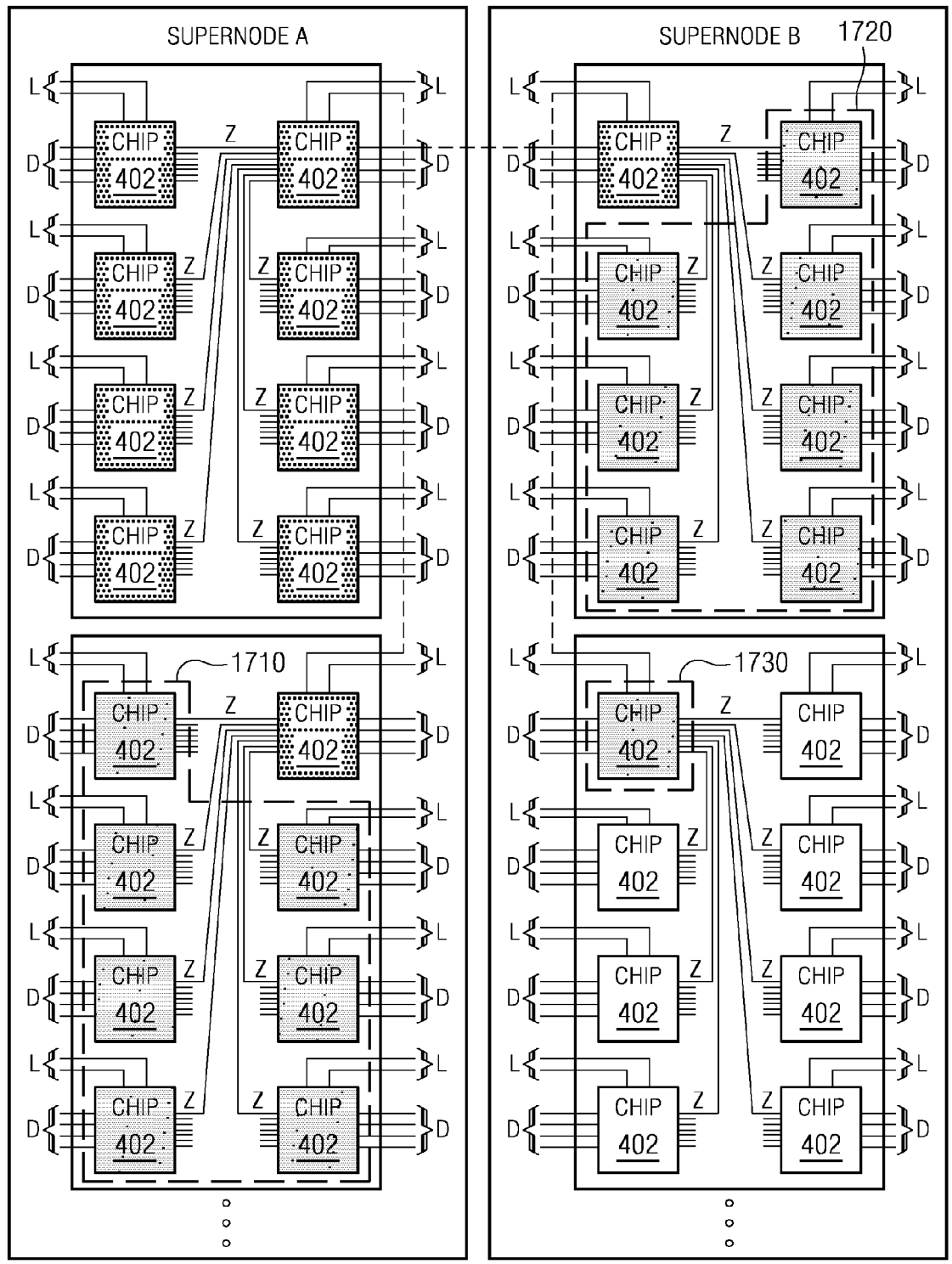
FIG. 17 is an exemplary diagram illustrating a second cycle of a heartbeat synchronization process executed in the computing cluster of FIG. 15 in accordance with one illustrative embodiment.
Figure 18:
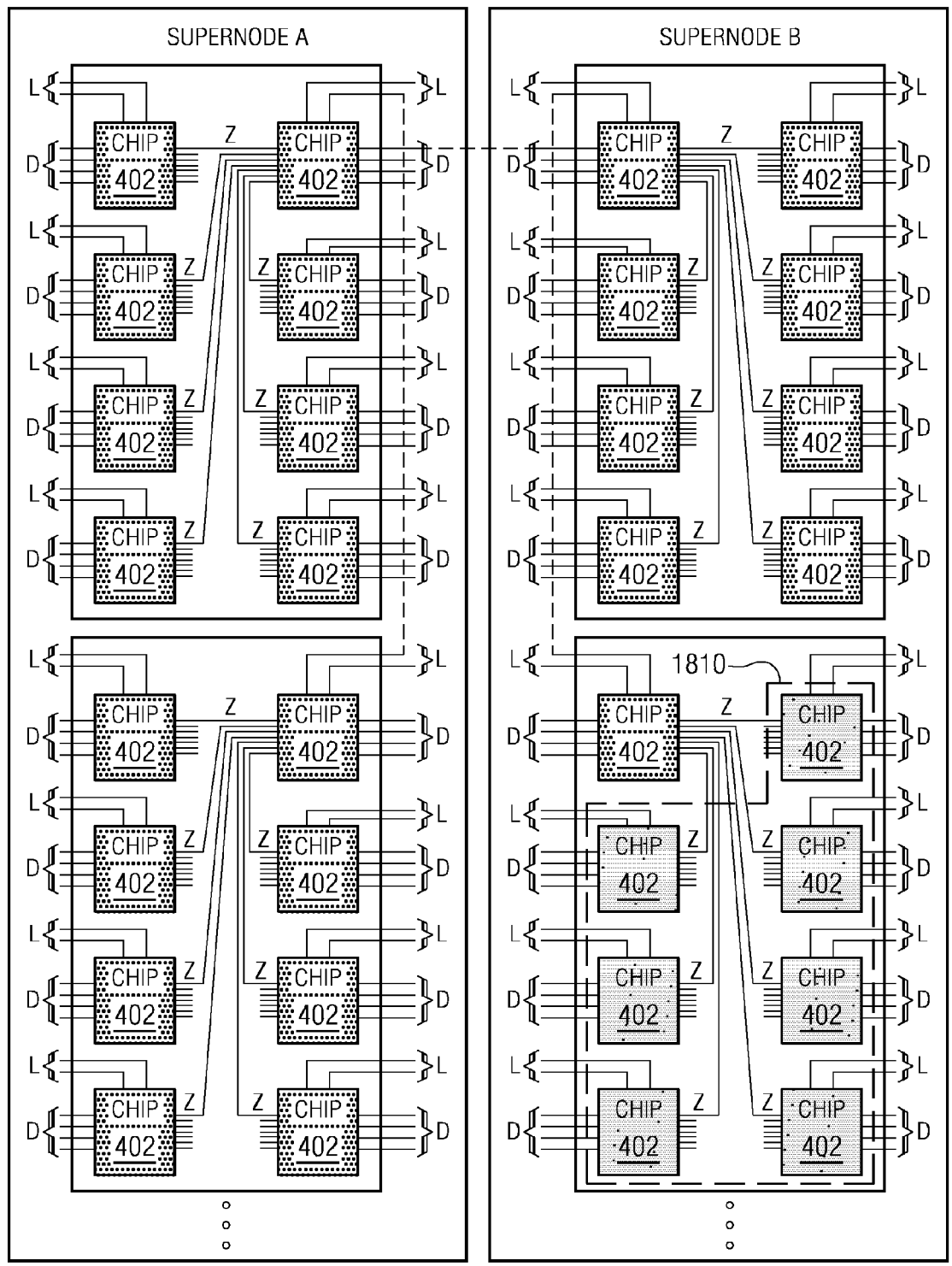
FIG. 18 is an exemplary diagram illustrating a third cycle of a heartbeat synchronization process executed in the computing cluster of FIG. 15 in accordance with one illustrative embodiment.

FIGS. 16-18 show three processor cycles during a heartbeat synchronization operation in accordance with one illustrative embodiment. FIG. 16 shows a first processor cycle after notification to all processor chips that the heartbeat synchronization operation is being performed. FIG. 17 shows the next processor cycle and FIG. 18 shows the next processor cycle after FIG. 17. In these figures, gray-shaded processor chips represent the processor chips which are synchronized as a result of the distribution of heartbeat signals during that processor cycle. Processor chips having a dotted shading represent processor chips that were synchronized in a previous processor cycle. Thus, FIGS. 16-18 together show the progression of synchronization from the master processor chip to all processor chips of the computing cluster.

Referring now to FIG. 16, an exemplary diagram illustrating a first cycle of a heartbeat synchronization process or operation executed in the computing cluster of FIG. 15 is depicted in accordance with one illustrative embodiment. As shown in FIG. 16, a master processor chip 1610, after sending the initiation message of the heartbeat synchronization operation, sends out a heartbeat signal to each of the processor chips directly coupled to the master processor chip 1610. This includes all of the processor chips 1620 in the same processor book as the master processor chip 1610, the processor chip(s) 1630 in other processor books of the same supernode A, and one processor chip 1640 in each of the other supernodes, i.e. in this example supernode B. The identification of these directly coupled processor chips may be performed by the ISR of the master processor chip 1610 using the routing table data structures previously described above. Any entry in the routing table data structures comprising a single hop, i.e. transmission across a single bus whether it be Z, L, or D, to reach a destination processor chip is considered to be a direct coupling of the master processor chip 1610 with the destination processor chip. Alternatively, the ISR may broadcast the heartbeat signal to each of the ports associated with the ISR such that the heartbeat signal is sent to all directly coupled processor chips without having to perform a lookup operation in the routing table data structures to identify directly coupled routes.

The processor chips 1620-1640, having been set to a heartbeat synchronization operation state by the previous initiation message broadcast by the master processor chip 1610, process the heartbeat signal from the master processor chip 1610 to determine how to synchronize their own heartbeat signals to be transmitted at approximately the same time as the heartbeat signal of the master processor chip 1610. As mentioned previously, the heartbeat signal preferably includes a timestamp indicating when the heartbeat signal was transmitted by the source, in this case master processor chip 1610. Moreover, the heartbeat signal may specify a periodicity of the heartbeat signal, e.g., the regular interval at which the heartbeat signal is transmitted. Furthermore, the frequency of the internal system clock signals to be generated based on the heartbeat signal may be specified in the heartbeat signal. Alternatively, the periodicity of the heartbeat signal itself may be used to control the frequency of the internal system clock signals by timing the clock signals to be substantially at the same time as the heartbeat signals.

The timestamp of the heartbeat signal may be compared with a time at which the heartbeat signal was received by the processor chips 1620-1640 in order to determine a time delay during transmission. Based on this time delay and the periodicity of the heartbeat signal, a prediction may be made as to when the next heartbeat signal may be transmitted by the master processor chip 1610. The processor chips 1620-1640 may then time their own transmissions of their own heartbeat signals to their directly coupled processor chips to coincide, approximately, with the predicted transmission time of the heartbeat signal from the master processor chip 1610. Thus, during a next cycle of the heartbeat synchronization operation, the processor chips 1620-1640 will transmit their own heartbeat signal at approximately the same time as the master processor chip 1610 again transmits its heartbeat signal to processor chips 1620-1640. The processor chips 1610-1640 may continue to transmit their heartbeat signals until it is determined that the heartbeat synchronization operation is to be terminated.

As a result of the above process, at the end of the cycle shown in FIG. 16, processor chips 1610-1640 are considered to be synchronized with each other within a given tolerance. Thus, these processor chips 1610-1640 are shaded in FIG. 16 to illustrate this synchronization while non-shaded processor chips of the computing cluster are still not synchronized at this point in time. It should be appreciated that with each subsequent receipt of a heartbeat signal during the heartbeat synchronization operation, the processor chips 1620-1640 may refine their prediction of when the master processor chip 1610 will transmit the next heartbeat signal and, as a result, adjust the timing of their own heartbeat signals if necessary.

FIG. 17 is an exemplary diagram illustrating a second cycle of a heartbeat synchronization operation executed in the computing cluster of FIG. 15 in accordance with one illustrative embodiment. As shown in FIG. 17, processor chips 1630 and 1640 in this second cycle transmit their own heartbeat signals, at approximately the same time as the master processor chip 1610 transmits its heartbeat signal, to processor chips 1710 and 1720 in their own respective processor books. In addition, processor chip 1640 is directly coupled to processor chip 1730 in another processor book of supernode B. Thus, processor chip 1640 also transmits its heartbeat signal to processor chip 1730.

Again, the timestamp of the heartbeat signals from processor chips 1630 and 1640 may be compared with a time at which the heartbeat signal was received by the processor chips 1710-1730 in order to determine a time delay during transmission. Based on this time delay and the periodicity of the heartbeat signal, a prediction may be made as to when the next heartbeat signal may be transmitted by the master processor chip 1610 and thus, the processor chips 1620-1640. The processor chips 1710-1730 may then time their own transmissions of their own heartbeat signals to their directly coupled processor chips to coincide, approximately, with the predicted transmission time of the heartbeat signal from the processor chips 1610-1640. Thus, during a next cycle of the heartbeat synchronization operation, the processor chips 1710-1730 will transmit their own heartbeat signal at approximately the same time as the processor chips 1610-1640 again transmit their heartbeat signals. Again, the processor chips 1610-1640 and 1710-1730 may continue to transmit their heartbeat signals until it is determined that the heartbeat synchronization operation is to be terminated.

As a result of the above process, at the end of the cycle shown in FIG. 17, processor chips 1610-1640 are considered to be synchronized from a previous cycle and processor chips 1710-1730 are considered to be synchronized with each other and processor chips 1610-1640 based on the depicted cycle within a given tolerance. Thus, the processor chips 1610-1640 are dot-shaded in FIG. 17 and processor chips 1710-1730 are gray-shaded to illustrate this synchronization while non-shaded processor chips of the computing cluster are still not synchronized at this point in time. Again, it should be appreciated that with each subsequent receipt of a heartbeat signal during the heartbeat synchronization operation, the processor chips 1620-1640 and 1710-1730 may refine their prediction of when the master processor chip 1610 will transmit the next heartbeat signal and, as a result, adjust the timing of their own heartbeat signals if necessary.

FIG. 18 is an exemplary diagram illustrating a third cycle of a heartbeat synchronization operation executed in the computing cluster of FIG. 15 in accordance with one illustrative embodiment. As shown in FIG. 18, in the next cycle of the heartbeat synchronization operation, the processor chip 1730 transmits its own heartbeat signal to processor chips 1810 in the same processor book at approximately the same time as the processor chips 1610-1640 and 1710-1720 transmit their heartbeat signals. Processor chips 1810 process the heartbeat signal from processor chip 1730 in a similar manner as previously described to thereby synchronize their own heartbeat signals. As a result of this third cycle, all of the processor chips in the computing cluster 1500 in FIG. 15 have had their heartbeat signals synchronized. Additional cycles may be used to allow for refinement of the timing of the heartbeat signals, but essentially an entire computing cluster in a MTFG interconnect architecture, regardless of the size of the computing cluster, may be synchronized in this manner in approximately 3 cycles of the heartbeat synchronization operation.

Once the processor chips in the computing cluster are synchronized in this manner, the master processor chip, having allowed sufficient time for the heartbeat synchronization operation to complete, sends out a termination message to each of the processor chips to inform them to exit the heartbeat synchronization operation state. The heartbeat synchronization logic of the processor chips may then exit the heartbeat synchronization operation state and may then commence using their heartbeat signals to transmit queue depth information in the form of data messages or portions of data in the heartbeat signals. As a result, the ISRs of the processor chips will each have fairly accurate depth queue information for use in selecting routing paths to route data in order to optimize the transmission and processing of data in the network or computing cluster.

As mentioned above, the broadcasting of the queue depth information may involve the multi-tiered transmission of heartbeat signals as described in FIGS. 16-18 above. That is, as shown in FIG. 16, during a first processor cycle, the shaded processor chips are updated with queue depth information for a selected processor chip 1610. It should be appreciated that this operation is not just performed from the processor chip 1610 to only its directly coupled processor chips 1620-1640 but each processor chip in the computing cluster is itself broadcasting to each of its directly coupled processor chips. The depiction in FIGS. 16-18 with regard to broadcasting queue depth information is for simplification to aid in understanding how a particular processor chip's queue depth information is propagated through the computing cluster.

As shown in FIG. 17, in a second processor cycle, the shaded processor chips 1710-1730 are now provided with the queue depth information for the selected processor chip 1610 via the broadcast of the queue depth information in heartbeat signals from their directly coupled processor chips 1620-1640 that were provided with the queue depth information in the previous processor cycle. It should be appreciated that during this second processor cycle, the processor chips 1620-1640 shaded in FIG. 16 are again provided with queue depth information from the selected processor chip 1610. Thus, the queue depth information for processor chip 1610 may be different between processor chips 1620-1640 and 1710-1730 due to the one processor cycle delay in propagating the queue depth information. However, this difference will not be appreciable for purposes of routing data transmissions.

In the third processor cycle, shown in FIG. 18, the queue depth information for the selected processor chip 1610 is again broadcast by the processor chips 1710-1730 to processor chips 1810. Again, the selected processor chip 1610 broadcasts the most up to date queue depth information to its directly coupled processor chips 1620-1640 and processor chips 1620-1640 broadcast the queue depth information for the previous processor cycle, shown in FIG. 17, to the processor chips 1710-1730. As a result, processor chips 1620-1640 will have different queue depth information for processor chip 1610 than processor chips 1710-1730 which in turn will have different queue depth information for processor chip 1610 than processor chips 1810. Thus, each level of the hierarchy will have different queue depth information for processor chip 1610 but this difference will be at most 3 processor cycles different which is not a significant enough difference to cause routing decisions to be inaccurate.

It should be appreciated that some circumstances may lead to the heartbeat signal and/or the internal system clock signals of the processor chips drifting out of synchronization. Thus, the heartbeat synchronization logic of the processor chips may further monitor received heartbeat signals to determine if the timing of the heartbeat signals does not coincide with the generation of the processor chip's own heartbeat signal. If a timing difference between a received heartbeat signal and the processor chip's own heartbeat signal, taking into account transmission delays as discussed above, is greater than a tolerance or pre-established threshold value, then that processor chip may initiate the heartbeat synchronization operation described in FIGS. 15-18. Moreover, such a synchronization operation may result in the need to initialize the queue depth data structures associated with the ISRs of the various processor chips of the network or computing cluster with subsequent repopulating of these data structures with queue depth information in the manner described above with reference to FIGS. 16-18.

As discussed above, each of the processor chips, in accordance with one illustrative embodiment, includes heartbeat synchronization logic for facilitating the operations described above with regard to FIGS. 15-18. Furthermore, each processor chip includes a storage mechanism, such as a built-in memory device, for storing queue depth information received from other processor chips via heartbeat signal broadcasts. Moreover, each processor chip includes, either integrated in the ISR or associated with the ISR, logic for utilizing the queue depth information maintained in the storage mechanism to make determinations as to routing of data through the network or computing cluster based on queue depths at each of the processor chips along the routes.

Figure 19:
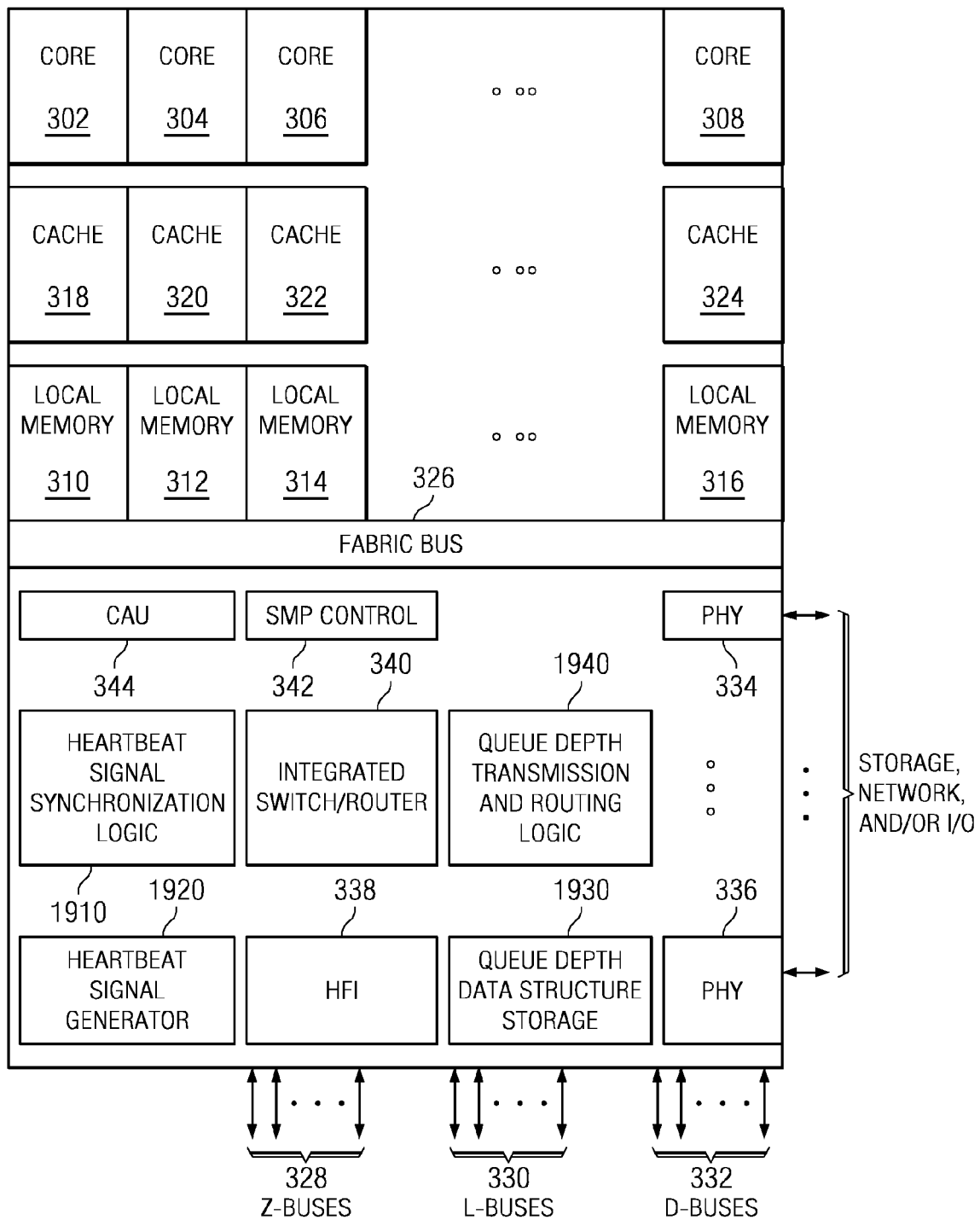
FIG. 19 is an exemplary block diagram illustrating a processor chip with heartbeat synchronization logic in accordance with one illustrative embodiment.

FIG. 19 is an exemplary block diagram illustrating a processor chip 1900 with heartbeat synchronization logic and queue depth storage and routing logic in accordance with one illustrative embodiment. The processor chip 1900 in FIG. 19 corresponds to the processor chip of FIG. 3 with the exception of the addition of heartbeat signal synchronization logic 1910, heartbeat signal generator 1920 which comprises heartbeat signal generation logic, queue depth data structure storage 1930, and queue depth transmission and routing logic 1940. The other elements in FIG. 19 corresponding to elements in FIG. 3 operate in a same manner as described above with regard to FIG. 3, unless otherwise indicated hereafter.

As shown in FIG. 19, heartbeat signal synchronization logic 1910 provides the logic for determining when to transmit a heartbeat signal based on received heartbeat signals, when to initiate a heartbeat signal synchronization operation if necessary, and the other operations previously discussed above. The heartbeat signal generator 1920 comprises heart beat signal generation logic that actually generates and transmits the heartbeat signal using the Z, L, and D buses 328-332.

The queue depth data structure storage 1930 stores queue depth information for each of the other processor chips in the network or computing cluster as received via heartbeat signals in the manner described previously. The queue depth information may be stored in association with processor chip identifiers such that the queue depth information, which identifies a number of requests or data presently in the queues of a processor chip, i.e. number of requests or amount of data present at the time that the queue depth information was broadcast from the original processor chip, may be correlated with routing table data structure information when determining an optimum route for transmitting data to a target or destination processor chip. The queue depth data structure may be continuously updated as heartbeat signals having queue depth information are received. The queue depth transmission and routing logic 1940 may contain logic for handling conflicts between redundant queue depth data if any.

The queue depth transmission and routing logic 1940 may further contain logic for transmitting queue depth information in heartbeat signals generated and transmitted by the processor chip. Moreover, the queue depth transmission and routing logic 1940 further includes logic for selecting a route from routing table data structures maintained by the ISR 340. It should be appreciated that instead of providing separate logic in the queue depth transmission and routing logic 1940, the route selection logic may be integrated into the ISR 340.

The route selection logic may take many different forms, all of which cannot be concisely described herein. However, as an example, the route selection logic of the queue depth transmission and routing logic 1940 may first select a set of one or more candidate routes from the current processor chip to a specified destination processor chip based on the identity of the destination processor chip and which routes are still available, i.e. not experiencing errors or failures. If more than one possible route exists in the set of candidate routes, a particular route to be used to transmit the data to the destination processor chip may be selected by the route selection logic based on a correlation of queue depth information for the various processor chips along each route in the candidate set of routes. For example, queue depth information in the queue depth data structure storage 1930 may be correlated with each processor in each route in the candidate set of routes, such as based on a processor chip identifier, and a route having the lowest overall queue depth may be selected as the route to use for transmitting the data.

Of course other criteria may be included in the determination, including number of hops from the current processor chip to the destination processor chip along the route, any reported error conditions of links or hops along the routes, etc. Based on the selected route, the data is transmitted along the selected route through a particular port of phy 334-336 of the processor chip. As discussed above, this selection of routes may be done, in one illustrative embodiment, at only the source processor chip. In such a case, intermediate processor chips that receive the data but that are not the destination processor chip will forward the data along the originally selected route without performing any routing selection operation. This allows for greater throughput of the overall network or computing cluster. Alternatively, the route selection can be made at each processor chip along a route in response to receiving the data destined for another processor chip.

Thus, based on the queue depth information received in heartbeat signals broadcast by the processor chips of the network or computing cluster, dynamic route selection for the transmission of data may be performed. Such dynamic route selection allows the network or computing cluster to route data along optimum routes thereby reducing latency in the transmission of data from source processor chips to destination processor chips. Thus, the network of computing cluster as a whole operates more efficiently.

Figure 20:
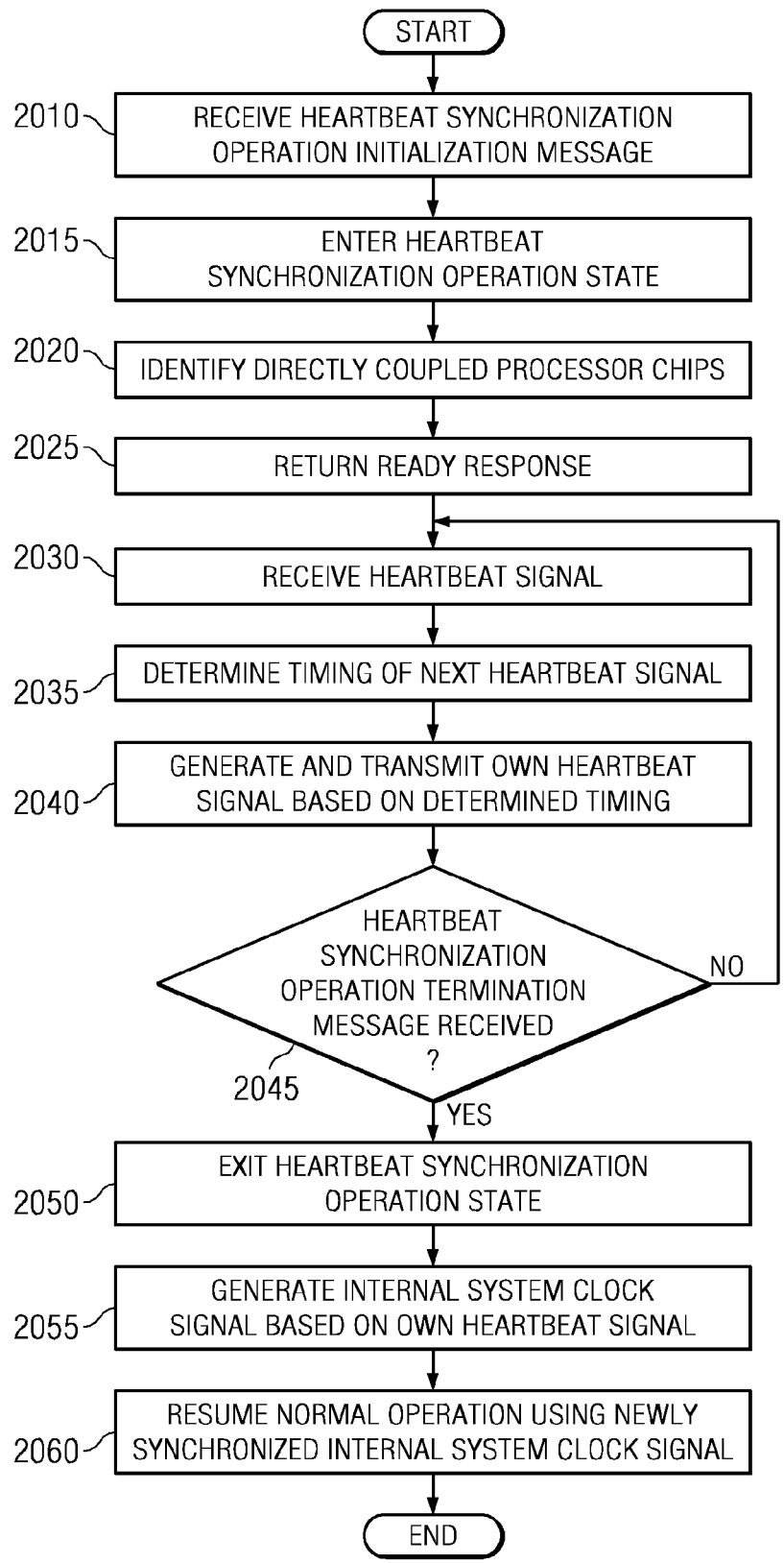
FIG. 20 is a flowchart outlining an exemplary operation in a processor chip for performing a heartbeat synchronization process in accordance with one illustrative embodiment.

FIG. 20 is a flowchart outlining an exemplary operation in a processor chip for performing a heartbeat synchronization process in accordance with one illustrative embodiment. The operation outlined in FIG. 20 may be implemented, for example, by logic of a processor chip, such as heartbeat signal synchronization logic 1910, heartbeat signal generator logic 1920, and other integrated logic of a processor chip.

As shown in FIG. 20, the operation starts with receiving a heartbeat synchronization operation initialization message (step 2010). In response, the processor chip enters a synchronization operation state (step 2015). The entry of such a state may involve, for example, temporarily suspending any processing being performed by the processor chip, quiescing I/O operations, or the like. The processor chip, via the routing table data structures, identifies those other processor chips that are directly coupled to it and which are in a same computing cluster (step 2020). Once the processor chip enters the synchronization operation state and has determined its directly coupled processor chips, it may communicate back to the source of the initialization message a readiness to perform he synchronization operation (step 2025).

The processor chip then receives a heartbeat signal from another processor chip (step 2030). Based on the heartbeat signal, the processor chip determines a timing of a next heartbeat signal from the other processor chip (step 2035). The processor chip then transmits its own heartbeat signal to the identified directly coupled processor chips (step 2040). The processor chip then determines if a heartbeat synchronization operation termination message has been received (step 2045). If not, the operation returns to step 2030.

If a heartbeat synchronization operation termination message has been received, the processor chip may exit the heartbeat synchronization operation state (step 2050) and generate an internal system clock signal based on its own heartbeat signal (step 2055). The processor chip may then resume any temporarily suspended processes as well perform other normal operations using the newly synchronized internal system clock signal (step 2060). The operation then terminates.

Again, while the operation outlined in FIG. 20 makes reference to identifying directly coupled processor chips using the routing table data structures, the illustrative embodiments are not limited to such. Rather, in an alternative illustrative embodiment, the heartbeat signals may be broadcast to all directly coupled processor chips through all ports associated with the ISR without having to perform a lookup operation in the routing table data structures.

Figure 21:
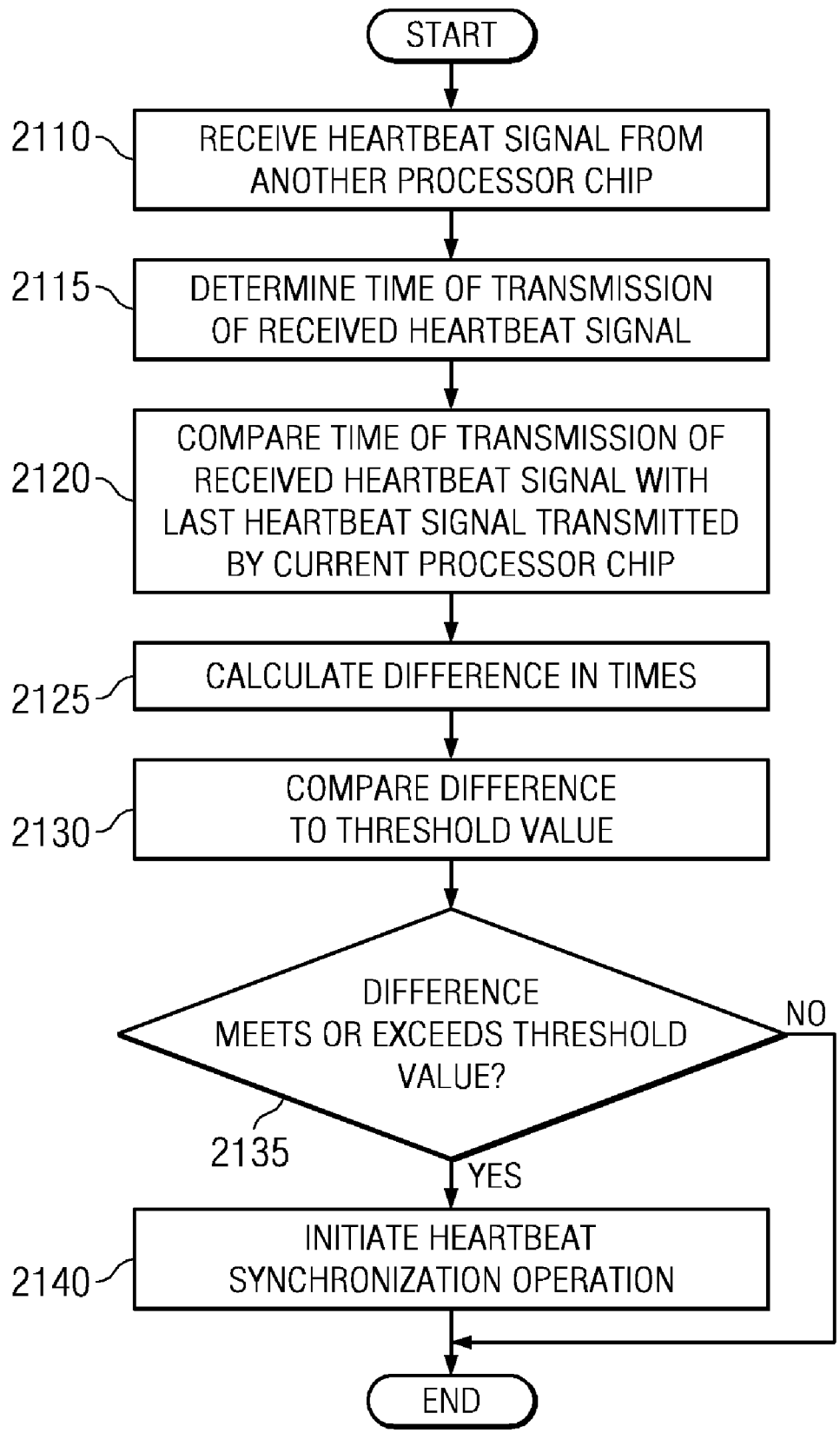
FIG. 21 is a flowchart outlining an exemplary operation for monitoring heartbeat signals to determine if a heartbeat synchronization process is to be performed in accordance with one illustrative embodiment.

FIG. 21 is a flowchart outlining an exemplary operation for monitoring heartbeat signals to determine if a heartbeat synchronization process is to be performed in accordance with one illustrative embodiment. The operation outlined in FIG. 20 may be implemented, for example, by logic of a processor chip, such as heartbeat signal synchronization logic 1910 in FIG. 19 or the like. As shown in FIG. 21, the operation starts with receiving a heartbeat signal from another processor chip (step 2110). A time of transmission of the received heartbeat signal is determined based on timestamp information in the heartbeat signal and a time of receipt of the heartbeat signal (step 2115). The time of transmission of the received heartbeat signal is compared to a timestamp of a last heartbeat signal transmitted by the current processor chip (step 2120).

The processor chip calculates a difference in the times (step 2125) and compares this difference to a predetermined threshold value (step 2130). If the difference meets or exceeds the predetermined threshold value (step 2135), the processor chip initiates a heartbeat synchronization operation (step 2140) such as that described in FIGS. 15-20 above and the operation terminates. If the difference does not meet or exceed the predetermined threshold value, the operation terminates. This process may be repeated for each received heartbeat signal while the processor chip is not in a heartbeat synchronization operation state.

Figure 22:
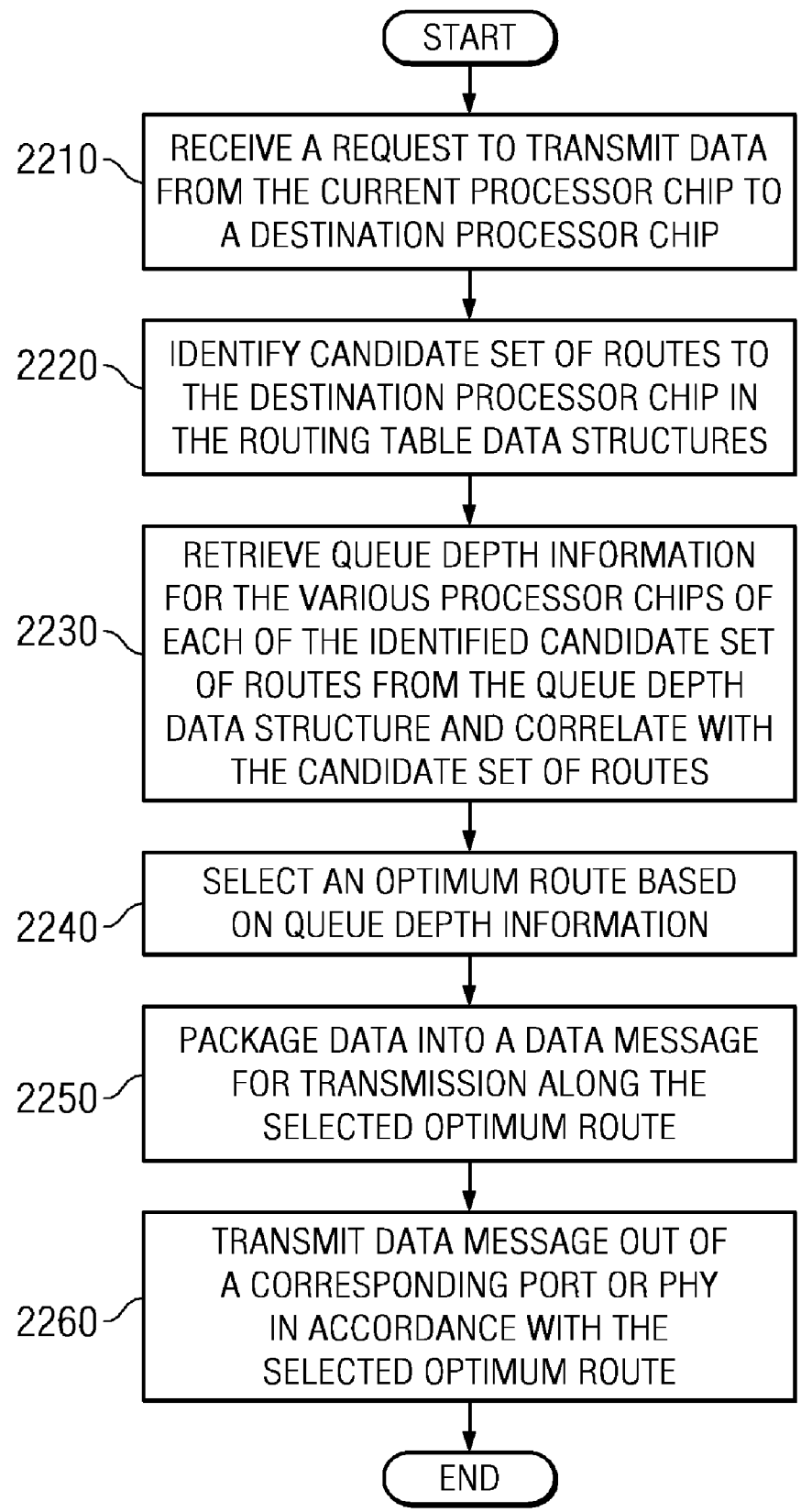
FIG. 22 is a flowchart outlining an exemplary operation for selecting a route through which data may be transmitted from a current processor chip to a destination processor chip in accordance with one illustrative embodiment.

FIG. 22 is a flowchart outlining an exemplary operation for selecting a route through which data may be transmitted from a current processor chip to a destination processor chip in accordance with one illustrative embodiment. The operation outlined in FIG. 22 may be performed, for example, by the queue depth transmission and routing logic 1940 or ISR 340 using the queue depth information in the queue depth data structure 1930.

As shown in FIG. 22, the operation starts with receiving a request to transmit data from the current processor chip to a destination processor chip (step 2210). Based on the specified destination processor chip, a candidate set of routes to the destination processor chip are identified in the routing table data structures (step 2220). Queue depth information for the various processor chips of each of the identified candidate set of routes is retrieved from the queue depth data structure and correlated with the candidate set of routes (step 2230). An optimum route based on queue depth information is identified and selected for use in transmitting the data to the destination processor chip (step 2240). The data is then packaged into a data message for transmission along the selected optimum route (step 2250). The data message is then transmitted out of a corresponding port or phy in accordance with the selected optimum route (step 2260). The operation then terminates.

Thus, the illustrative embodiments provide a highly-configurable, scalable system that integrates computing, storage, networking, and software. The illustrative embodiments provide for a multi-tier full-graph interface architecture that improves communication performance for parallel or distributed programs and improves the productivity of the programmer and system. With such an architecture, and the additional mechanisms of the illustrative embodiments described herein, a multi-tiered full-graph interface is provided in which maximum bandwidth is provided to each of the processors, or nodes such that enhanced performance of parallel or distributed programs is achieved. Moreover, the illustrative embodiments provide mechanisms for providing a dynamic routing of data through the transmission of synchronized heartbeat signals, having queue depth information encoded therein, between the processor chips of the MTFG interconnect architecture.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A processor chip, comprising:
   at least one processor;
   a plurality of communication ports for directly coupling the processor chip to a plurality of other processor chips via bus connections; and
   heartbeat signal generation logic for generating a heartbeat signal for broadcasting over the plurality of communication ports to the plurality of other processor chips, wherein the heartbeat signal generation logic transmits queue depth information associated with the plurality of communication ports of the processor chip in the heartbeat signal broadcast over the plurality of communication ports to the plurality of other processor chips, wherein:
   the heartbeat signal is a signal broadcast by the processor chip to the plurality of other processor chips at a regular interval that is synchronized with a master processor chip through a synchronization process, and
   the queue depth information comprises queue depth information for the communication ports of the processor chip and queue depth information for communication ports of each of the plurality of other processor chips to which the processor chip is directly coupled, queue depth information for communication ports of other processor chips to which the processor chip is indirectly coupled and which are present in a same processor book or different processor books of a same supernode, and queue depth information of additional processor chips in other supernodes that are indirectly coupled to the current processor chip via the other processor chips in the same processor book and different processor books of the same supernode.

2. The processor chip of claim 1, further comprising: routing logic for selecting a route over which to transmit a data message to a destination processor chip, wherein the routing logic selects the route based on the queue depth information received from the plurality of other processor chips.

3. The processor chip of claim 1, further comprising: queue depth data structure storage that stores the queue depth information for the plurality of other processor chips received in heartbeat signals from the plurality of other processor chips via the plurality of communication ports.

4. The processor chip of claim 3, further comprising: queue depth transmission and routing logic that sends the queue depth information of the processor chip in the heartbeat signal generated by the heartbeat signal generation logic and that selects a route for transmission of data from the at least one processor to a destination processor chip based on the queue depth information stored in the queue depth data structure storage.

5. The processor chip of claim 4, wherein the queue depth information for the plurality of other processor chips is stored in association with processor chip identifiers and is correlated with routing table data structure information, based on the processor chip identifiers, when the queue depth transmission and routing logic selects the route for transmitting the data to the destination processor chip.

6. The processor chip of claim 4, wherein the queue depth transmission and routing logic is integrated with an integrated switch/router of the processor chip.

7. The processor chip of claim 4, wherein the queue depth transmission and routing logic selects the route to transmit the data by:
- selecting a set of one or more candidate routes from the first processor chip to the destination processor chip based on an identity of the destination processor chip and which routes from the first processor chip to the destination processor chip are still available for routing of the data to the destination processor chip; and
- selecting the route to be used to transmit the data to the destination processor chip based on the queue depth information, stored in the queue depth data structure storage, for processor chips along each route in the candidate set of routes.

8. The processor chip of claim 7, wherein the route that is selected to be used to transmit the data to the destination processor chip is a route, in the candidate set of routes, having a lowest total queue depth as determined by the queue depth information for processor chips along the route.

9. The processor chip of claim 7, wherein selecting the route to be used to transmit the data to the destination processor chip further comprises selecting the route based on at least one of a number of hops from the processor chip to the destination processor chip along the routes in the set of candidate routes or reported error conditions of links along the routes in the set of candidate routes.

10. The processor chip of claim 1, wherein the processor chip and plurality of other processor chips are part of a computing cluster that comprises a multi-tiered full graph interconnect architecture data processing system having a plurality of supernodes, each supernode having one or more processor books, and each processor book having one or more processor chips of the plurality of processor chips.

11. A method, in a data processing system, comprising:
- receiving, in a first processor chip of the data processing system, a plurality of first heartbeat signals from a plurality of second processor chips coupled to the first processor chip via one or more communication ports, wherein the plurality of first heartbeat signals have first queue depth information associated with respective processor chips of the plurality of second processor chips;
- storing the first queue depth information in a queue depth information data structure storage of the first processor chip; and
- performing routing of data from the first processor chip to a destination processor chip in the data processing system based on the first queue depth information stored in the queue depth information data structure storage, wherein:
- each first heartbeat signal in the plurality of first heartbeat signals is a signal broadcast by a corresponding second processor chip to the first processor chip and other second processor chips at a regular interval that is synchronized with a master processor chip through a synchronization process, and
- the first queue depth information for a current second processor chip comprises queue depth information for communication ports of the current second processor chip and queue depth information for communication ports of each of the other second processor chips to which the current second processor chip is directly coupled, queue depth information for communication ports of other processor chips to which the current second processor chip is indirectly coupled and which are present in a same processor book or different processor books of a same supernode, and queue depth information of additional processor chips in other supernodes that are indirectly coupled to the current second processor chip via the other second processor chips in the same processor book and different processor books of the same supernode.

12. The method of claim 11, wherein the queue depth information identifies queue depths associated with a plurality of virtual channels of a corresponding processor chip in the plurality of second processor chips.

13. The method of claim 11, further comprising:
- generating, in the first processor chip, a second heartbeat signal for broadcasting from the first processor chip to the plurality of second processor chips via the one or more communication ports;
- encoding the second heartbeat signal with second queue depth information associated with the first processor chip; and
- transmitting the encoded second heartbeat signal to the plurality of second processor chips via the one or more communication ports, wherein the second heartbeat signal is a signal broadcast by the first processor chip to the plurality of second processor chips at a regular interval that is synchronized with the master processor chip through a synchronization process, and
- the second queue depth information for the first processor chip comprises queue depth information for communication ports of the first processor chip and queue depth information for communication ports of each of the plurality of second processor chips to which the first processor chip is directly coupled, queue depth information for communication ports of other processor chips to which the first processor chip is indirectly coupled and which are present in a same processor book or different processor books of a same supernode, and queue depth information of additional processor chips in other supernodes that are indirectly coupled to the first processor chip via the other second processor chips in the same processor book and different processor book of the same supernode.

14. The method of claim 11, wherein the first queue depth information for the plurality of second processor chips is stored in association with processor chip identifiers.

15. The method of claim 14, wherein performing routing of data from the first processor chip to the destination processor chip comprises correlating the first queue depth information with routing table data structure information based on the processor chip identifiers.

16. The method of claim 11, wherein performing routing of data from the first processor chip to a destination processor chip comprises:
- selecting a set of one or more candidate routes from the first processor chip to the destination processor chip based on an identity of the destination processor chip and which routes from the first processor chip to the destination processor chip are still available for routing of the data to the destination processor chip; and
- selecting a route to be used to transmit the data to the destination processor chip based on first queue depth information, stored in the queue depth data structure storage, for processor chips along each route in the candidate set of routes.

17. The method of claim 16, wherein the route that is selected to be used to transmit the data to the destination processor chip is a route, in the candidate set of routes, having a lowest total number of active queue depths as determined by the queue depth information for processor chips along the route.

18. The method of claim 16, wherein selecting the route to be used to transmit the data to the destination processor chip further comprises selecting the route based on at least one of a number of hops from the first processor chip to the destination processor chip along the routes in the set of candidate routes or reported error conditions of links along the routes in the set of candidate routes.

19. The method of claim 11, wherein the first processor chip and plurality of second processor chips are part of a computing cluster that comprises a multi-tiered full graph interconnect architecture data processing system having a plurality of supernodes, each supernode having one or more processor books, and each processor book having one or more processor chips of the plurality of processor chips.

20. A computer program product comprising a computer useable storage device having a computer readable program stored thereon, wherein the computer readable program, when executed in a data processing system, causes the data processing system to:
  receive, in a first processor chip of the data processing system, a plurality of first heartbeat signals from a plurality of second processor chips coupled to the first processor chip via one or more communication ports, wherein the plurality of first heartbeat signals have first queue depth information associated with respective processor chips of the plurality of second processor chips;
  store the first queue depth information in a queue depth information data structure storage of the first processor chip; and
  perform routing of data from the first processor chip to a destination processor chip in the data processing system based on the first queue depth information stored in the queue depth information data structure storage, wherein:
  each first heartbeat signal in the plurality of heartbeat signals is a signal broadcast by a corresponding second processor chip to the first processor chip and other second processor chips at a regular interval that is synchronized with a master processor chip through a synchronization process, and
  the first queue depth information for a current second processor chip comprises queue depth information for communication ports of the current second processor chip and queue depth information for communication ports of each of the other second processor chips to which the current second processor chip is directly coupled, queue depth information for communication ports of other processor chips to which the current second processor chip is indirectly coupled and which are present in a same processor book or different processor books of a same supernode, and queue depth information of additional processor chips in other supernodes that are indirectly coupled to the current second processor chip via the other second processor chips in the same processor book and different processor books of the same supernode.

21. A system, comprising:
a plurality of processor chips; and
a plurality of communication links directly coupling each processor chip in the plurality of processor chips to at least one other processor chip in the plurality of processor chips via bus connections, wherein each processor chip in the plurality of processor chips comprises heartbeat signal generation logic for generating a heartbeat signal for broadcasting over one or more communication links, in the plurality of communication links, coupled to the processor chip, wherein the heartbeat signal generation logic transmits queue depth information, associated with the one or more communication links, in the heartbeat signal broadcast over the one or more communication links to the plurality of other processor chips, wherein:
the heartbeat signal is a signal broadcast by the processor chip to the plurality of other processor chips at a regular interval that is synchronized with a master processor chip through a synchronization process, and
the queue depth information comprises queue depth information for the communication ports of the current processor chip and queue depth information for communication ports of each of the other processor chips to which the current processor chip is directly coupled, queue depth information for communication ports of other processor chips to which the current processor chip is indirectly coupled and which are present in a same processor book or different processor books of a same supernode, and queue depth information of additional processor chips in other supernodes that are indirectly coupled to the current processor chip via the other processor chips in the same processor book and different processor books of the same supernode.

* * * * *